(12) United States Patent
Lax et al.

(10) Patent No.: US 7,260,962 B2
(45) Date of Patent: *Aug. 28, 2007

(54) CASE WITH INTERNAL LOCK

(75) Inventors: Michael Lax, Syosset, NY (US); Agjah I Libohova, Bayside, NY (US)

(73) Assignee: Autronics Plastics Inc., Westbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/796,332

(22) Filed: Mar. 8, 2004

(65) Prior Publication Data

US 2004/0173477 A1    Sep. 9, 2004

Related U.S. Application Data

(63) Continuation of application No. 09/858,457, filed on May 16, 2001.

(60) Provisional application No. 60/279,906, filed on Mar. 29, 2001, provisional application No. 60/221,953, filed on Jul. 31, 2000.

(51) Int. Cl.
*B65D 85/67* (2006.01)

(52) U.S. Cl. .............................. 70/57.1; 70/63; 70/276; 206/1.5; 206/308.2; 206/387.11

(58) Field of Classification Search ................. 70/57.1, 70/58, 63, 276; 206/1.5, 308.2, 387.11; 292/80, 292/81, 251.5
See application file for complete search history.

(56) References Cited

U.S. PATENT DOCUMENTS 517,729 A    4/1894    Cable (Continued)

FOREIGN PATENT DOCUMENTS

AU    68056/87    7/1987

(Continued)

OTHER PUBLICATIONS

Derwent Information Ltd. Abstract of German Patent No. 29620435, Feb. 6, 1997.

(Continued)

*Primary Examiner*—Lloyd A. Gall
(74) *Attorney, Agent, or Firm*—Fish & Neave IP Group of Ropes & Gray LLP; Paul E. Leblond

(57) ABSTRACT

A lockable storage case includes a top cover pivotably coupled to a bottom cover through a spine. The top cover includes loops or an upper lock receiving member and a lower lock receiving member defining a top cover lock insertion path. The bottom cover includes loops or an upper lock receiving member and a lower lock receiving member defining a bottom cover lock insertion path. The lower lock receiving members of both the top and bottom covers include hooks for receiving and maintaining a latch. When the top cover is closed on the bottom cover, the top and bottom cover insertion paths combine to form a combined lock insertion path. A lock for the storage case includes first and second catch mechanisms with first and second catches. To lock the storage case, the lock is inserted into the combined lock insertion path so that the catches on the lock mate with and are retained with the hooks in the top and bottom covers.

52 Claims, 64 Drawing Sheets

U.S. PATENT DOCUMENTS

| | | |
|---|---|---|
| 1,626,898 A | 5/1927 | Welk |
| 1,707,225 A | 4/1929 | Jackson |
| 2,393,034 A | 1/1946 | Ellis et al. |
| 2,730,392 A | 1/1956 | Thiebaud |
| 2,809,062 A | 10/1957 | Mainhardt et al. |
| 2,825,483 A | 3/1958 | Maron |
| 2,916,901 A | 12/1959 | Claud-Mantle |
| 3,095,723 A | 7/1963 | McKinght et al. |
| 3,230,749 A | 1/1966 | Manthorne |
| 3,232,421 A | 2/1966 | Young |
| 3,495,716 A | 2/1970 | Gregory |
| 3,497,908 A | 3/1970 | Zamarra |
| 3,515,423 A | 6/1970 | De Smidt |
| 3,685,684 A | 8/1972 | Schindler et al. |
| 3,763,994 A | 10/1973 | Somers |
| 3,828,922 A | 8/1974 | Holkestad |
| 3,837,525 A | 9/1974 | Kobayashi |
| 3,837,692 A | 9/1974 | Ayers et al. |
| 3,855,827 A | 12/1974 | Hallman et al. |
| 3,876,071 A | 4/1975 | Neal et al. |
| 3,885,670 A | 5/1975 | Cousino |
| 3,904,259 A | 9/1975 | Hoffmann et al. |
| 3,933,240 A | 1/1976 | Humble |
| 3,933,381 A | 1/1976 | Schurman |
| 3,949,928 A | 4/1976 | Perkins |
| 3,951,264 A | 4/1976 | Heidecker et al. |
| 3,969,007 A | 7/1976 | Lowry |
| 3,994,416 A | 11/1976 | Mulligan |
| 3,994,551 A | 11/1976 | Ackeret |
| 4,011,940 A | 3/1977 | Neal et al. |
| 4,046,255 A | 9/1977 | Ackeret |
| 4,084,690 A | 4/1978 | Pulse |
| 4,084,694 A | 4/1978 | Lainez et al. |
| 4,109,821 A | 8/1978 | Lutz |
| 4,153,178 A | 5/1979 | Weavers |
| 4,176,744 A | 12/1979 | Borzak |
| RE30,184 E | 1/1980 | Ackeret |
| 4,184,594 A | 1/1980 | Hehn |
| 4,191,292 A | 3/1980 | Scnweizer |
| 4,204,724 A | 5/1980 | Bauer et al. |
| 4,211,337 A | 7/1980 | Weavers et al. |
| 4,235,334 A | 11/1980 | Ahn |
| 4,239,108 A | 12/1980 | Coleman et al. |
| 4,266,784 A | 5/1981 | Torrington |
| 4,279,373 A | 7/1981 | Montealegre |
| 4,285,429 A | 8/1981 | MacTavish |
| 4,291,801 A | 9/1981 | Basili et al. |
| 4,293,266 A | 10/1981 | St. Lawrence et al. |
| 4,303,159 A | 12/1981 | Stone et al. |
| 4,314,637 A | 2/1982 | Posso |
| 4,314,643 A | 2/1982 | Forbes |
| 4,339,853 A * | 7/1982 | Lipschitz .................. 70/57.1 |
| 4,341,307 A | 7/1982 | Shyers |
| 4,363,403 A | 12/1982 | Raucci et al. |
| 4,365,711 A | 12/1982 | Long et al. |
| 4,365,712 A | 12/1982 | Oishi et al. |
| 4,379,507 A | 4/1983 | Llabres |
| 4,387,807 A | 6/1983 | de la Rosa |
| 4,399,913 A | 8/1983 | Gelardi et al. |
| 4,401,216 A | 8/1983 | Koch |
| 4,406,369 A | 9/1983 | Wallace et al. |
| 4,407,410 A | 10/1983 | Graetz et al. |
| 4,425,999 A | 1/1984 | MacDonald et al. |
| 4,445,634 A | 5/1984 | Sato |
| 4,453,743 A | 6/1984 | Sanders et al. |
| 4,463,849 A | 8/1984 | Prusak et al. |
| 4,463,850 A | 8/1984 | Gorog |
| 4,466,540 A | 8/1984 | Lotrous et al. |
| 4,469,225 A | 9/1984 | Takahashi |
| 4,476,978 A | 10/1984 | Saito |
| 4,488,644 A | 12/1984 | Wynalda |
| 4,501,359 A | 2/1985 | Yoshizawa |
| 4,508,217 A | 4/1985 | Long et al. |
| 4,522,312 A | 6/1985 | Rathgeber et al. |
| 4,538,730 A | 9/1985 | Wu |
| 4,558,782 A | 12/1985 | Iverson et al. |
| 4,561,544 A | 12/1985 | Reeve |
| 4,572,369 A | 2/1986 | Morris |
| 4,589,549 A | 5/1986 | Hehn |
| 4,609,105 A | 9/1986 | Manes et al. |
| 4,613,044 A | 9/1986 | Saito et al. |
| 4,617,655 A | 10/1986 | Aldenhoven |
| 4,627,534 A | 12/1986 | Komiyama et al. |
| 4,635,797 A | 1/1987 | Bankier |
| D288,145 S | 2/1987 | Northrup et al. |
| 4,640,416 A | 2/1987 | Northrup et al. |
| 4,643,301 A | 2/1987 | Hehn et al. |
| 4,658,955 A | 4/1987 | Eichner |
| 4,670,950 A * | 6/1987 | Wisecup et al. ............. 70/57.1 |
| 4,674,303 A | 6/1987 | Salcone |
| 4,676,370 A | 6/1987 | Rudick |
| 4,678,080 A | 7/1987 | Nelson |
| 4,685,558 A | 8/1987 | Filiz et al. |
| 4,702,369 A | 10/1987 | Philosophe |
| 4,703,853 A | 11/1987 | Byrns |
| 4,705,166 A | 11/1987 | Ackeret |
| 4,709,812 A | 12/1987 | Kosterka |
| 4,709,813 A | 12/1987 | Wildt |
| 4,717,021 A | 1/1988 | Ditzig |
| 4,718,547 A | 1/1988 | MacTavish |
| 4,722,439 A | 2/1988 | Grobecker et al. |
| 4,724,957 A | 2/1988 | Burgschweiger |
| 4,733,916 A | 3/1988 | Seufert |
| 4,747,484 A | 5/1988 | Ackeret |
| 4,750,618 A | 6/1988 | Schubert |
| 4,753,347 A | 6/1988 | Bellante et al. |
| 4,759,442 A | 7/1988 | Gregerson et al. |
| 4,762,228 A | 8/1988 | McConnell, III et al. |
| 4,784,264 A | 11/1988 | Sykes |
| 4,793,479 A | 12/1988 | Otsuka et al. |
| 4,802,601 A | 2/1989 | Pijanowski et al. |
| 4,805,769 A | 2/1989 | Soltis et al. |
| 4,805,770 A | 2/1989 | Grobecker et al. |
| 4,807,749 A | 2/1989 | Ackeret |
| 4,811,000 A | 3/1989 | Humphrey et al. |
| 4,819,797 A * | 4/1989 | Holmgren .................. 206/309 |
| 4,834,238 A | 5/1989 | Hehn et al. |
| 4,838,420 A | 6/1989 | Collett et al. |
| D303,041 S | 8/1989 | Thompson |
| 4,860,897 A | 8/1989 | Fowler et al. |
| 4,867,302 A | 9/1989 | Takahashi |
| 4,871,064 A | 10/1989 | Hehn et al. |
| 4,921,097 A | 5/1990 | Finke et al. |
| 4,928,825 A | 5/1990 | Hehn |
| 4,941,588 A | 7/1990 | Flider |
| 4,947,989 A | 8/1990 | Horton |
| 4,962,854 A | 10/1990 | Ricci |
| 4,966,020 A | 10/1990 | Fotheringham et al. |
| 4,972,690 A | 11/1990 | O'Sullivan |
| 4,974,740 A | 12/1990 | Niles et al. |
| 4,987,639 A | 1/1991 | Baiuley et al. |
| 4,987,999 A | 1/1991 | Hehn |
| 4,988,000 A | 1/1991 | Weisburn et al. |
| 5,007,256 A | 4/1991 | Lowe |
| 5,011,010 A | 4/1991 | Francis et al. |
| 5,016,752 A | 5/1991 | Haugen |
| 5,039,982 A | 8/1991 | Bruhwiler |
| 5,076,460 A | 12/1991 | Hussell |
| 5,081,446 A | 1/1992 | Gill et al. |
| 5,085,322 A | 2/1992 | Lax |
| 5,088,165 A | 2/1992 | Minasy et al. |
| D324,337 S | 3/1992 | Brady |
| 5,103,978 A | 4/1992 | Secor |
| 5,145,068 A | 9/1992 | Schmitz et al. |

| | | | | | |
|---|---|---|---|---|---|
| 5,147,034 A | 9/1992 | Broadhead et al. | 5,727,680 A | 3/1998 | Liu |
| 5,161,907 A | 11/1992 | Byrne | 5,730,283 A | 3/1998 | Lax |
| 5,191,983 A | 3/1993 | Hardy | 5,760,689 A | 6/1998 | Holmgren |
| 5,193,371 A | 3/1993 | Yamane | 5,762,187 A | 6/1998 | Belden et al. |
| 5,195,595 A | 3/1993 | Nakagawa | 5,768,922 A | 6/1998 | Lax |
| 5,205,401 A | 4/1993 | Weisburn et al. | 5,769,217 A | 6/1998 | Derraugh et al. |
| 5,205,405 A | 4/1993 | O'Brien et al. | 5,769,218 A | 6/1998 | Yabe |
| 5,209,086 A | 5/1993 | Bruhwiler | 5,772,028 A | 6/1998 | Marsilio et al. |
| 5,211,283 A | 5/1993 | Weisburn et al. | 5,775,491 A | 7/1998 | Taniyama |
| 5,213,209 A | 5/1993 | Song | 5,775,500 A | 7/1998 | Williams |
| 5,215,188 A | 6/1993 | Wittman | 5,777,884 A | 7/1998 | Belka et al. |
| 5,219,417 A | 6/1993 | O'Brien et al. | 5,782,348 A | 7/1998 | Burdett |
| 5,236,081 A | 8/1993 | Fitzsimmons et al. | 5,782,350 A | 7/1998 | Weisburn et al. |
| 5,238,107 A | 8/1993 | Kownacki | 5,788,068 A | 8/1998 | Fraser et al. |
| 5,244,085 A | 9/1993 | Lammerant et al. | 5,799,782 A | 9/1998 | Gelardi |
| 5,249,677 A | 10/1993 | Lim | 5,799,784 A | 9/1998 | Bosworth |
| 5,251,750 A | 10/1993 | Gelardi et al. | 5,823,341 A | 10/1998 | Nakasuji |
| 5,253,751 A | 10/1993 | Wipper | 5,829,582 A | 11/1998 | Ippolito et al. |
| 5,259,498 A | 11/1993 | Weisburn et al. | 5,829,584 A | 11/1998 | Raucci |
| 5,285,918 A | 2/1994 | Weisburn et al. | 5,839,576 A | 11/1998 | Kim |
| 5,297,672 A | 3/1994 | MacTavish | 5,850,752 A | 12/1998 | Lax |
| D347,320 S | 5/1994 | Du Corday | 5,884,761 A | 3/1999 | Gelardi et al. |
| 5,307,927 A | 5/1994 | Curtis et al. | 5,887,713 A | 3/1999 | Smith et al. |
| 5,359,809 A | 11/1994 | Johnson | 5,890,590 A | 4/1999 | Doodson |
| 5,360,107 A | 11/1994 | Chasin et al. | 5,896,985 A | 4/1999 | Nakasuji |
| 5,366,074 A | 11/1994 | O'Brien et al. | 5,896,986 A | 4/1999 | Bolognia et al. |
| 5,368,162 A | 11/1994 | Holmgren | 5,899,327 A | 5/1999 | Sykes |
| 5,369,938 A | 12/1994 | Panveno et al. | 5,901,840 A | 5/1999 | Nakasuji |
| 5,375,712 A | 12/1994 | Weisburn | 5,904,246 A | 5/1999 | Weisburn et al. |
| 5,377,825 A | 1/1995 | Sykes et al. | 5,906,275 A | 5/1999 | Jokic |
| 5,377,827 A | 1/1995 | Roth et al. | D411,071 S | 6/1999 | Cerda-Vicedo |
| 5,384,103 A | 1/1995 | Miller | 5,910,770 A | 6/1999 | Ohara |
| 5,390,515 A | 2/1995 | Essick | 5,918,909 A | 7/1999 | Fiala et al. |
| 5,400,902 A | 3/1995 | Kaminski | 5,931,291 A | 8/1999 | Sedon et al. |
| 5,417,324 A | 5/1995 | Joyce et al. | 5,931,294 A | 8/1999 | Weingarden et al. |
| D358,961 S | 6/1995 | Lax | 5,933,568 A | 8/1999 | Higurashi et al. |
| 5,438,738 A * | 8/1995 | Stolz et al. ............... 24/704.1 | 5,934,114 A | 8/1999 | Weisburn et al. |
| 5,460,266 A | 10/1995 | Mundorf et al. | 5,941,382 A | 8/1999 | Fantone et al. |
| 5,462,159 A | 10/1995 | Roth et al. | 5,944,181 A | 8/1999 | Lau |
| 5,475,674 A | 12/1995 | Yamashita et al. | 5,944,185 A | 8/1999 | Burdett et al. |
| 5,494,156 A | 2/1996 | Nies | 5,950,822 A | 9/1999 | Cloran et al. |
| 5,499,714 A | 3/1996 | Konno | 5,956,981 A | 9/1999 | Weisburn et al. |
| 5,501,062 A | 3/1996 | Ambergen et al. | 5,960,949 A | 10/1999 | Wynalda |
| 5,505,299 A | 4/1996 | Ditzig et al. | 5,975,298 A | 11/1999 | Sankey et al. |
| 5,515,968 A | 5/1996 | Taniyama | 5,984,388 A | 11/1999 | Bacon |
| 5,524,752 A | 6/1996 | Mazzucchelli | 5,988,375 A | 11/1999 | Chang |
| 5,526,926 A | 6/1996 | Deja | 5,988,376 A | 11/1999 | Lax |
| 5,528,914 A | 6/1996 | Nguyen et al. | 5,996,788 A | 12/1999 | Belden et al. |
| 5,529,182 A | 6/1996 | Anderson et al. | 5,996,815 A | 12/1999 | Walters et al. |
| 5,533,619 A | 7/1996 | Ziegler | 6,000,541 A | 12/1999 | Yu |
| 5,551,559 A | 9/1996 | Roth et al. | 6,016,909 A | 1/2000 | Chang |
| 5,551,560 A | 9/1996 | Weisburn et al. | D420,240 S | 2/2000 | Sorenson et al. |
| 5,586,651 A | 12/1996 | Krummenacher | 6,021,894 A | 2/2000 | Lakoski et al. |
| 5,586,718 A | 12/1996 | Speece | D422,428 S | 4/2000 | Pijanowski et al. |
| 5,588,315 A | 12/1996 | Holmgren | D422,445 S | 4/2000 | Markowitz |
| 5,593,030 A | 1/1997 | Tell | 6,047,821 A | 4/2000 | Hashimoto et al. |
| 5,593,031 A | 1/1997 | Uchida | 6,056,117 A | 5/2000 | Courchesne |
| 5,597,068 A | 1/1997 | Weisburn et al. | 6,059,102 A | 5/2000 | Gelardi et al. |
| 5,598,728 A | 2/1997 | Lax | 6,065,593 A | 5/2000 | Howerton et al. |
| 5,601,188 A | 2/1997 | Dressen et al. | 6,065,594 A | 5/2000 | Sankey et al. |
| 5,609,249 A | 3/1997 | Cheng | D426,978 S | 6/2000 | Belden et al. |
| 5,626,225 A | 5/1997 | Joyce | 6,085,900 A | 7/2000 | Wong |
| 5,636,535 A | 6/1997 | Shimada | 6,092,650 A | 7/2000 | Budnik |
| 5,636,737 A | 6/1997 | Marsilio | 6,093,140 A | 7/2000 | Gelardi |
| 5,653,335 A | 8/1997 | Bauer et al. | 6,102,200 A | 8/2000 | Dressen et al. |
| 5,660,274 A | 8/1997 | Chien | D430,424 S | 9/2000 | Belden et al. |
| 5,662,218 A | 9/1997 | Ladwig | 6,119,857 A | 9/2000 | Stumpff |
| 5,680,782 A | 10/1997 | Komatsu et al. | 6,123,192 A | 9/2000 | Rufo |
| 5,685,425 A | 11/1997 | Choi | 6,125,668 A | 10/2000 | Belden |
| 5,685,427 A | 11/1997 | Kuitems et al. | 6,135,280 A | 10/2000 | Burdett et al. |
| 5,690,224 A | 11/1997 | Koizumi | 6,164,445 A | 12/2000 | Cooper |
| 5,697,496 A | 12/1997 | Bauer | 6,170,656 B1 | 1/2001 | Cerda-Vilaplana et al. |
| 5,717,533 A | 2/1998 | Poplawski et al. | D437,520 S | 2/2001 | Choi |

| | | |
|---|---|---|
| 6,196,384 B1 | 3/2001 | Belden |
| 6,222,453 B1 | 4/2001 | Joyce |
| D441,212 S | 5/2001 | Pijanowski et al. |
| 6,283,280 B1 | 9/2001 | Wong et al. |
| 6,325,207 B2 | 12/2001 | Drew |
| 6,336,554 B1 | 1/2002 | Bruhwiler |
| 6,354,435 B1 | 3/2002 | Belden et al. |
| 6,374,648 B1 | 4/2002 | Mitsuyama |
| 6,398,022 B1 | 6/2002 | Mou et al. |
| 6,401,920 B2 | 6/2002 | Gelardi |
| 6,412,631 B2 | 7/2002 | Belden |
| 6,418,766 B1 | 7/2002 | Luebeck |
| 6,422,387 B1 | 7/2002 | Sedon et al. |
| 6,443,300 B1 | 9/2002 | Gelardi |
| 6,474,470 B2 * | 11/2002 | Byrne et al. ............ 206/308.2 |
| 6,474,478 B1 | 11/2002 | Huehner et al. |
| 6,516,639 B1 | 2/2003 | Margetts et al. |
| 6,516,945 B2 | 2/2003 | Myszka et al. |
| 6,523,683 B1 | 2/2003 | Fraser et al. |
| 6,561,347 B1 | 5/2003 | Lax |
| 6,598,742 B1 * | 7/2003 | Belden et al. ........... 206/308.2 |
| 6,672,455 B2 * | 1/2004 | Belden et al. ........... 206/308.2 |
| 6,863,176 B2 | 3/2005 | Farrar et al. |
| 6,880,372 B2 * | 4/2005 | Kim .......................... 70/57.1 |
| 6,935,494 B2 | 8/2005 | Fraser et al. |
| 6,966,438 B2 * | 11/2005 | Belden et al. ........... 206/308.1 |
| 2001/0000599 A1 | 5/2001 | Belden |
| 2001/0035359 A1 | 11/2001 | Sedon et al. |
| 2001/0037953 A1 | 11/2001 | Gelardi |
| 2002/0000111 A1 | 1/2002 | Belden, Jr. et al. |
| 2002/0003095 A1 * | 1/2002 | Jaeb et al. ............... 206/308.2 |
| 2002/0020643 A1 | 2/2002 | Kleine-Moellhoff |
| 2002/0046963 A1 | 4/2002 | Belden, Jr. et al. |
| 2002/0050033 A1 | 5/2002 | Belden, Jr. et al. |
| 2002/0100702 A1 | 8/2002 | Belden, Jr. et al. |
| 2002/0129472 A1 | 9/2002 | Copen et al. |
| 2002/0139701 A1 | 10/2002 | Luckow |
| 2002/0170837 A1 | 11/2002 | Belden, Jr. et al. |
| 2003/0000860 A1 | 1/2003 | Bryne et al. |
| 2003/0111367 A1 | 6/2003 | Lax et al. |
| 2004/0060834 A1 | 4/2004 | Farrar et al. |
| 2006/0042330 A1 * | 3/2006 | Lax et al. ................... 70/57.1 |

FOREIGN PATENT DOCUMENTS

| | | |
|---|---|---|
| AU | 199168615 | 8/1991 |
| AU | 672676 | 10/1996 |
| AU | 715920 | 2/2000 |
| AU | 722737 | 8/2000 |
| AU | 723326 | 8/2000 |
| CN | 1093055 | 10/1994 |
| CN | 1143593 | 2/1997 |
| CN | 1215885 | 5/1999 |
| DE | 3316802 | 11/1984 |
| DE | 3923107 | 1/1991 |
| DE | 297 22 209 | 2/1998 |
| DE | 195 11 394 | 11/1999 |
| EP | 0 142 748 | 5/1985 |
| EP | 0211088 | 2/1987 |
| EP | 0308810 | 3/1989 |
| EP | 0312172 | 4/1989 |
| EP | 0 545 494 | 6/1993 |
| EP | 0566403 | 10/1993 |
| EP | 0616103 | 9/1994 |
| EP | 0729897 | 9/1996 |
| FR | 2543421 | 10/1984 |
| FR | 2608564 | 6/1988 |
| FR | 2628250 | 9/1989 |
| FR | 2628717 | 9/1989 |
| FR | 2711311 | 4/1995 |
| FR | 2715817 | 8/1995 |
| GB | 2036697 | 7/1980 |
| GB | 2079726 | 1/1982 |
| GB | 2129779 | 5/1984 |
| GB | 2351277 | 12/2000 |
| JP | 62-241187 | 10/1987 |
| JP | 07-291336 | 11/1995 |
| JP | 9-132287 | 5/1997 |
| JP | 10-116394 | 5/1998 |
| JP | 10-194371 | 7/1998 |
| JP | 11-035084 | 2/1999 |
| JP | 11-147584 | 6/1999 |
| JP | 11-301766 | 11/1999 |
| JP | 2000-191076 | 7/2000 |
| JP | 2000-191078 | 7/2000 |
| JP | 2000-219288 | 8/2000 |
| JP | 2000-237008 | 9/2000 |
| JP | 2001-002101 | 1/2001 |
| JP | 2001-019077 | 1/2001 |
| JP | 2001-082013 | 3/2001 |
| NL | 1 003 965 | 3/1998 |
| WO | WO90/15001 | 12/1990 |
| WO | WO93/15294 | 8/1993 |
| WO | WO96/14636 | 5/1996 |
| WO | WO97/41563 | 11/1997 |
| WO | WO97/47008 | 12/1997 |
| WO | WO99/39068 | 8/1999 |
| WO | WO00/17877 | 3/2000 |
| WO | WO00/17877 A3 | 3/2000 |
| WO | WO00/34954 | 6/2000 |
| WO | WO00/34954 A3 | 6/2000 |

OTHER PUBLICATIONS

Derwent Information Ltd. Abstract of U.S. Appl. No. 5,996,788, Dec. 7, 1999.
Derwent Information Ltd. Abstract of U.S. Appl. No. 6,065,594, May 23, 2000.
Derwent Information Ltd. Abstract of U.S. Appl. No. 6,135,280, Oct. 24, 2000.
Derwent Information Ltd. Abstract of U.S. Appl. No. 2001/0000599, May 3, 2001.
Derwent Information Ltd. Abstract of U.S. Appl. No. 6,222,453, Apr. 24, 2001.
Derwent Information Ltd. Abstract of PCT International Publication No. WO 200207152, Jan. 24, 2002.
Derwent Information Ltd. Abstract of PCT International Publication No. WO 200207165, Jan. 24, 2002.
Derwent Information Ltd. Abstract of U.S. Appl. No. 6,354,435, Mar. 12, 2002.
Derwent Information Ltd. Abstract of PCT International Publication No. WO 200266342, Aug. 29, 2002.
Derwent Information Ltd. Abstract of U.S. Appl. No. 2002/0096442, Jul. 25, 2002.
Derwent Information Ltd. Abstract of U.S. Appl. No. 6,540,074, Apr. 1, 2003.
"Engineers Use I-DEAS to Help Prevent Thefts," Design News, Nov. 6, 1995.
"Security Products for Entertainment Media: Program 2000," Clear-Vu Products, Westbury, New York, Mar. 2000.
"Security Products for Entertainment Media: Program 2001," Clear-Vu Products, Westbury, New York, Mar. 2001.
"Introducing the Red Tag™ Security System," Amaray Media Packaging, Corby, Northants, England, pp. 1-14; date of publication is unknown.

* cited by examiner

CASE WITH INTERNAL LOCK

This application is a continuation of copending U.S. patent application Ser. No. 09/858,457, filed May 16, 2001, which is a non-provisional application that claims priority from U.S. Provisional Applications Nos. 60/279,906, filed Mar. 29, 2001, and 60/221,953, filed on Jul. 31, 2000, all of which are hereby incorporated by reference herein in their entireties.

BACKGROUND OF THE INVENTION

1. Field of the Invention

The present invention relates to a case and lock for storing and securing recorded media such as DVDs, CDs, memory cards, and the like, and more particularly to a case and lock which can more effectively protect recording media from theft.

2. Description of the Related Art

Storage cases are frequently used for storing recording media. A typical storage case comprises a top cover pivotably coupled to a bottom cover through a spine. The recording medium is placed in the bottom cover and the top cover is closed on the bottom cover to retain the recording medium therein. These storage cases can be displayed in a retail or rental environment where potential customers pick up and examine the storage case to determine whether they are interested in buying or renting the media stored therein. As many potential customers handle these storage cases, it is necessary to provide a locking mechanism to deter potential thieves from stealing stored media.

A typical prior art lock is a rigid structure placed around both the top and bottom covers at a portion of the storage case which is distal from the spine. The rigid lock maintains the top and bottom covers coupled together thereby inhibiting access to the inside of the storage case.

By disposing the lock at a portion of the storage case distal from the spine, however, and external to both the top and bottom covers, the lock increases the area of the lock-case combination. Many display shelves are designed to store cases of a specified cross-sectional area and volume—e.g. VSDA (Video Software Dealers Association) standards. By adding a lock to a case which already has such a cross sectional area that conforms to these standards, the lock-case combination may become too large to fit on these shelves. If the case itself is reduced in size so that the lock-case combination conforms to VSDA standards, it becomes difficult to integrate the lock and case with existing automated equipment. Moreover, storage cases typically have paper inserts describing the contents of the case to a potential customer. If the case is altered in size, the size of these paper inserts needs to be altered which also affects manufacturing.

There exists, therefore, a need in the art for a storage case and lock which can be assembled using standard automation equipment, be displayed on shelves using a standardized format (such as VSDA) and which still prevents a thief from gaining access to the receding medium stored therein.

SUMMARY OF THE INVENTION

A storage case includes a top cover pivotably coupled to a bottom cover through a spine. The top cover includes loops or an upper lock receiving member and a lower lock receiving member defining a top cover lock insertion path. The bottom cover includes loops or an upper lock receiving member and a lower lock receiving member defining a bottom cover lock insertion path. The lower lock receiving members of both the top and bottom covers include hooks for receiving and maintaining a catch. When the top cover is closed on the bottom cover, the top and bottom cover insertion paths combine to form a combined lock insertion path. A lock includes first and second catch mechanisms with first and second catches. To lock the storage case, the lock is inserted into the combined lock insertion path so that the catches on the lock mate with and are retained with the hooks in the top and bottom covers.

These aspects and advantages of the present invention, as well as others, will become apparent from the following description of the preferred embodiments which refers to the accompanying drawings.

BRIEF DESCRIPTION OF THE DRAWINGS

For the purpose of illustrating the invention, there is shown in the drawings an embodiment which is presently preferred; it being understood, however, that the invention is not limited to the precise arrangements and instrumentalities shown.

DETAILED DESCRIPTION OF THE PREFERRED EMBODIMENT(S)

Figure 1:
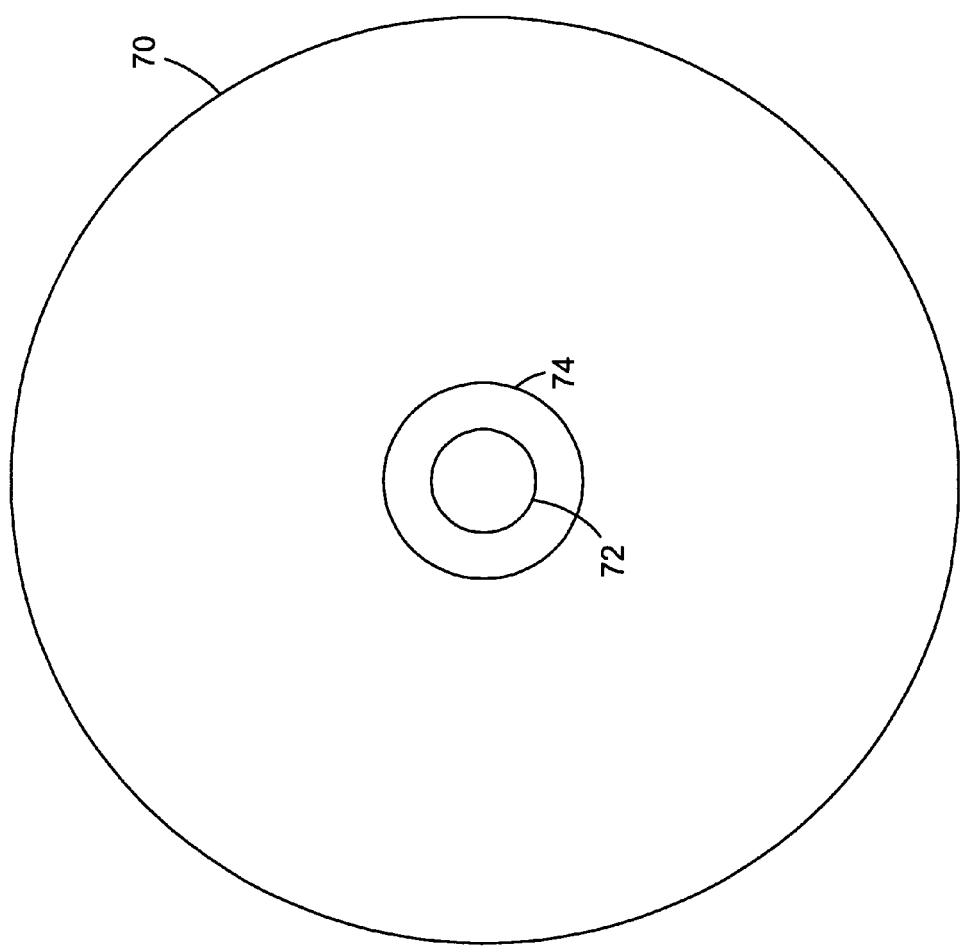
FIG. 1 is a plan view of a recording medium which can be used with the present invention.

FIG. 1 shows a typical recording medium or disc 70 which can be used with the storage case of the present invention. Exemplary recording media are DVDs and CDs although it is within the scope of the present invention that it may be used in connection with any other type or size of media that stores and/or records data.

Recording medium 70 includes a circular opening 72 disposed in a central portion thereof. Towards the center of recording medium 70, and external to opening 72, is an unused portion 74 where data is purposefully not recorded on the recording medium.

Figure 2:
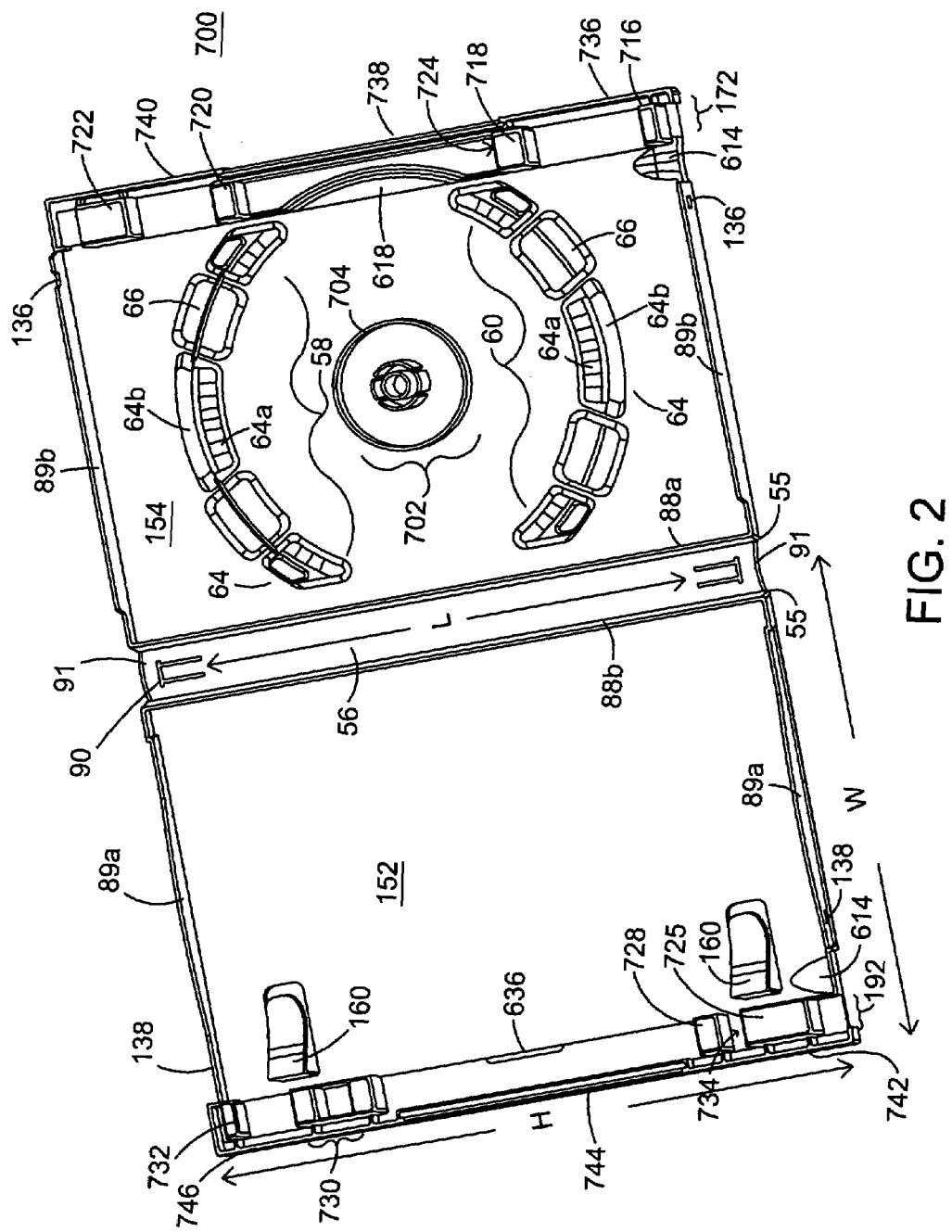
FIG. 2 is a perspective view of a storage case in accordance with an embodiment of the invention.

Referring to FIG. 2, there is shown a plan view of an open case 700 in accordance with the present invention. Case 700 can be made by any method out of any known material. Preferably, case 700 is made of polypropylene.

Storage case 700 comprises a top cover or door side 152, a bottom cover or disc side 154, and a spine 56 disposed therebetween. Bottom cover 154 receives and retains recording medium 70. Top cover 152 and bottom cover 154 are pivotably coupled to spine 56 at respective pivot axes 55 to form what is referred to as a "living hinge." The living hinge allows top and bottom covers 152, 154 to be rotated toward each other about pivot axes 55 so that top and bottom cover 152, 154 can meet and mate with each other to enclose and, therefore, store and protect recording medium 70. Storage case 700 is designed to have a height H and width W that is typical of a standard VHS tape. This height and width format complies with Video Software Dealers Association (VSDA) standards. Storage case 700 includes indents 614 which enable a user to grasp storage case 700 and insert or remove a lock if desired—as is described below.

Top cover 152 includes two resilient document tabs or document retaining members 160 which can be used to retain documents, e.g., a booklet, related to storage medium 70. Bottom cover 154 includes a hub 702 fixedly mounted thereon which is used to receive and retain storage medium 70, although it should be realized by those skilled in the art that any type of hub can be used on bottom cover 154 just so long as it functions to receive and/or retain storage medium 70 thereon.

Figure 12:
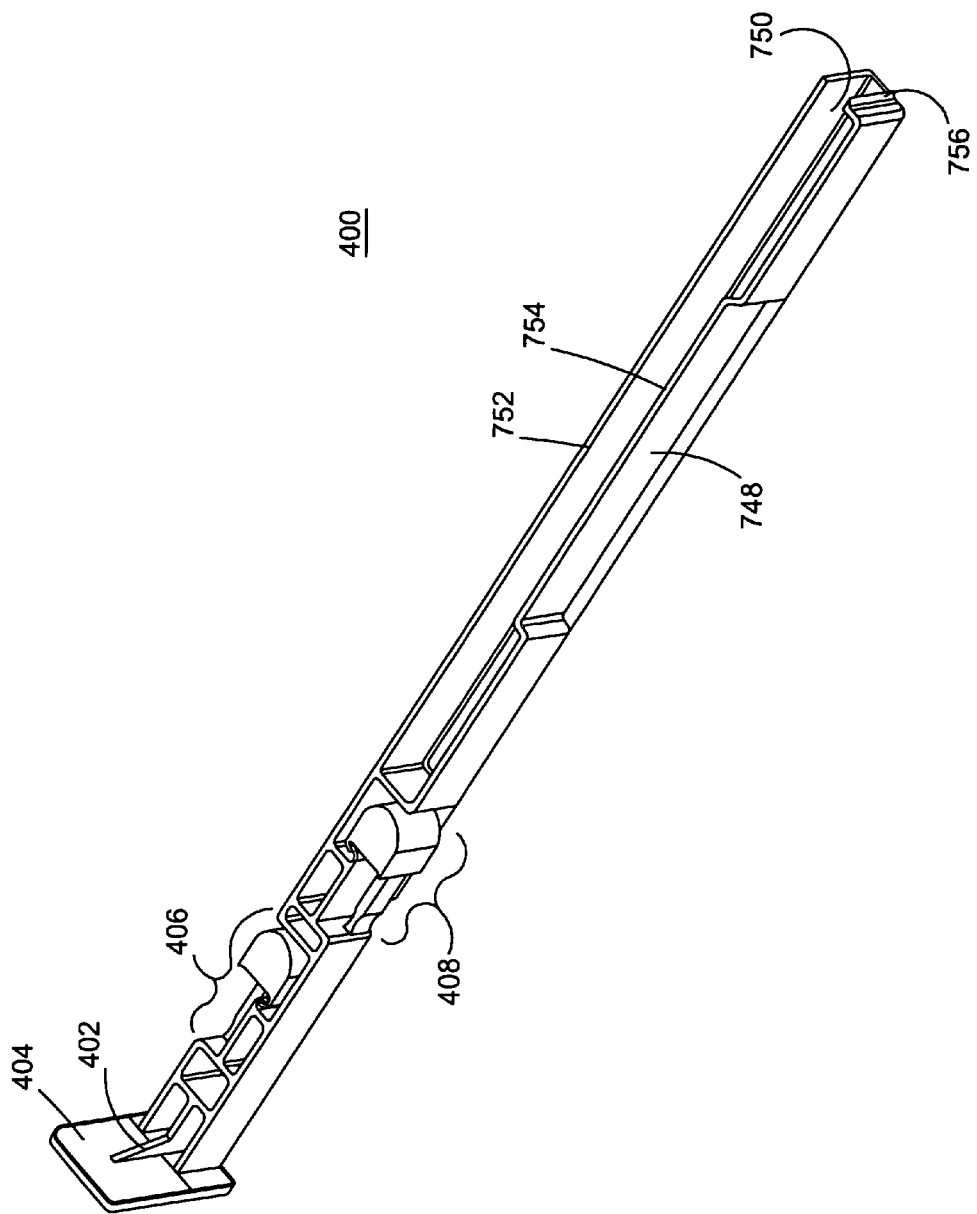
FIG. 12 is a perspective view of a lock to be used with the storage case of FIG. 2 in accordance with the invention.
Figure 13:
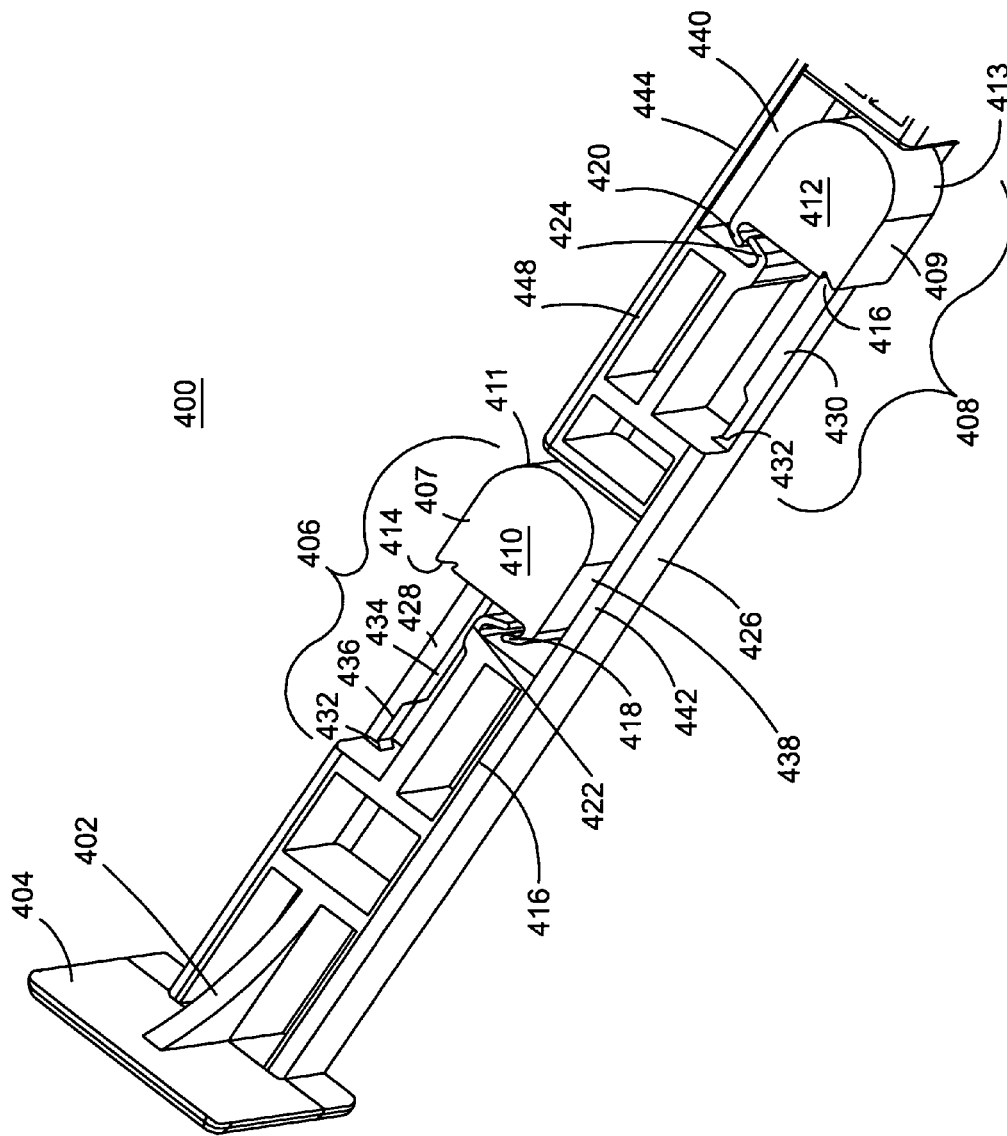
FIG. 13 is a magnified perspective cut-away view of the lock of FIG. 12.

Storage case 700 also includes an improved locking mechanism for enhancing a locking arrangement between bottom cover 154 and top cover 152 and for preventing a potential thief from obtaining access to recording medium 70. Storage case 700 allows for receipt of an internal lock (e.g., FIG. 12) which is closer to spine 56 than prior art storage cases. This locking arrangement works much like a deadbolt.

Referring to FIGS. 2, 5, 6 and 7, bottom cover 154 includes a bottom lock portion 172. Bottom lock portion 172 includes a first wall 736, second wall 738, and third wall 740 which define part of an exterior of storage case 700 distal from spine 56. Second wall 738 is disposed closer to spine 56 thereby defining a recess which allows a user to more easily grasp and open storage case 700.

Bottom lock portion 172 also includes lock receiving members in the form of a first loop 716, a second loop 718, a third loop 720 and a fourth loop 722. Each loop is substantially rectangular in cross-section and defines a parallelepiped shaped void therein. Loops 716, 718, 720 and 722 are substantially collinear and define a lock insertion path or channel 188 on bottom cover 154. Second loop 718 includes a hook edge 724 which receives a latch discussed below. Lock insertion path 188 begins with an open portion 188a at the bottom of bottom cover 154 and terminates with a wall portion 188b at the top of bottom cover 154. Bottom cover 154 further includes a shelf 618 which terminates in an arcuate side guard that protects a recorded medium 70 disposed on shelf 618. When storage medium 70 is disposed on hub 702, storage medium 70 is supported by feet 64 and shelf 618. As shown in the figures, shelf 618 juts out into lock insertion path 188.

Figure 8:
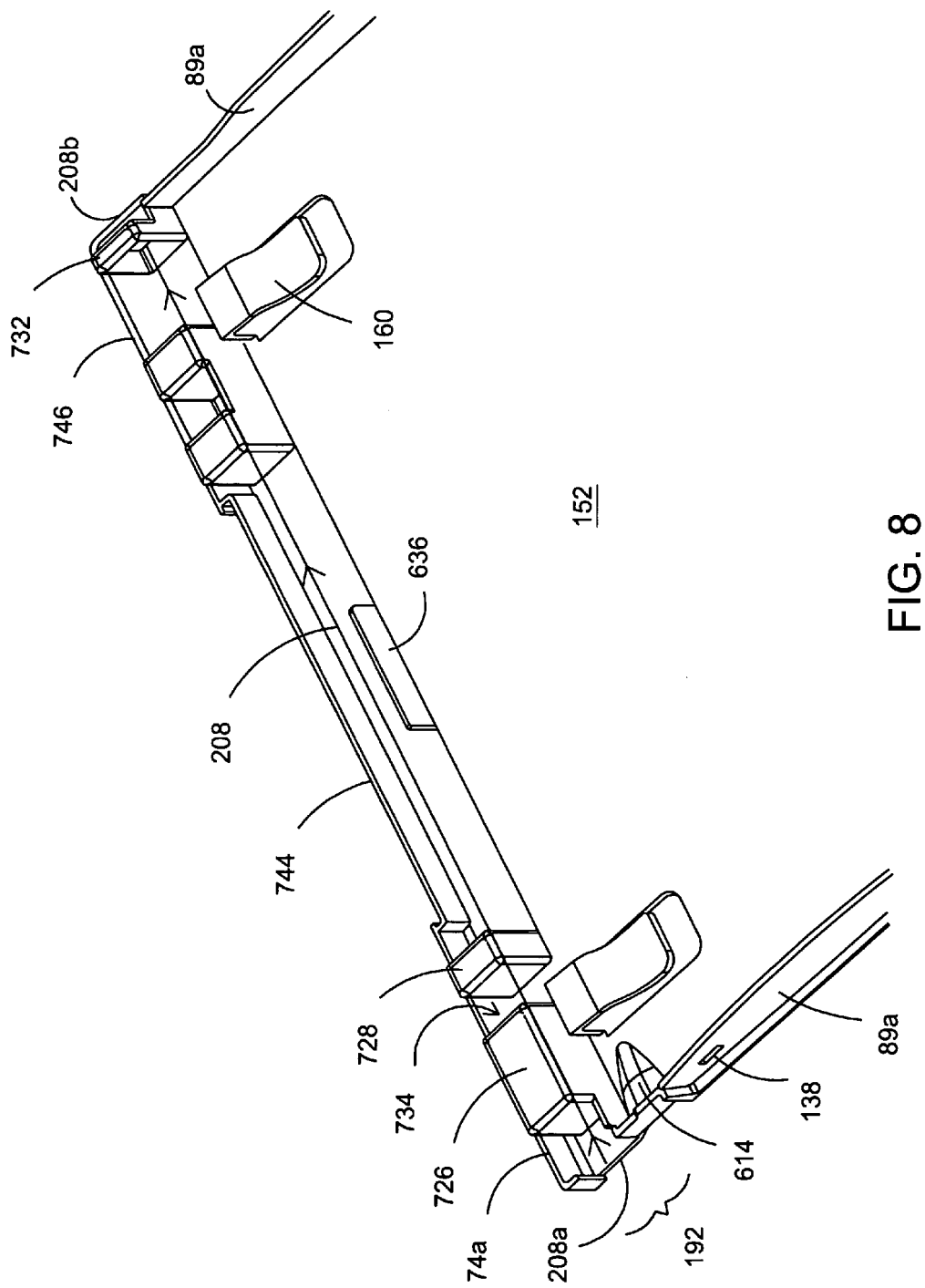
FIG. 8 is a perspective magnified view of a portion of the top cover of the storage case of FIG. 2.

Referring now to FIGS. 2 and 8, top cover 152 includes a top lock portion 192 which is similar to bottom lock portion 172. Top lock portion 192 includes a first wall 742, a second wall 744, and third wall 746 which define part of an exterior of storage case 700 distal from spine 56. As with second wall 738, second wall 744 is disposed closer to spine 56 than first wall 742 and third wall 746 thereby defining a recess (along with second wall 738) which allows a user to more easily grasp and open storage case 700.

Top lock portion 192 also includes lock receiving members in the form of a first loop 726, a second loop 728, a third loop 730, and a fourth loop 732. Each loop is substantially rectangular in cross-section and defines a parallelepiped shaped void therein. Loops 726, 728, 730, 732 are substantially collinear and define a lock insertion path or channel 208 on top cover 152. Second loop 728 includes a hook edge 734 which receives a latch discussed below. Lock insertion path 208 begins with an open portion 208a at the bottom of top cover 152 and terminates with a wall portion 208b at the top of top cover 152. Top cover 152 further includes a hold-down rib 636 which sits on recording medium 70 when top cover 152 is closed upon bottom cover 154. In this way, hold-down rib 636 assists in maintaining recording medium 70 on hub 156.

Figure 9:
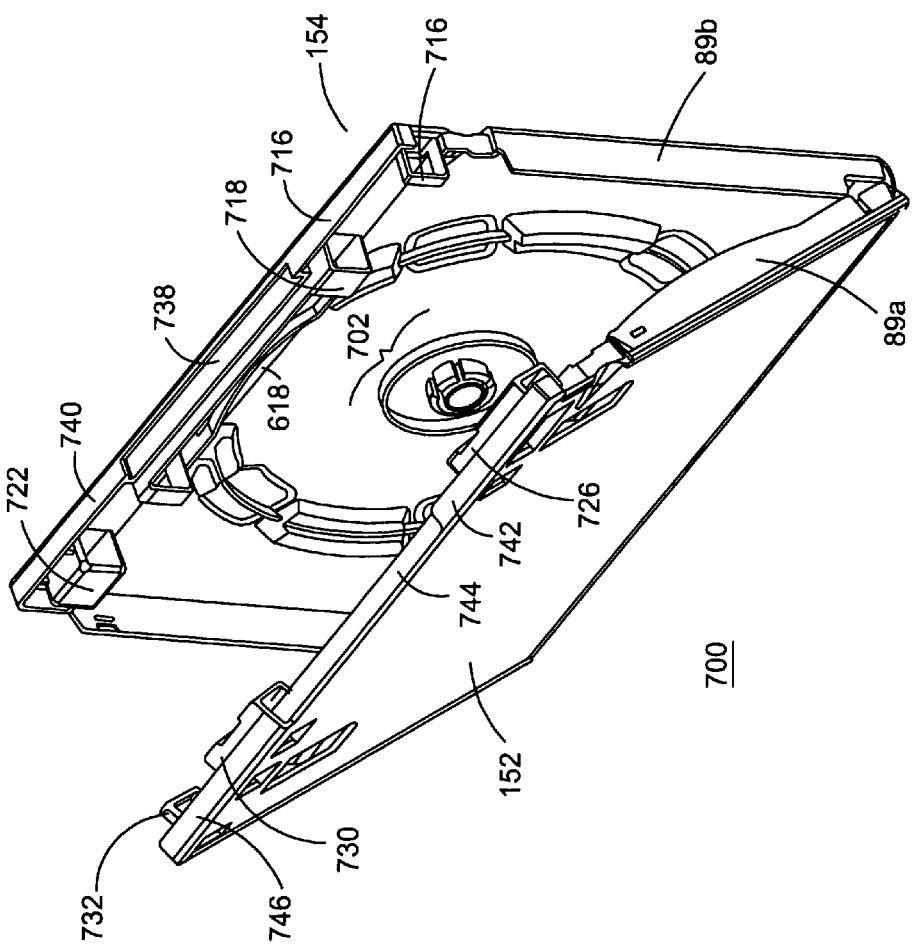
FIG. 9 is a perspective view of the storage case of FIG. 2 partially closed.
Figure 10:
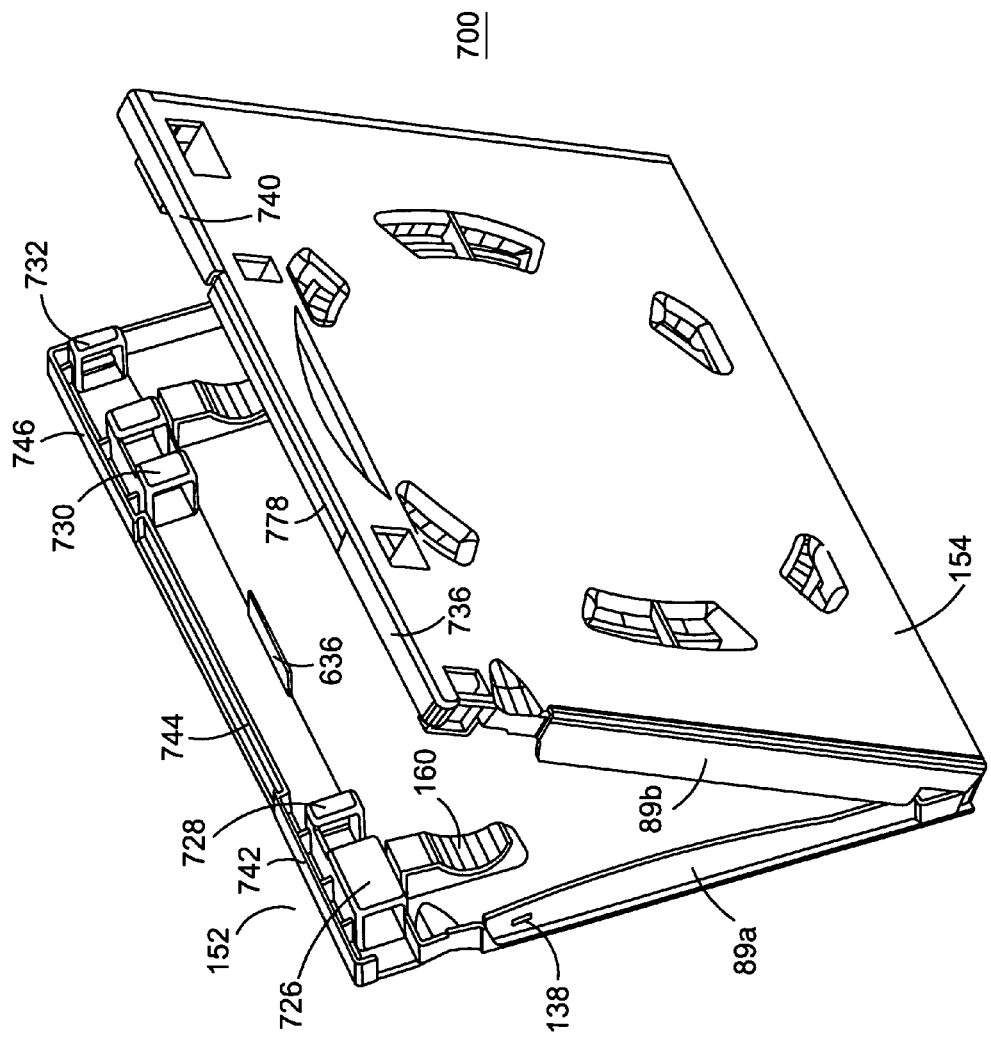
FIG. 10 is a perspective view of the storage of FIG. 2 partially closed.

Referring now to FIGS. 9 and 10 when storage case 700 is to be used to protect storage medium 70, top cover 152 is pivoted about pivot point 55 toward bottom cover 154 and bottom cover 154 is pivoted about pivot point 55 toward top cover 152. Loops 716, 718, 720, 722, 726, 728, 730 and 732 are disposed on bottom cover 154 and top cover 152, respectively, in an interleaving relationship. For example, first loop 726 fits between first loop 716 and second loop 718 and fourth loop 722 fits between third loop 730 and fourth loop 732.

Figure 11:
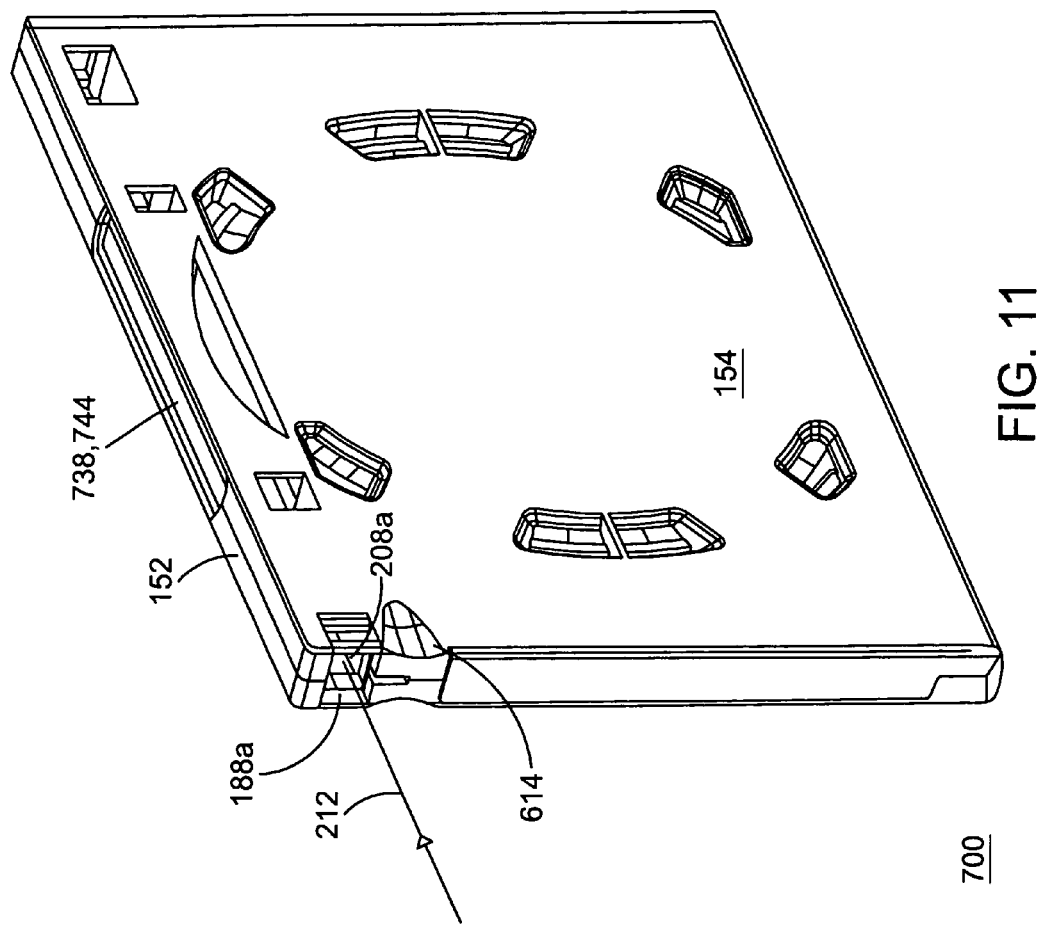
FIG. 11 is a perspective view of the storage case of FIG. 2.

Referring now also to FIG. 11, when storage case 700 is closed, lock insertion path 188 and lock insertion path 208 communicate with each other and combine to form a combined lock insertion path or channel 212. Combined lock insertion path 212 begins with the combination of open portions 188a and 208a and terminates with the combination of wall portions 188b and 208b. Storage case 700 is now ready to receive a lock in accordance with certain aspects of the invention. If storage case 700 is being displayed in a sell-through or retail environment, a shrink wrap could now be placed over storage case 700 in preparation of receipt of a lock in accordance with the invention.

Referring to FIGS. 12-15, there is shown a lock 400 in accordance with certain aspects of the invention. Lock 400 can be inserted into combined lock insertion path 212 to lock system 700 in a closed position, much like the way a deadbolt functions to lock a door in the closed position. Lock 400 may be made of any of the known materials, or by any of the known methods. Preferably, lock 400 is made of an acetyl homopolymer such as DUPONT DELTIN 500T and includes an extended rib portion 402 terminating in a wall 404. Lock 400 also includes a first catch mechanism 406 and a second catch mechanism 408. A catch mechanism may be moved to a position outside the periphery of base 426. This position may be referred to as a "third position." First catch mechanism 406 and second catch mechanism 408 include a first and second pin holding portion 410, 412 respectively. As shown most clearly in FIG. 15, each pin holding portion receives a pin 250, 252 so that a longitudinal axis of the pin is perpendicular to a longitudinal axis of lock 400. A notch portion 414, 416 is disposed in each pin holding portion 410, 412 facing wall 404. Each pin holding portion 410, 412 includes a curved front portion 411, 413 that facilitates insertion of lock 400 into a system of the invention. Pin holding portions 410, 412 further include latches or straight portions 407, 409 which engage hook edges 734, 724 of top lock portion 192 and bottom lock portion 172 respectively. In one embodiment, the walls which form notch 414, 416 form an angle which is approximately 35°. The benefits of notches 414, 416 will be explained below.

Each pin holding portion 410, 412 further includes a hook 418, 420 which is effective to mate with a corresponding hook 422, 424 of base 426 of lock 400. Each pin holding portion 410, 412 is connected to base 426 through respective spring arms 428, 430. As can be discerned from FIG. 11, spring arms 428, 430 are not as tall as the rest of base 426 nor as tall as the spring arms shown in some of the previous embodiments. These thinner spring arms are relatively easier to move and rotate when assembling lock 400. Referring also to FIGS. 16a, 16b, 16c and 16d, there is shown a more detailed view of spring arm 428. It should be understood that the structure of spring arms 428 and 430 is virtually identical and so a discussion of only spring arm 428 is presented for the sake of brevity.

Spring arm 428 is connected to base 426 through a spring arm notch 432. Notch 432 serves as a hinge about which pin holding portion 410 can be rotated. Spring arm 428 includes a stem portion 434, which in some embodiments (not shown) may be arcuate, and a recessed portion 436. Stem portion 434, recessed portion 436, and spring arm notch 432 serve to bias spring arm 428 outwardly away from base 426. Focusing also on FIGS. 14 and 15, when lock 400 is manufactured, first and second catch mechanisms 406, 408 are bent outwardly away from base 426 due to the biasing produced by spring arm notch 432, recessed portion 436 and arcuate portion 434. A manufacturer then simply inserts pins 250, 252 into pin holding portions 406, 408 and then moves pin holding portions 406, 408 against this biasing force toward base 426 and mates hooks 418, 420 with hooks 422, 424.

Referring again to FIG. 12, lock 400 further includes a security tag recess 748 which may optionally receive and retain a security tag (not shown). A disc and shelf receiving recess 750, which may be referred to as a "groove," defined by walls 752 and 754 extends from a portion of lock 400 proximate to second catch mechanism 408 to an end of lock 400 distal from wall 404. Also distal from wall 404 is a sharpened edge 756 which could be used to pierce a shrink wrap disposed around system 700.

Figure 16A:
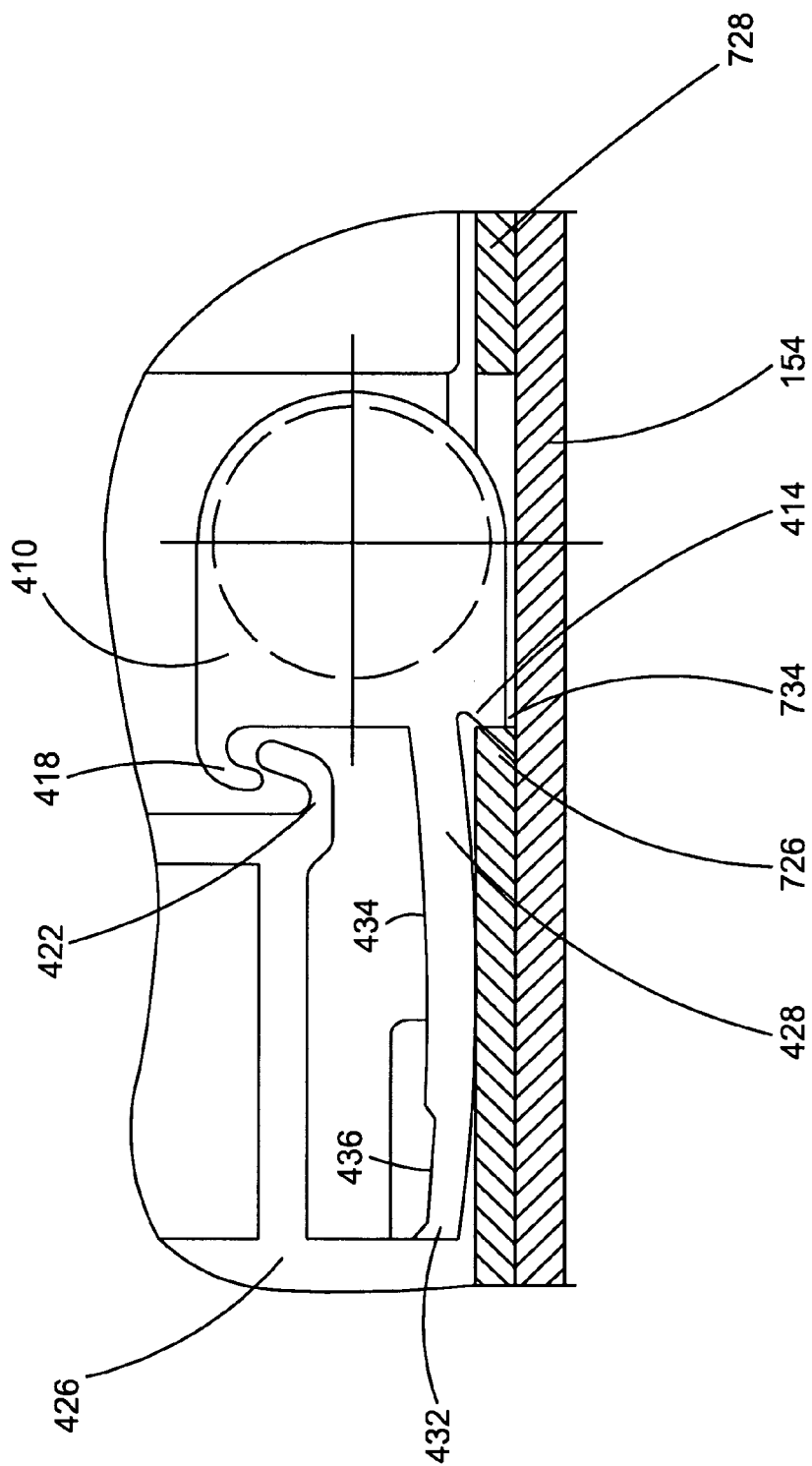
FIG. 16a is a side cut-away view drawing of a lock disposed in a storage case.
Figure 16B:
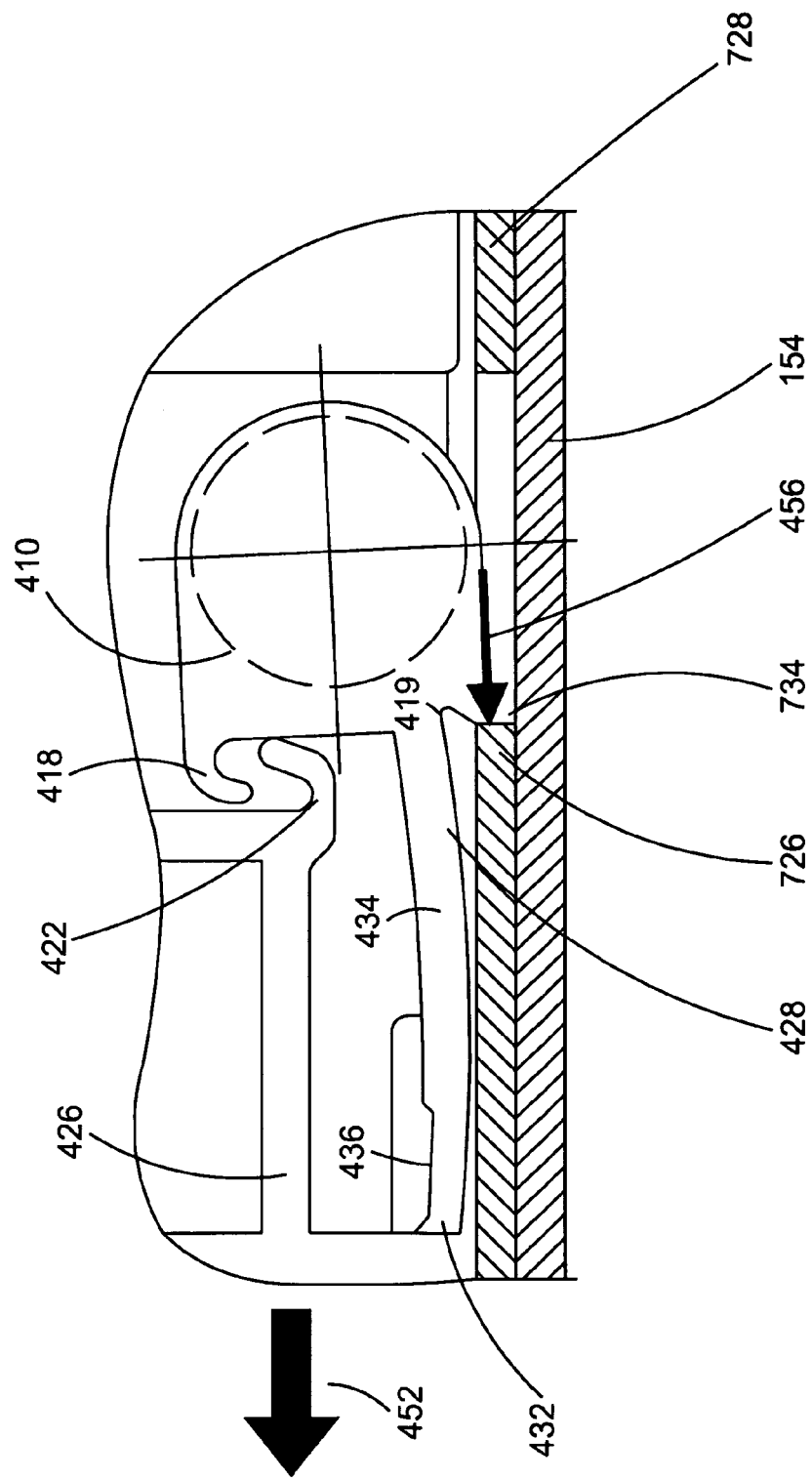
FIG. 16b is a side cut-away view of a lock disposed in a storage case as in FIG. 16a and illustrating resultant forces when a force is applied in an attempt to remove the lock from the storage case.
Figure 16C:
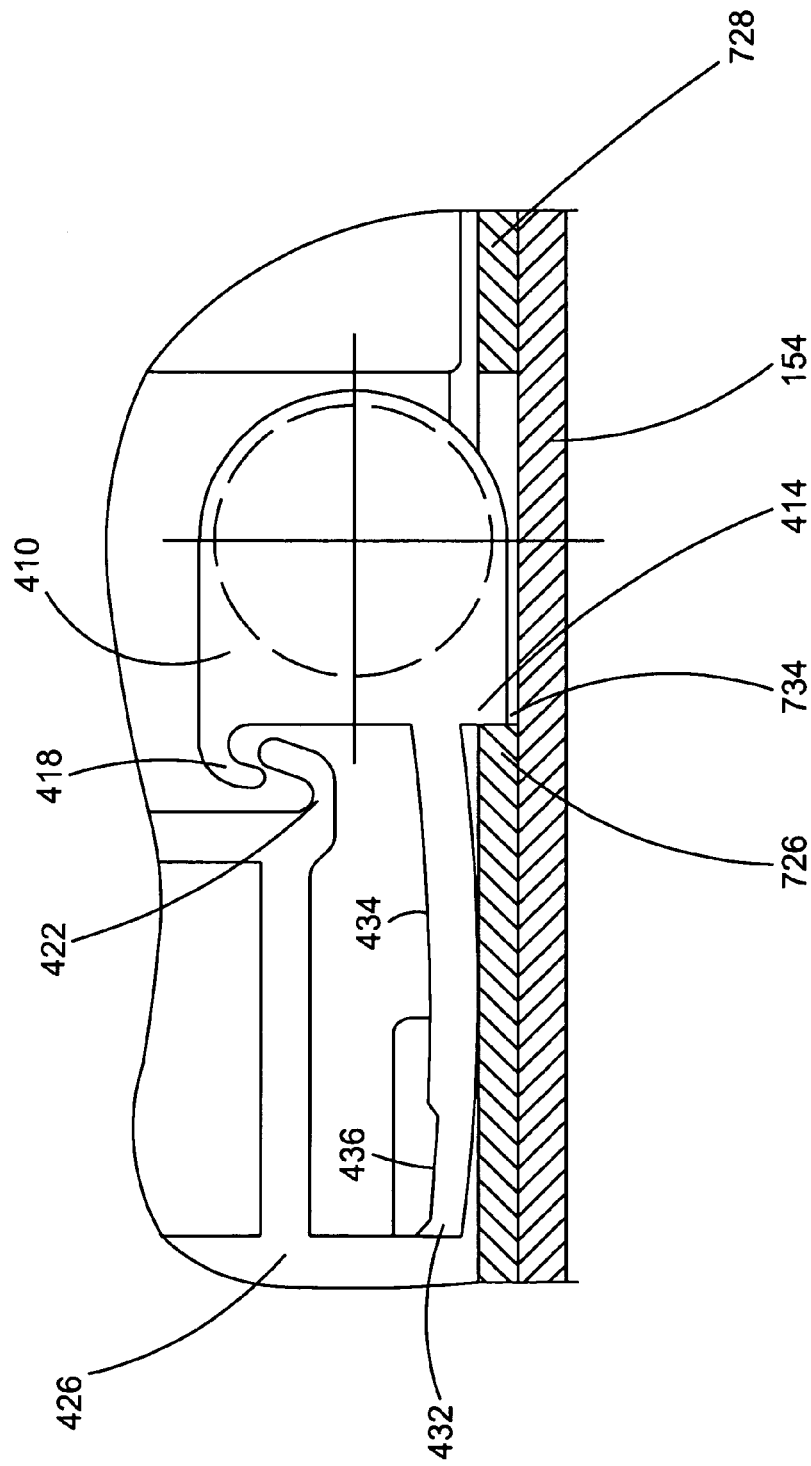
FIG. 16c is a side cut-away view of another lock disposed in a storage case.
Figure 16D:
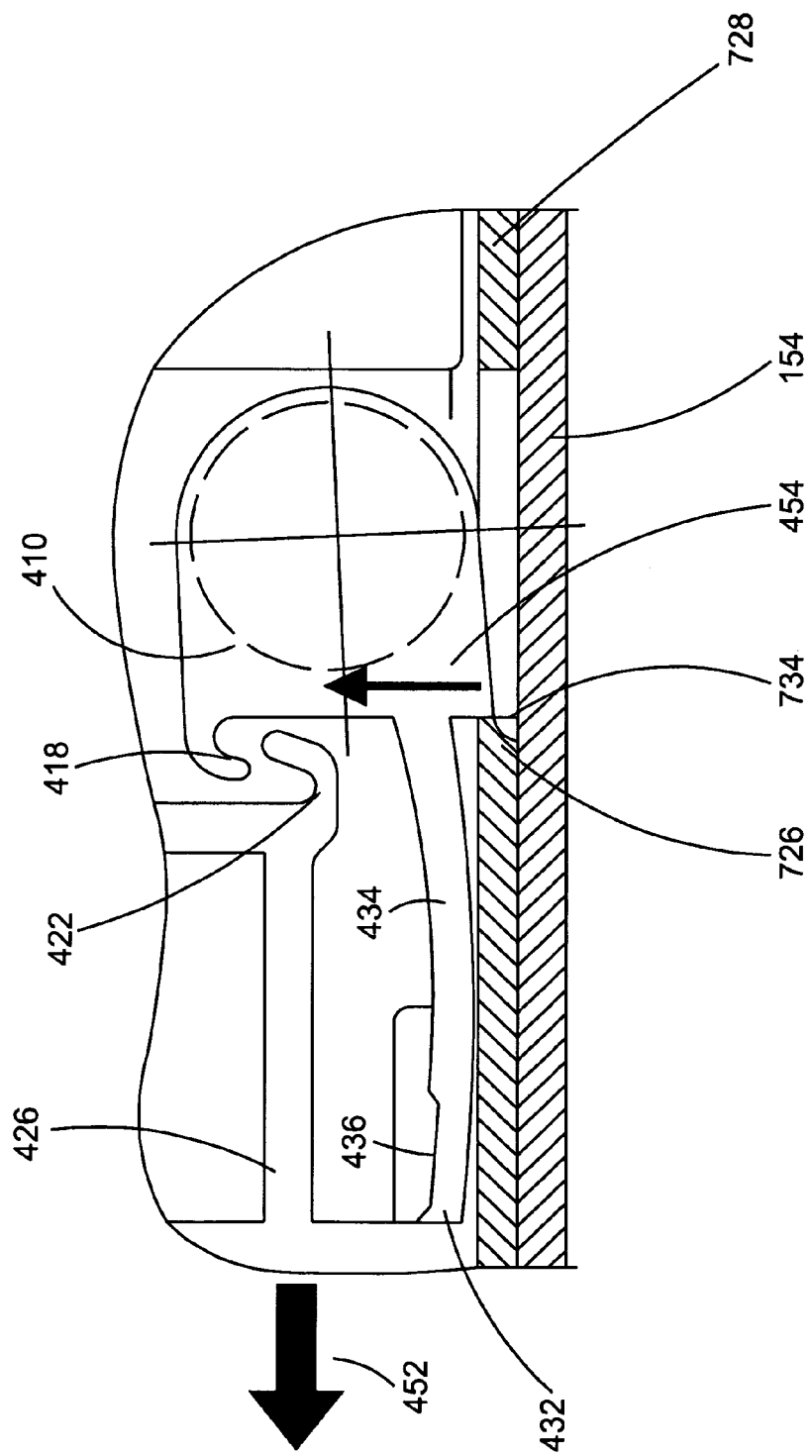
FIG. 16d is a side cut-away view of a lock disposed in a storage case as in FIG. 16c and illustrating resultant forces when a force is applied in an attempt to remove the lock from the storage case.
Figure 16E:
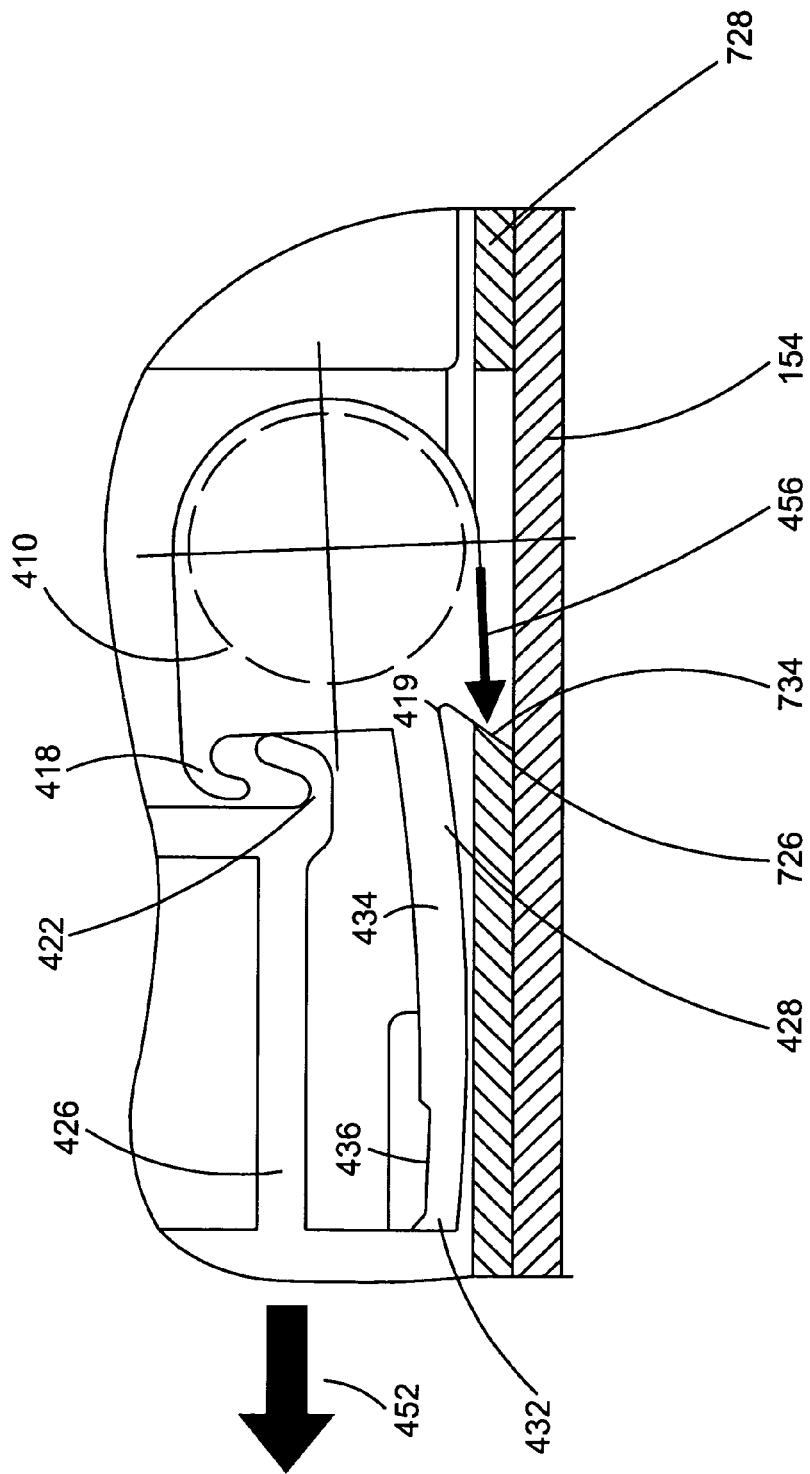
FIG. 16e is a side cut-away view of the lock of FIG. 16a disposed in a modified storage case.
Figure 17:
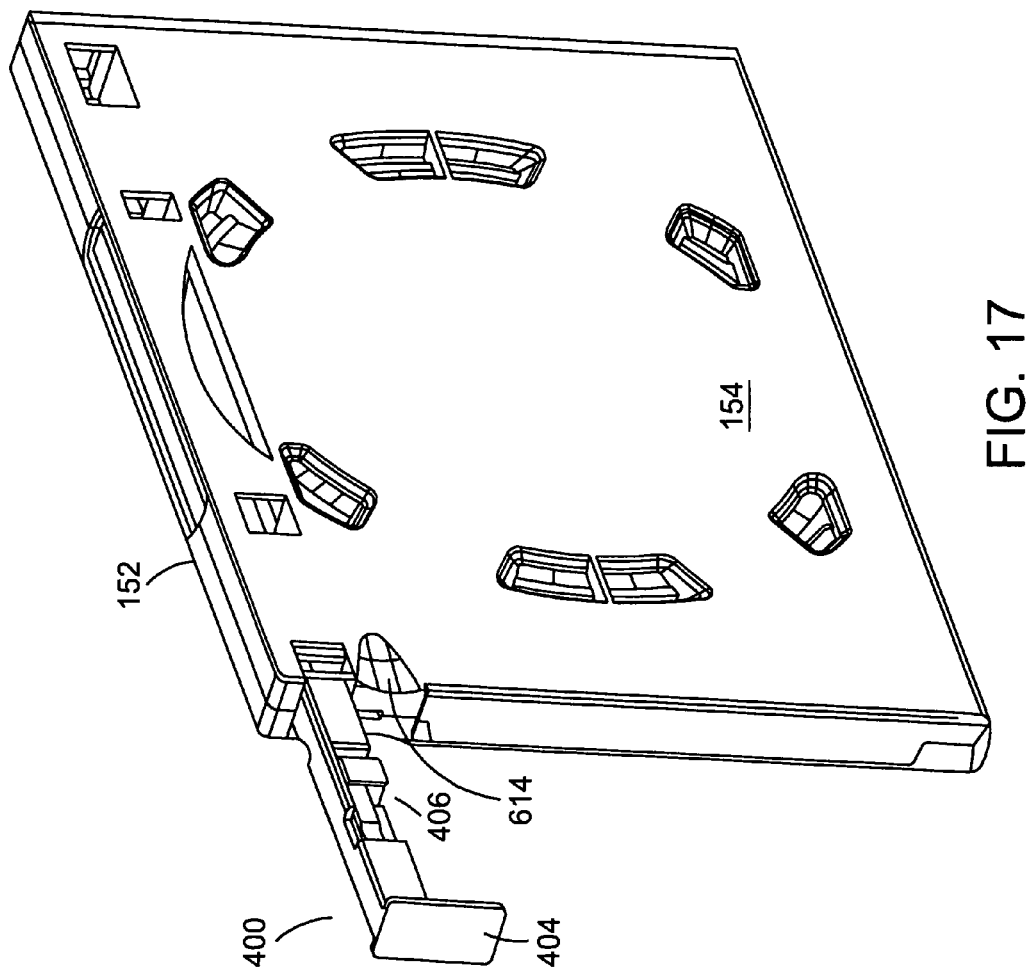
FIG. 17 is a perspective view of the lock of FIG. 12 and the storage case of FIG. 2 closed in accordance with the invention.

In use, after storage case 700 is closed, lock 400 is inserted into combined lock insertion path 212 as is shown in FIG. 17. Referring to FIGS. 5, 8, 12, 13, and 16a, 16b, 16c, 16d, 16e and 17, lock 400 is oriented so that edge 756 is inserted into combined lock insertion path 212, first catch mechanism 406 is inserted with pin holding portion 410 facing toward bottom cover 154, and second catch mechanism 408 is inserted with pin holding portion 412 facing top cover 152.

Figure 18:
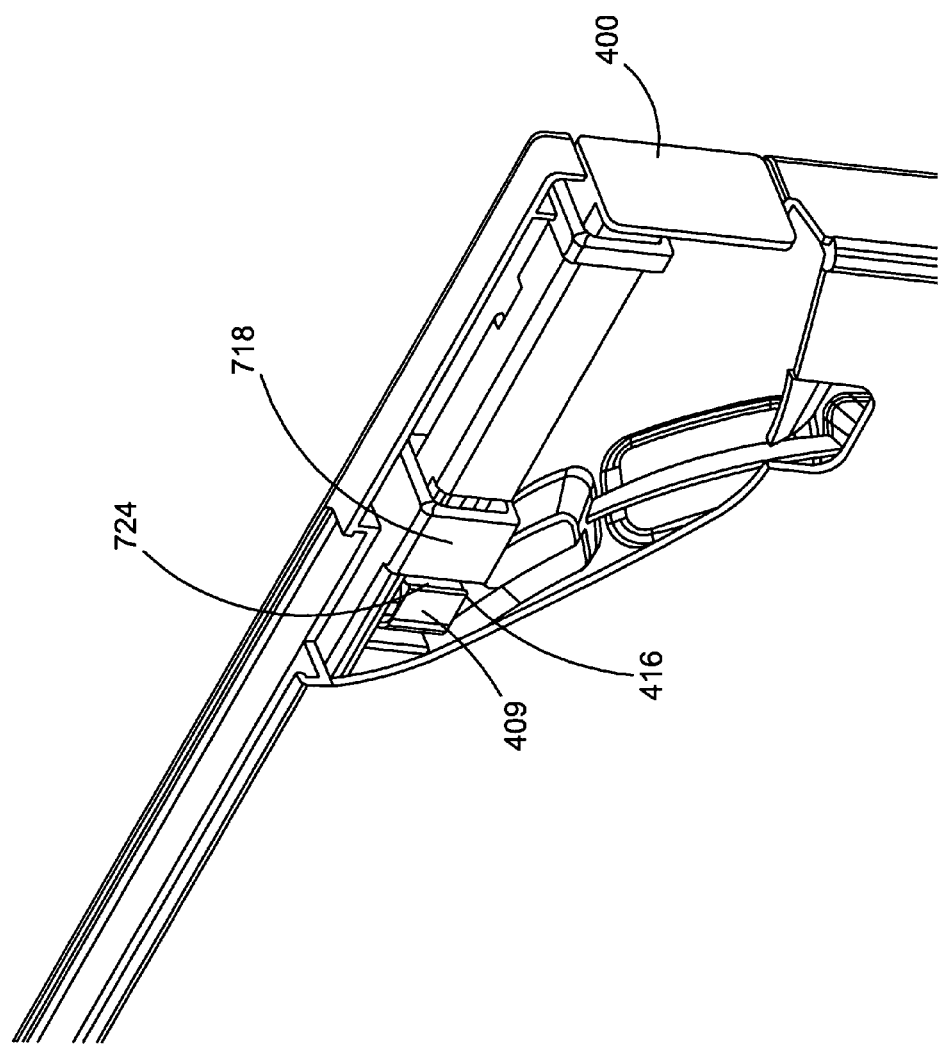
FIG. 18 is a magnified perspective partially cut-away view of the storage case of FIG. 2 combined with the lock of FIG. 12 in accordance with certain aspects of the invention.
Figure 19:
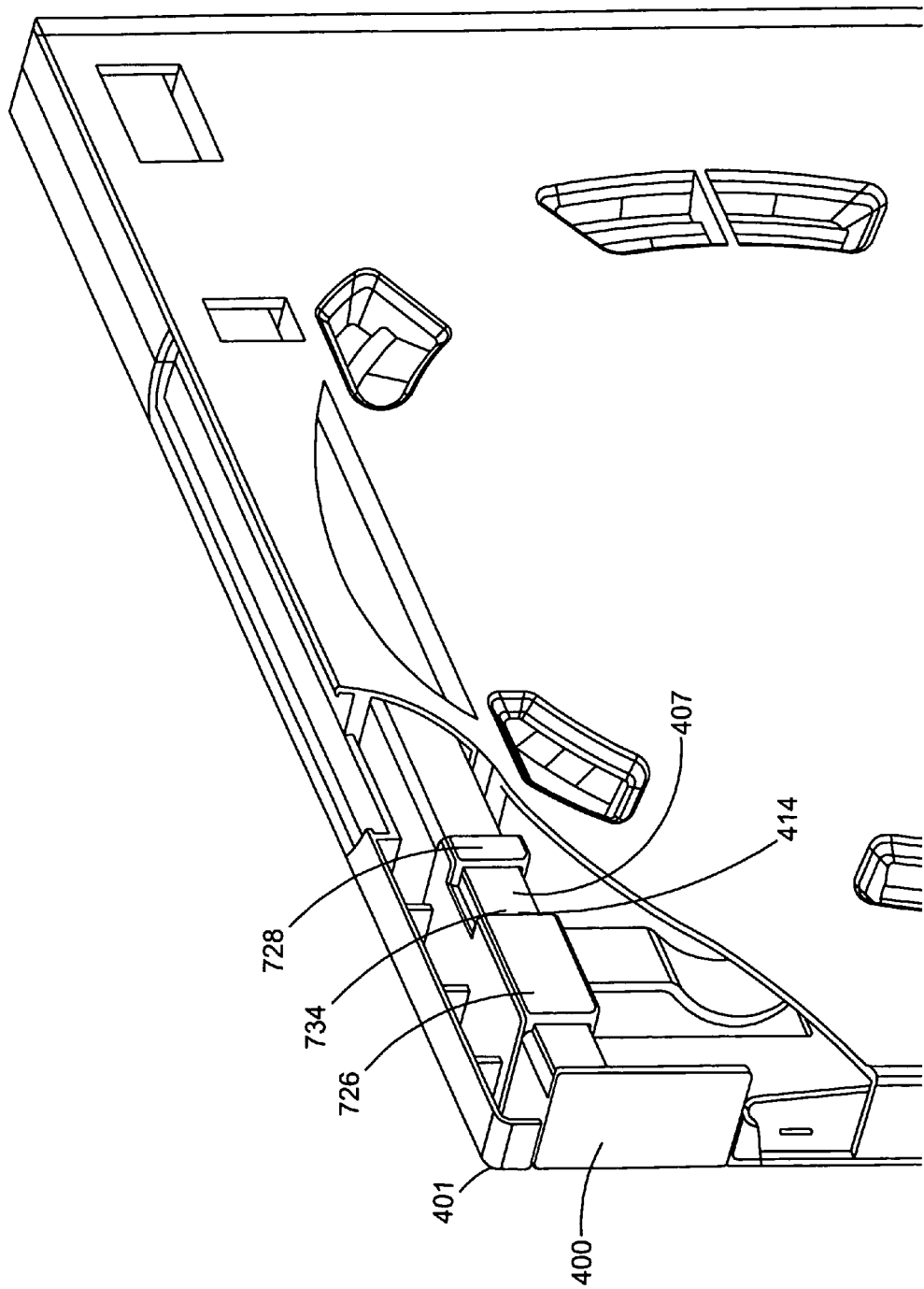
FIG. 19 is a magnified perspective partially cut-away view of the storage case of FIG. 2 combined with the lock of FIG. 12 in accordance with certain aspects of the invention.
Figure 20:
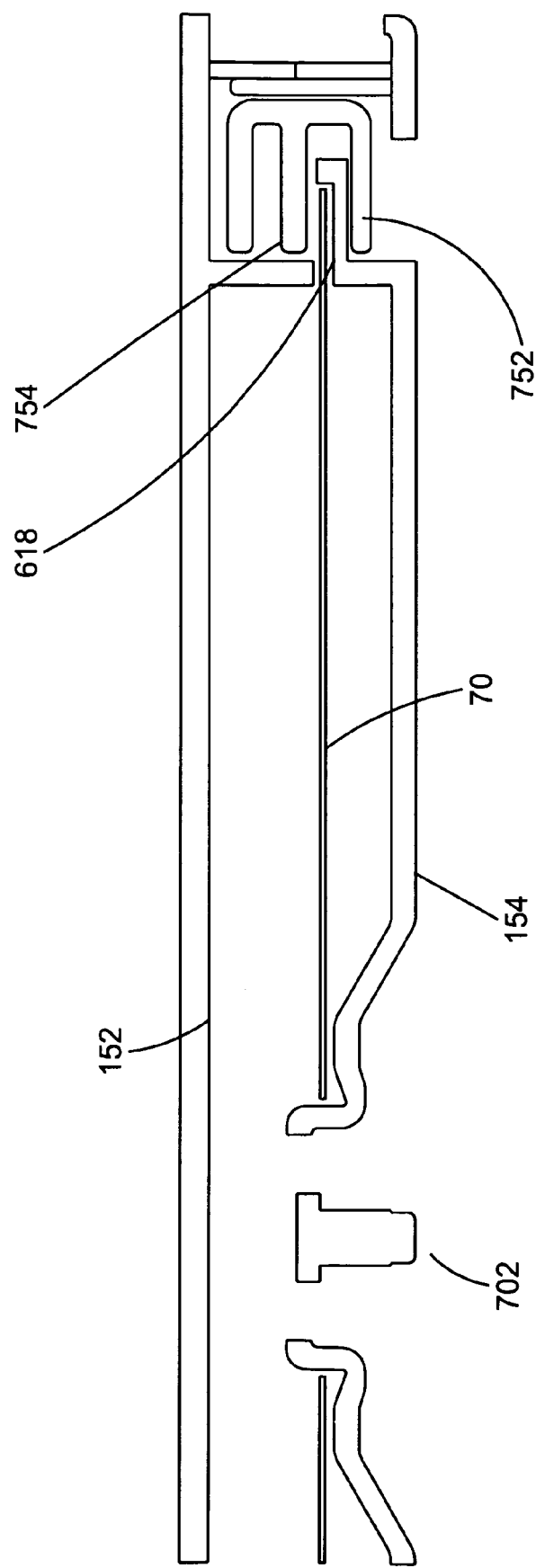
FIG. 20 is a side cut-away view of the storage case of FIG. 2 combined with the lock of FIG. 12 in accordance with the invention.

Referring also to FIGS. 18 and 19, as lock 400 is inserted into combined lock insertion path 212, the walls of first loops 716, 726 and second loops 718, 728 engage curved fronts 411, 413 of pin holding portions 410 and 412. These walls compress spring arms 428, 430 and cause pin holding portions 410, 412 to move into voids 438, 440. To accommodate for this movement, walls 442, 444 proximate to pin hold portions 410, 412 are thinner than adjacent walls 446, 448. Walls 442, 444 may also include an arcuate recess (not shown) to facilitate movement of pin holding portions 410, 412 by effectively increasing the size of voids 438, 440. Additionally, when lock 400 is inserted into storage case 700, walls 752 and 754 slide around recording medium 70 and shelf 618, support recording medium 70 on shelf 618, and inhibit access to recording medium 70 as is shown best in FIG. 20.

When lock 400 is inserted far enough into combined lock insertion path 212, straight portion 407 of pin holding portion 410 engages hook edge 734 of top cover 152. Similarly, straight portion 409 of pin holding portion 412 engages hook edge 724 of bottom cover 154. At this point, first loop 726 no longer provides a force on spring arm 428 and second loop no longer provides a force upon spring arm 430. The natural biasing force of spring arms 428, 430 now causes pin holding portions 410, 412 to move outwardly thereby causing notches 414, 416 to engage with hook edges 734, 724 respectively as is seen most clearly in FIGS. 18 and 19. Lock 400 is now securely held within combined lock insertion path 212 and inside of storage case 700, e.g., FIGS. 18, 19, 21, and can not easily be pulled out by a user. As a result, top cover 152 is securely held together with bottom cover 154. Moreover, lock 400 is substantially within an outer periphery 401 of case 700 to give the case a smooth and non-bulky appearance.

Referring again to FIGS. 16a, 16b, 16c and 16d, some of the benefits of notch 414, 416 will now be explained. As shown in FIGS. 16c and 16d, when lock 400 is disposed in storage case 700, pin holding portion 410 engages hook edge 734 of top cover 152. Focusing on FIG. 16d, if a potential thief were to pull lock 400 without notch 414 in the direction shown by arrow 452, hook edge 734 may provide a force upon pin holding portion 410 (shown by arrow 454) which may lift pin holding portion 410 out of engagement with hook edge 734 and allow the thief to remove lock 400. To prevent against this possibility, notches 414, 416 are provided. As shown in FIG. 16b, should a thief attempt to pull lock 400 with notch 414 out of storage case 700, hook edge 734 will engage notch 414 thereby further entrenching lock 400 within storage case 700 (as shown by arrow 456) and preventing removal by the potential thief. Lock 400 thus acts like a deadbolt for storage case 700.

Preferably, hook edges 734, 724 are chamfered by any of the known methods to allow edges 734, 724 to more securely engage notches 414, 416. For example, referring now to FIG. 16e, hook edge 734 is chamfered, preferably at a 45 degree angle with respect to the top of the first lock loop 726. In this way, if a user pulls lock 400 in the direction of arrow 452, pin holding portion 410 will be further entrenched within storage case 700 (as shown by arrow 456) by the interaction of chamfered hook edge 734 with notch 414. Hook edge 724 can be chamfered in a similar manner with like effect, not shown.

Figure 21:
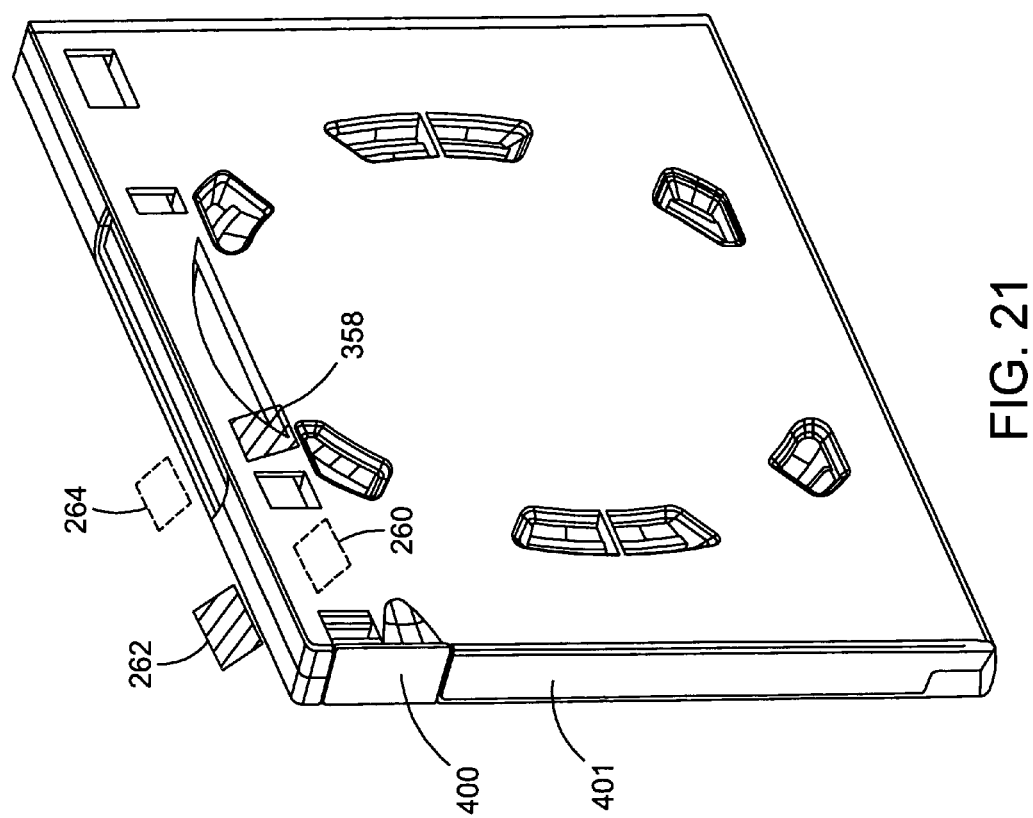
FIG. 21 is a perspective view of the storage case of FIG. 2 locked and illustrating how a lock may be removed from the storage case.

Referring to FIG. 21, to remove lock 400, a magnet 258 is placed near pin holding portion 412 and emits a magnetic field which attracts pin 252 disposed therein against the biasing force of spring arm 430 thereby causing notch 416 to recede from hook edge 724. At the same time, a magnet 262 is placed near pin holding portion 410 and emits a magnetic field which attracts pin 250 disposed therein against the biasing force of spring arm 428 thereby causing notch 414 to recede from hook edge 734. Once magnets 258, 260 are so oriented, lock 400 is safely removed from combined lock insertion path 212 by safely sliding lock 400 out of combined lock insertion path 212.

Alternatively, a magnet 264 (shown in phantom) can be placed near pin holding portion 412 which emits a magnetic field that repels a pin disposed therein against the biasing force of spring arm 430 thereby causing latch notch 416 to recede from hook edge 724. At the same time, a magnet 260 (also shown in phantom) is placed near pin holding portion 410 and emits a magnetic field which repels a pin disposed therein against the biasing force of spring arm 428 thereby causing notch 414 to recede from hook edge 734.

Other options for removing lock 400 from system 700 include using a combination of magnets 262 and 264 or magnets 258 and 260. Upon application of the magnets, lock 400 is now free to be extricated from system 700 and system 700 can thereafter be opened. Pins 250, 252 thus provide a mass available to be acted upon by the magnetic field generated by magnets 258-264 thereby facilitating removal of lock 400 through the movement of pin holding portions 410, 412, holding pins 250 and 252. Pins 250, 252 should be sized to provide this additional mass.

Figure 3:
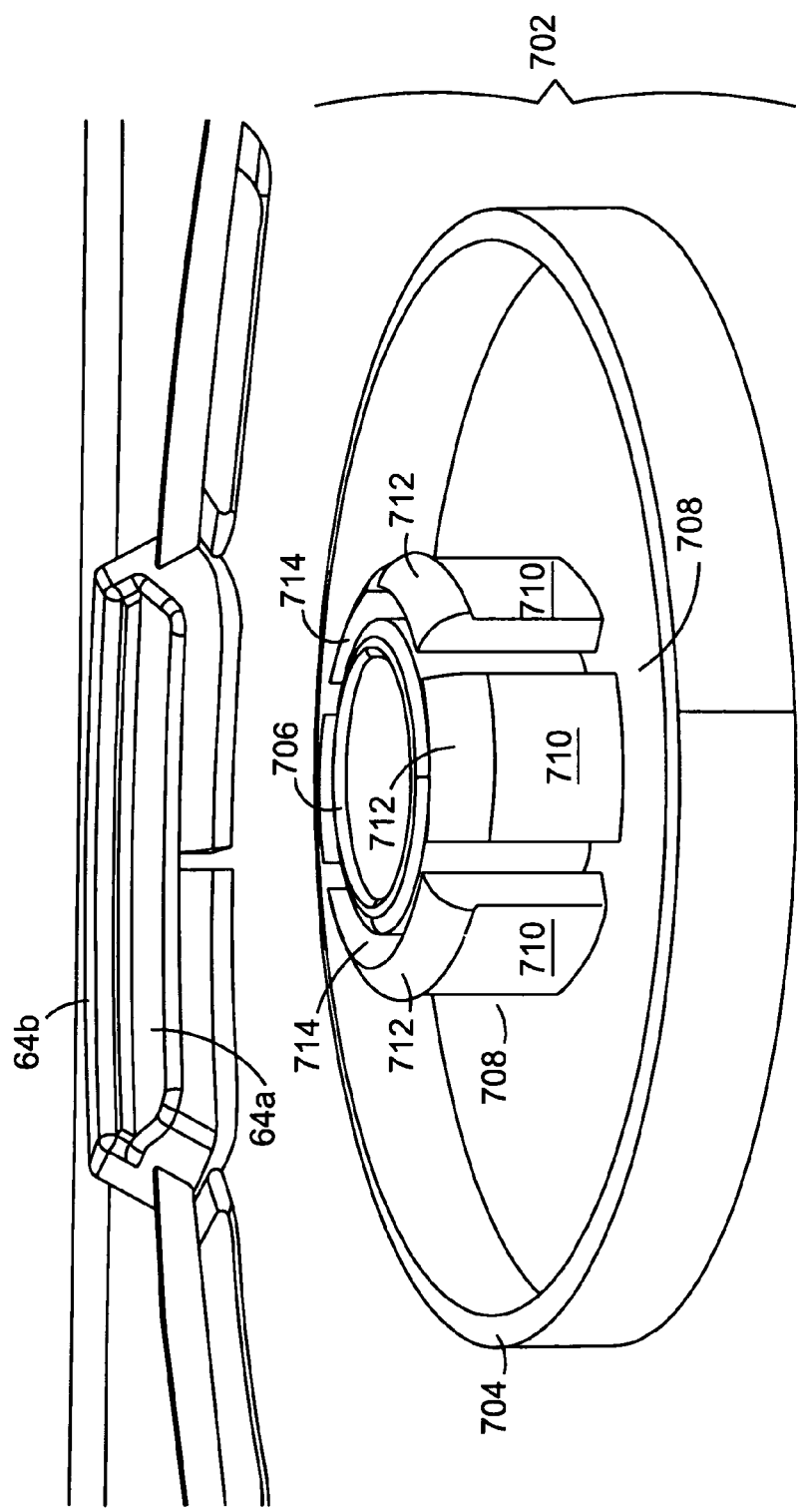
FIG. 3 is a perspective magnified view of a hub used in accordance with certain aspects of the invention.

Referring now to FIGS. 2 and 3, hub 702 is centered on bottom cover 154 both horizontally and vertically to assist in manufacturing using existing automated equipment. Hub 702 includes an outer ring 704 and an inner ring 706. Disposed proximate to and radially about inner ring 706, are a plurality of tabs 708. Six tabs 708 are shown but clearly any number could be used. Each tab 708 includes a base portion 710 and a head portion 712. Head portion 712 extends radially outward from base portion 710 so that the circumference of a circle drawn around head portions 712 is larger than a circumference of opening 72 of recording medium 70 (FIG. 1). The positioning of tabs 708 with respect to inner ring 706 defines a void 714 therebetween. Bases 710 of tabs 708 are pliant so that tabs 708 can be moved into void 714 upon the application of sufficient force. Bases 710 are also resilient in that they will return to a generally upright position (i.e. substantially perpendicular to a plane defined by bottom cover 154) when such a force is removed.

In use, when recording medium 70 is to placed upon hub 702, opening 72 is placed around heads 712. A downward force is applied upon recording medium 70 and causes heads 712 to bend inwardly into void 714 due to the engagement of unused portion 74 with protrusion heads 712. Upon the application of sufficient downward force upon recording medium 70, tabs 708 will bend inwardly far enough so that the circumference around heads 712 will be less than the circumference of opening 72 thereby allowing recording medium 70 to be placed upon outer ring 704 with opening 72 being coextensive with inner ring 706. At this point, unused portion 74 no longer applies a force upon heads 712 and tabs 708 resume their original position due to their natural resiliency. Heads 712 now retain recording medium 70 on outer ring 704 and feet 64 with minimal stress on medium 70. In order to remove recording medium 70, a user will place his fingers in finger access holes or recesses 66, and lift off recording medium 70 therefrom with minimal effort. In this way, recording medium 70 can be safely placed upon and removed from hub 702 without being damaged.

Referring again to FIG. 2, in order to support the outer edges of recording medium 70 to prevent the medium from tipping off of hub 702, bottom cover 154 includes upper holding portions 58 and lower holding portions 60. These portions support outer edge portions of recording medium 70 when disposed on hub 156. Upper holding portions 58 are arranged in a semi-circle about hub 156 and lower holding portions 60 are disposed symmetric to upper holding portions.

Figure 4:
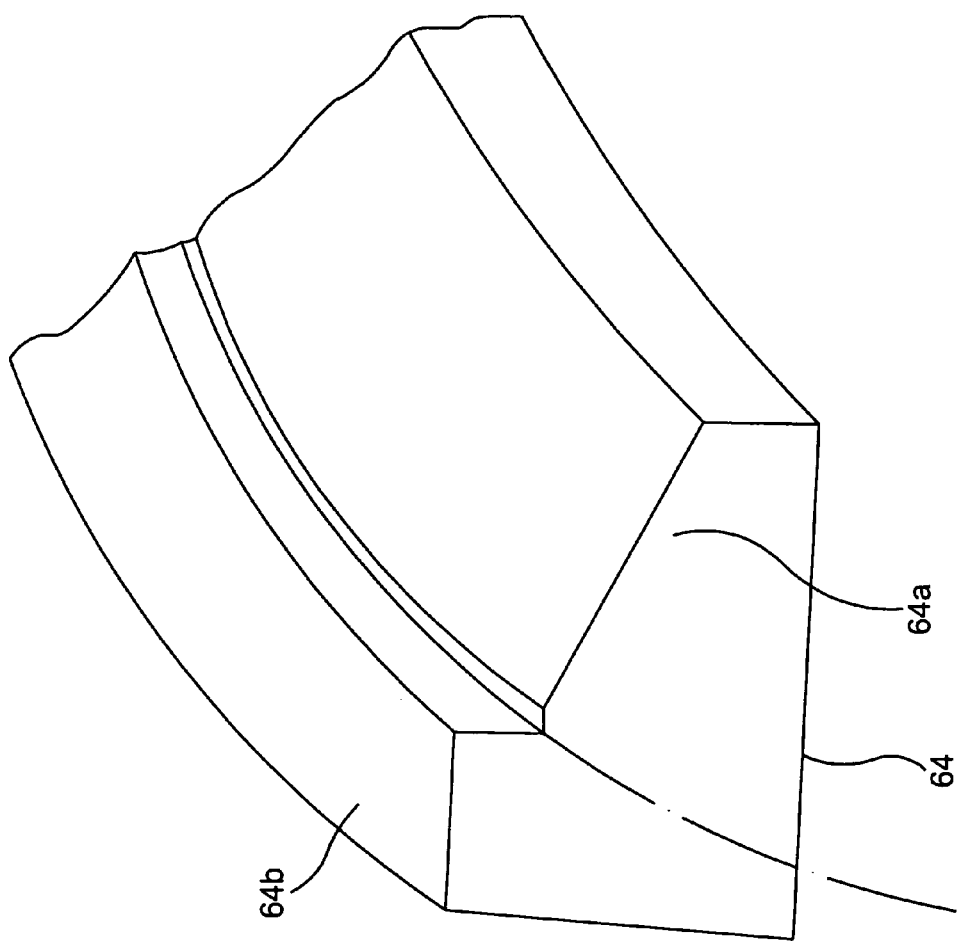
FIG. 4 is a perspective magnified view of a foot disposed on a bottom cover of the storage case of FIG. 2.
Figure 5:
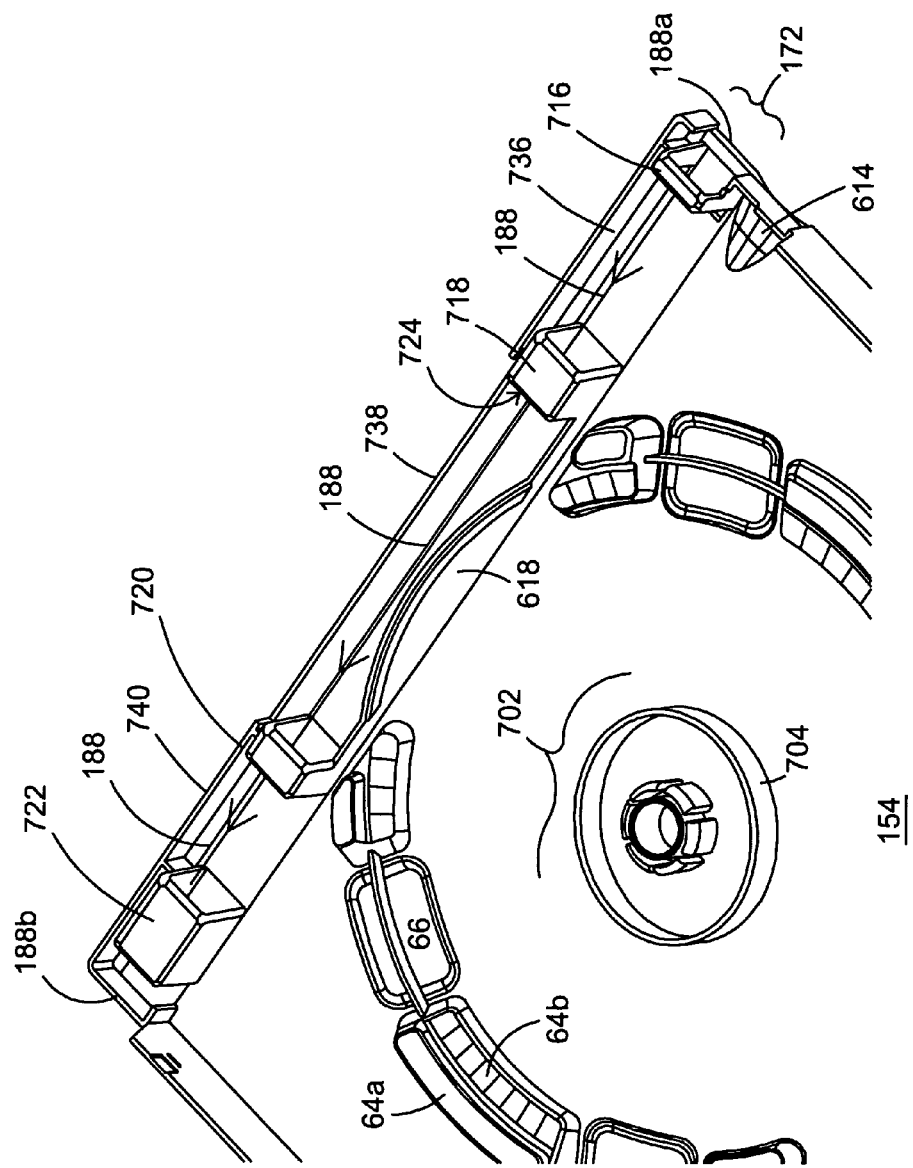
FIG. 5 is a perspective magnified view of a portion of the bottom cover of the storage case of FIG. 2.
Figure 6:
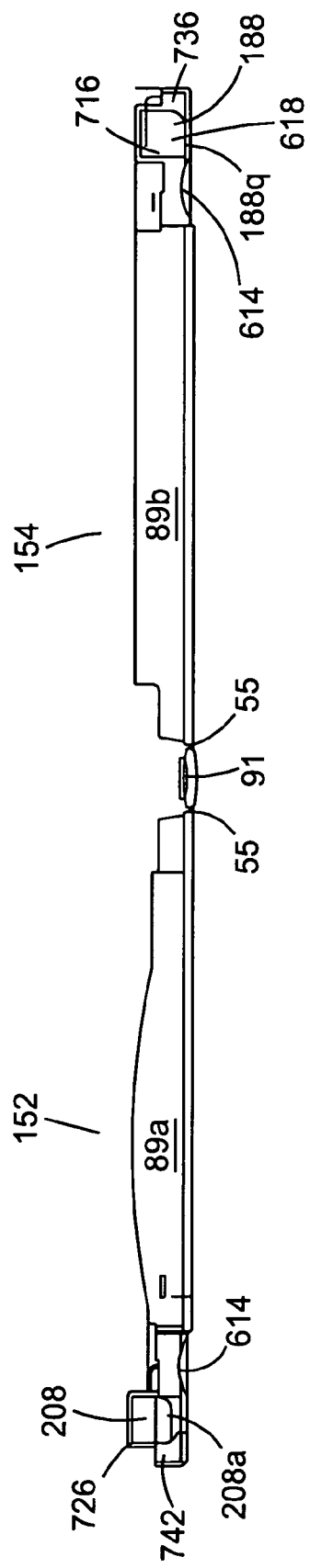
FIG. 6 is a front view of the storage case of FIG. 2.
Figure 7:
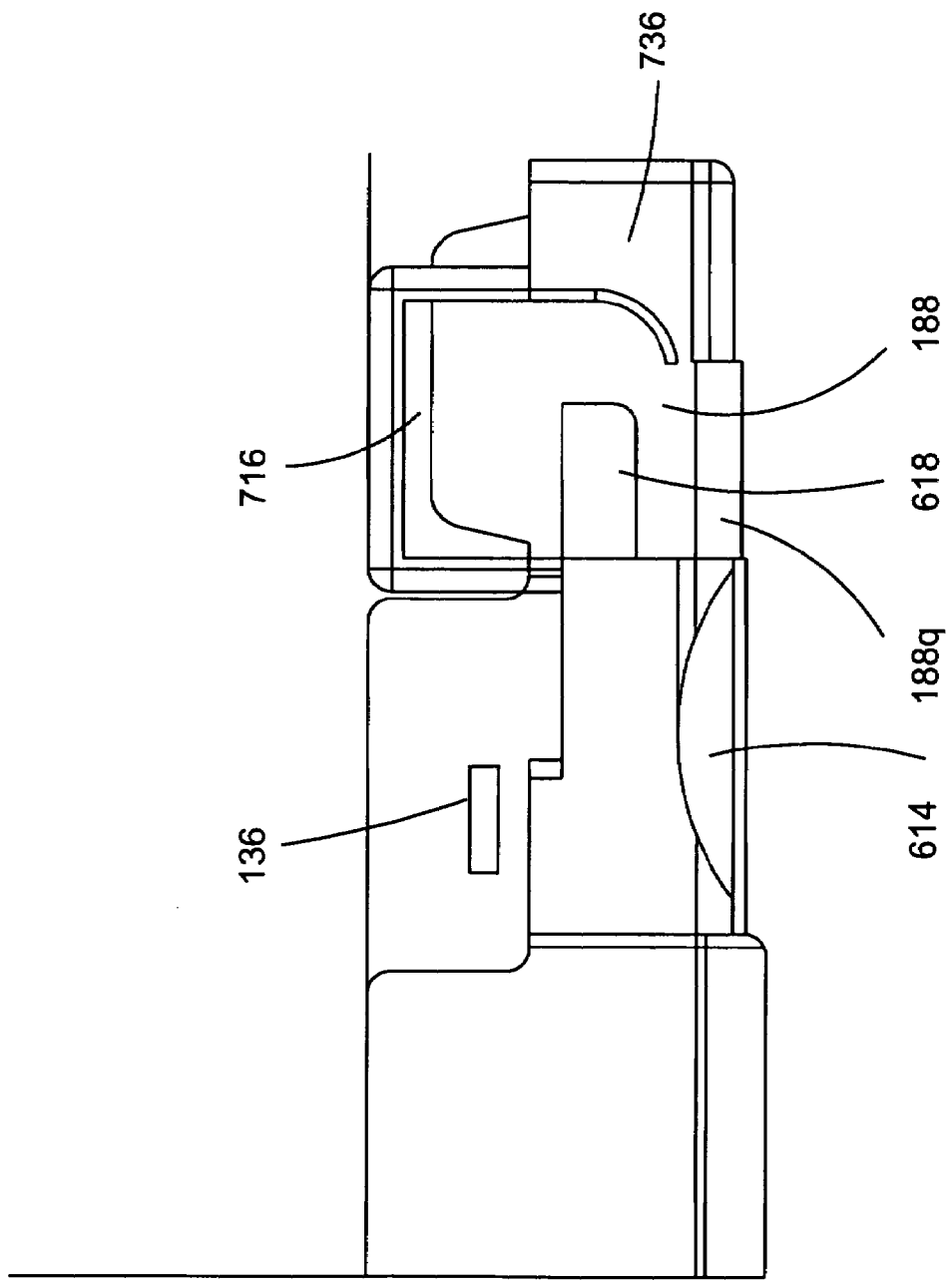
FIG. 7 is a front magnified view of a portion of the storage case in FIG. 2.

Referring now also to FIG. 4, both upper and lower holding portions 58, 60, are comprised of a plurality (three are shown in the figures) of arcuate shaped feet 64 separated by recesses 66. Each foot 64 is comprised of a protrusion having an L-shaped cross-section including a first protrusion 64a which extends upwardly from bottom cover 154 to a height which is lower than a height of a second protrusion 64b which also extends upwardly from bottom cover 154.

Feet 64 are arranged on bottom cover 154 to follow the general contour of recording medium 70. In this way, the outer edges of recording medium 70 are caused to rest on feet 64. In FIG. 4, for example, feet 64 are arranged to follow the circular contour of a round recording medium such as a DVD. A first circle having a first diameter can be formed by connecting the tops of first protrusions 64a and a second circle having a second diameter larger than the first diameter can be formed by connecting the tops of second protrusions 64b. The diameter of the first circle (with first protrusions 64a) is further smaller than the diameter of recording medium 70. In contrast, the diameter of the second circle (with second protrusions 64b) is larger than the diameter of recording medium 70. In this way, outer edges of recording medium 70 can be placed on protrusions 64a (and hub 156) and kept in place by protrusions 64b. Clearly, feet 64 do not have to be arcuate in shape. They can, for example, extend in a straight line as long as the distance between second protrusions 64b disposed on opposite sides of hub 702 is greater than the diameter of recording medium 70; and the distance between first projections 64a disposed on opposite sides of hub 702 is less than the diameter of recording medium 70.

Feet 64 are spaced and arranged so that a user wishing to store or remove recording medium 70 from system 700 can grasp the circumferential edge of recording medium 70 using a plurality of his or her fingers without interference from feet 64. Recesses 66 are provided in between feet 64 to provide space for the user's fingers so that a user's fingers can engage the circumferential edge of recording medium 70 throughout the placement and removal of recording medium 70 from system 700.

Figure 22:
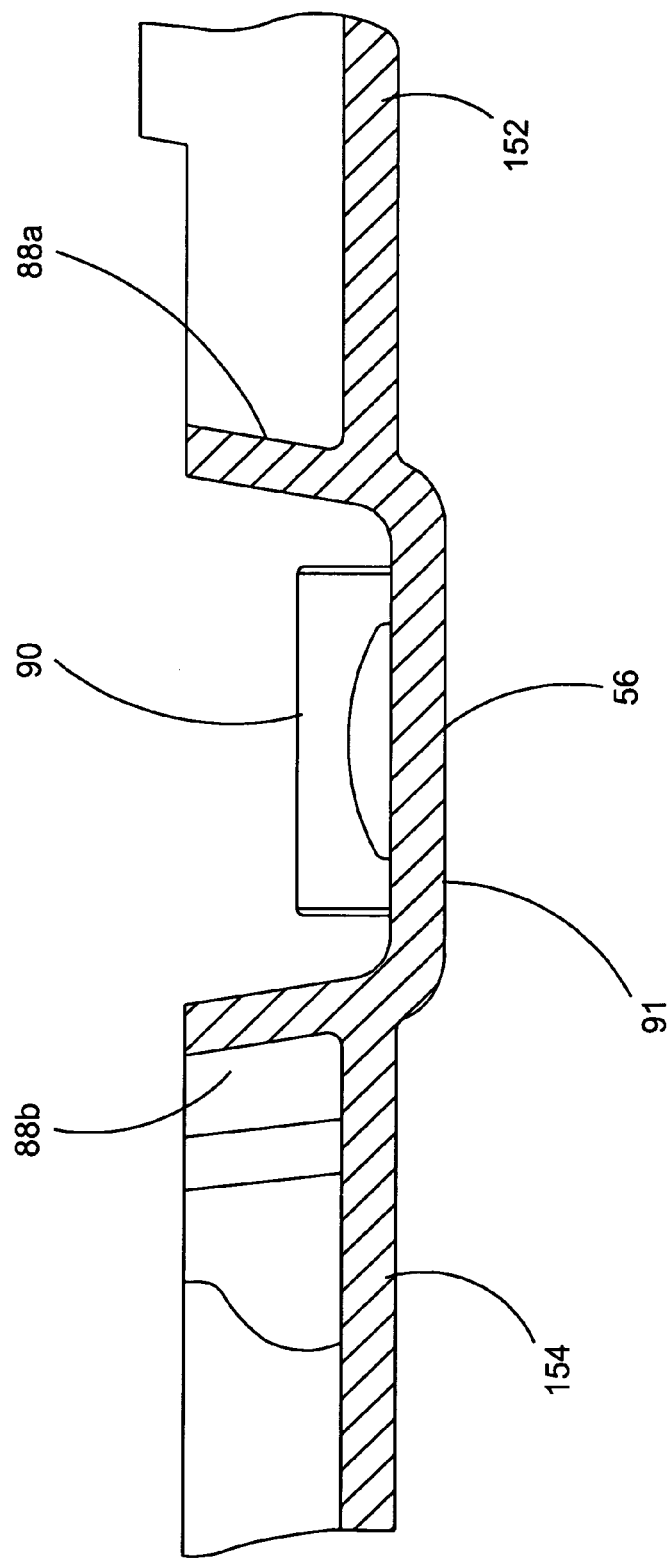
FIG. 22 is a front magnified view of a portion of the storage case of FIG. 2.

Referring to FIGS. 2 and 22, top and bottom covers 152, 154 include security features which prevent thieves from gaining access to medium 70 through spine 56 when storage case 700 is closed (and locked). The first security feature includes side walls 88a and 88b which extend along the length of spine 56 and have a height which is approximately equal to half the width of spine 56.

The second security feature includes "pi" shaped reinforcing members 90 located on opposite ends of spine 56 and extending upwardly therefrom. Reinforcing members 90 are comprised of a first portion extending perpendicularly to a longitudinal axis L of spine 56 and two portions extending in parallel with a longitudinal axis L of spine 56.

A third security feature of storage case 700 is the provision of semi-circular shaped spinal projections 91. Spinal projections 91 are disposed at opposing ends of spine 56 and extend upwardly from spine 56 in a direction that is substantially perpendicular to longitudinal axis L.

When storage case 700 is closed, side walls 88a, 88b, reinforcing member 90, and spinal projections 91 prevent thieves from gaining access to recording medium 70 by simply cutting spine 56 along its edges (i.e. pivot points 55). When top and bottom covers 152, 154 are closed together, side walls 88a and 88b meet and form a second wall disposed parallel to and internal of spine 56. If a thief, therefore, cuts spine 56, the second wall prevents access to storage medium 70. Reinforcing members 90 and spinal projections 91 provide further protection. If a thief were to try to cut spine 56 either horizontally or vertically in the area of either reinforcement members 90 or spinal projections 91, he or she would meet resistance due to the thickness of spine 56 being effectively increased due to the presence of reinforcing members 90 and spinal projections 91.

For additional security, top cover 152 further includes top side walls 89a disposed on either ends of top cover 152. Bottom cover 154 includes bottom side walls 89b disposed on either ends of bottom cover 154. All of top and bottom side walls 89a, 89b, extend substantially perpendicular to the longitudinal axis L of spine 56. Top side walls 89a are disposed closer to the center of top cover 152 when compared to the distance between bottom side walls 89b and the center of bottom cover 154. In this way, when top cover 152 is closed upon bottom cover 154, top side walls 89a sit behind bottom side walls 89b. This yields a double wall between the exterior of system 150 and a recording medium disposed on hub 156. Bottom side walls 89b may include a recess 136. Similarly, top side walls 89a may include a protrusion 138. In this way, when top cover 152 is closed upon bottom cover 154, protrusions 138, mate with recesses 136 to help maintain system 150 in a closed position. System 700 can include further security features like those described in U.S. Pat. No. 6,561,347, the entire disclosure of which is incorporated by reference herein.

Figure 23:
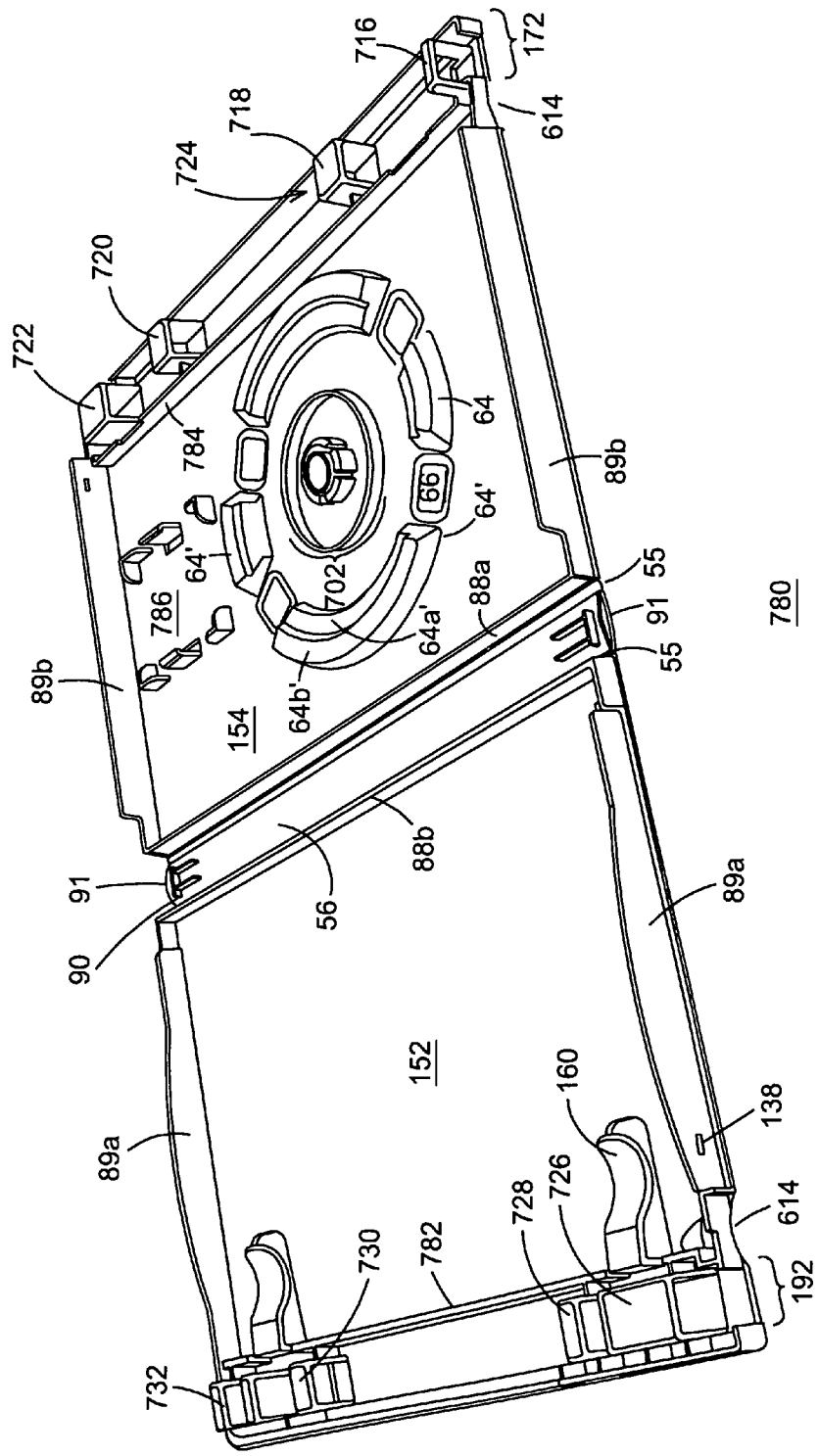
FIG. 23 is a perspective view of another storage case in accordance with the invention.

Referring to FIG. 23, there is shown another storage case which could be used in accordance with the invention. Storage case 780 includes many of the same elements as storage case 700 and a detailed discussion of these elements is omitted for the sake of brevity. Storage case 780 can be used to store a recording medium which has a smaller circumference than that stored in storage case 700. As the stored recording medium is smaller, bottom cover 154 includes feet 64' (including first protrusions 64a' and second protrusions 64b') which are longer than feet 64, thereby, effectively combining upper holding portion 58 and lower holding portion 60 of storage case 700. Reinforcing walls 782, 784 are disposed on top and bottom covers 152, 154 respectively. Reinforcing walls 782, 784 provide additional security in preventing a potential thief from accessing a recording medium stored inside storage case 780. These walls also facilitate insertion and removal of one of the locks of the invention. Bottom cover 154 may also optionally include a memory recess 786 which can receive and retain a memory card associated with the contents of data stored on a recording medium disposed within storage case 780. Storage case 780 may be closed and locked in a manner similar to that described above with respect to storage case 700.

Figure 24:
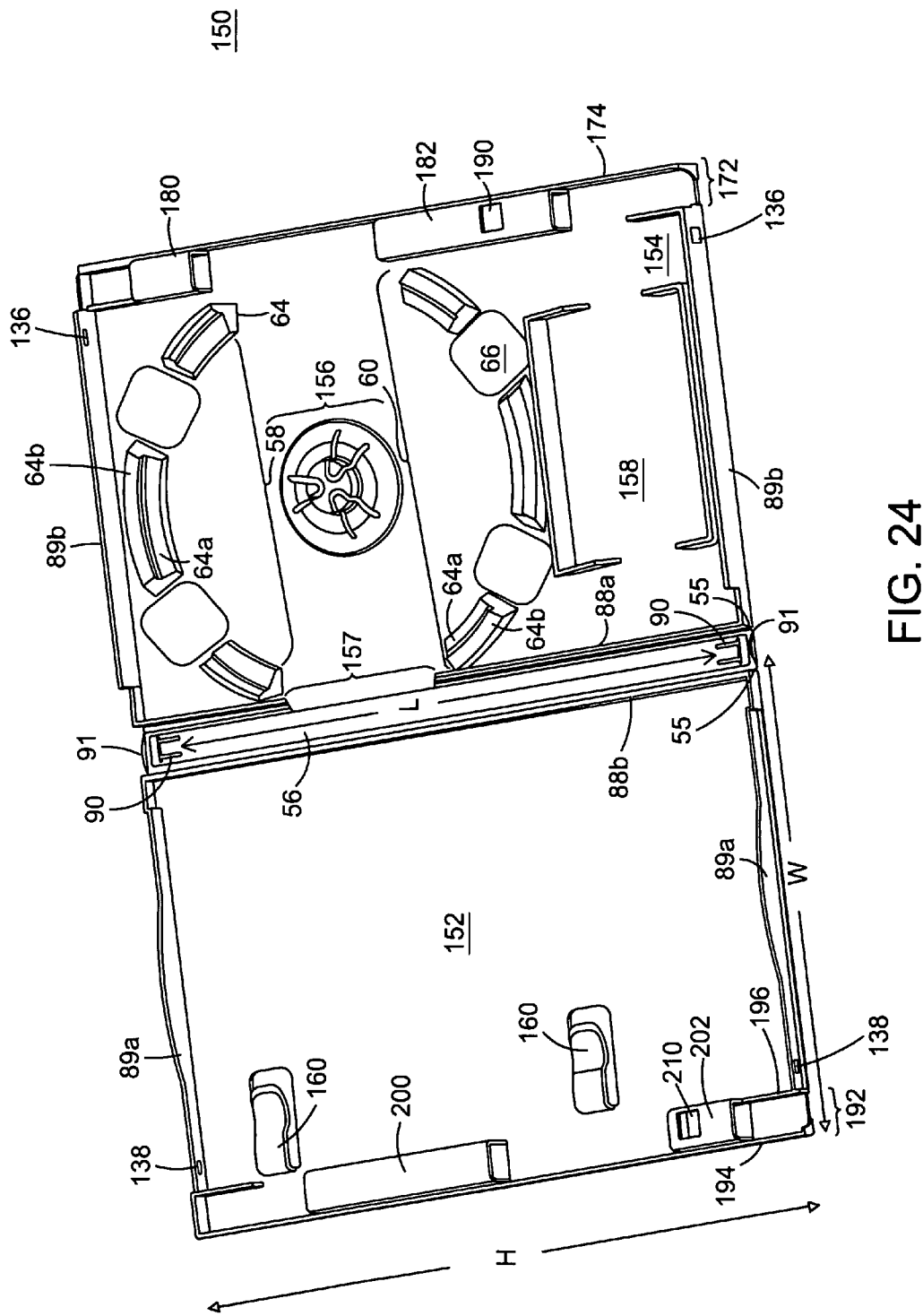
FIG. 24 is a perspective view of yet another storage case in accordance with the invention.

Referring to FIG. 24, there is shown a plan view of an open case 150 in accordance with another embodiment of the present invention. Like case 700, case 150 can be made by any method out of any known material. Preferably, case 150 is made of polypropylene.

Storage case 150 comprises a top cover or door side 152, a bottom cover or disc side 154, and a spine 56 disposed therebetween. Bottom cover 154 receives and retains recording medium 70. Top cover 152 and bottom cover 154 are pivotably coupled to spine 56 at respective pivot axes 55 to form a "living hinge." The living hinge allows top and bottom covers 152, 154 to be rotated toward each other about pivot axes 55 so that top and bottom cover 152, 154 can meet and mate with each other to enclose and, therefore, store and protect recording medium 70. Storage case 150 is designed to have a height H and width W that is typical of a standard VHS tape. This height and width format complies with Video Software Dealers Association (VSDA) standards.

Figure 26:
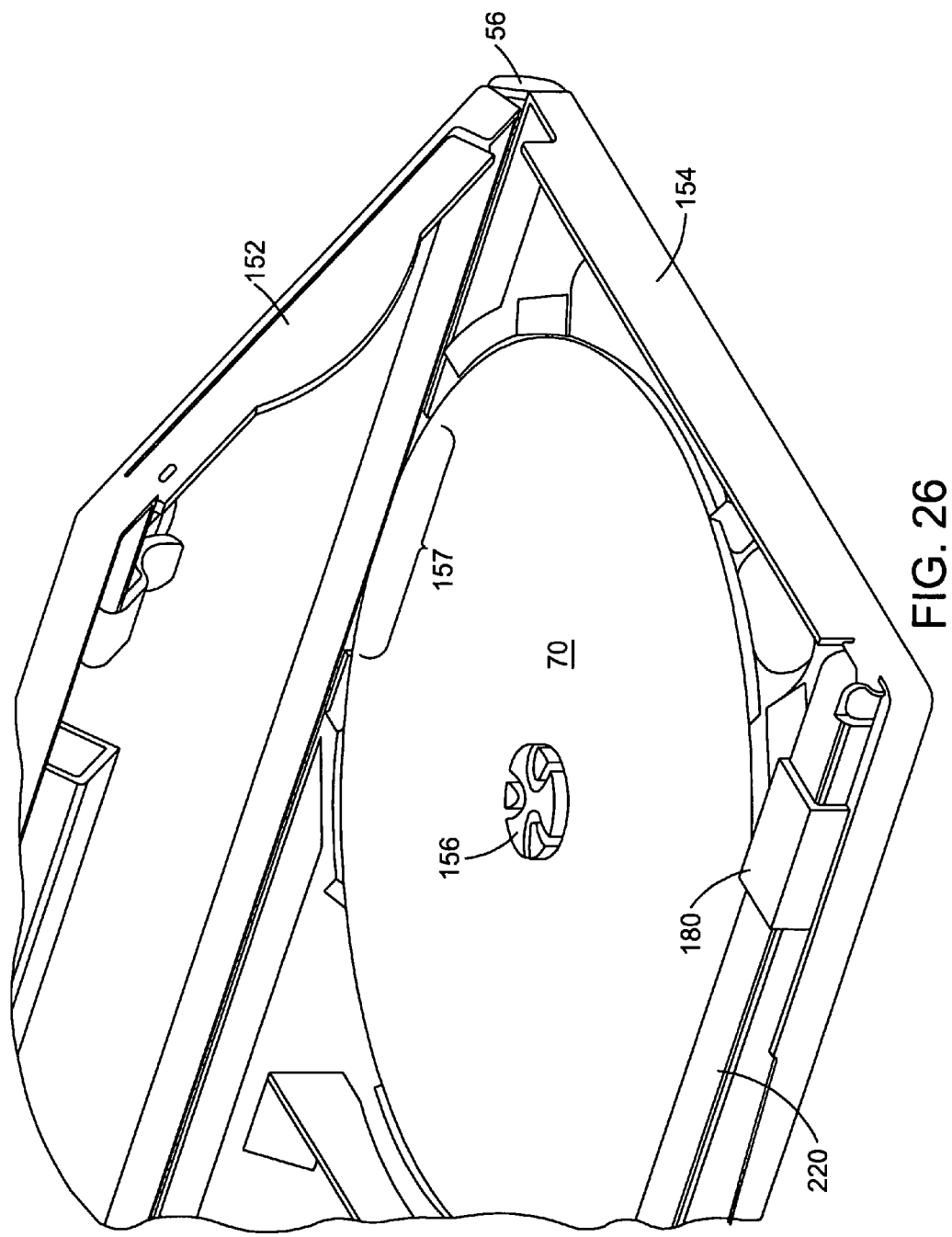
FIG. 26 is a perspective view of the storage case of FIG. 24.

Like storage case 700, storage case 150 allows for receipt of an internal lock which is closer to spine 56 than prior art storage cases. Referring to FIGS. 24 and 26, to allow for the provision of a lock discussed more completely below, and to keep within VSDA size parameters, a hub 156 is disposed on bottom cover 154 closer to top cover 152 compared to the position of hubs of the prior art. To accommodate this shift, a portion 157 of wall 88a is cut out or removed that is approximately equal to the thickness of recording medium 70. As a result, when recording medium 70 is stored on hub 156, a portion of recording medium 70 enters into removed portion 157. It has been found that this construction has a beneficial result. When top cover 152 is closed upon bottom cover 154, wall 88b sits on top of recording medium 70 and more securely retains recording medium 70 on hub 156. This prevents recording medium 70 from moving within storage case 150, e.g., when case 150 is excessively jarred in shipping or handling.

Figure 27:
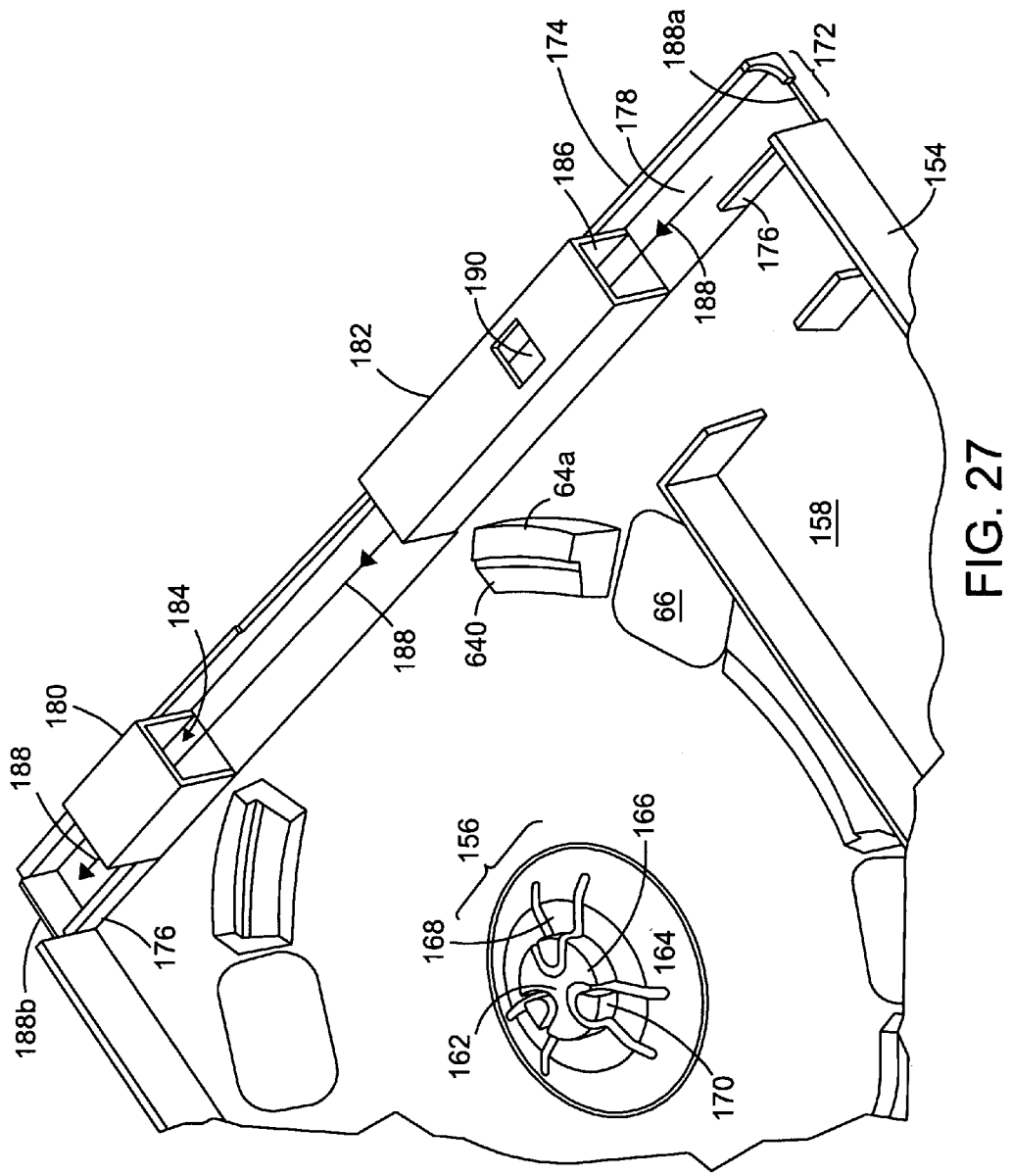
FIG. 27 is a perspective magnified view of a portion of the bottom cover of the storage case of FIG. 24.

The embodiment of FIG. 24, as with the previous embodiments, includes an improved locking mechanism for enhancing a locking arrangement between bottom cover 154 and top cover 152 and for preventing a potential thief from obtaining access to recording medium 70. Referring to FIGS. 24 and 27, bottom cover 154 includes a bottom lock portion 172. Bottom lock portion 172 includes outside wall 174 and inside walls 176 defining a lock receiving recess 178 therein. Bottom lock portion 172 further includes a hollow upper lock receiving member 180 and a hollow lower lock receiving member 182 extending upwardly from bottom lock portion 172. Upper lock receiving member 180 is substantially rectangular in cross-section and defines a parallelepiped shaped void 184 therein. Lower lock receiving member 182 is also substantially rectangular in cross-section, though longer than upper lock receiving member 180, and defines a parallelepiped shaped void 186 therein. Lower lock receiving member 182 further includes a hook 190 which receives a latch discussed below. Voids 184 and 186 and lock receiving recess 178 are substantially collinear so that lock receiving recess 178, void 184 and void 186 in combination define lock insertion path 188 on bottom cover 154. Lock insertion path 188 begins with an open portion 188a at the bottom of bottom cover 154 and terminates with a wall portion 188b at the top of bottom cover 154.

Figure 28:
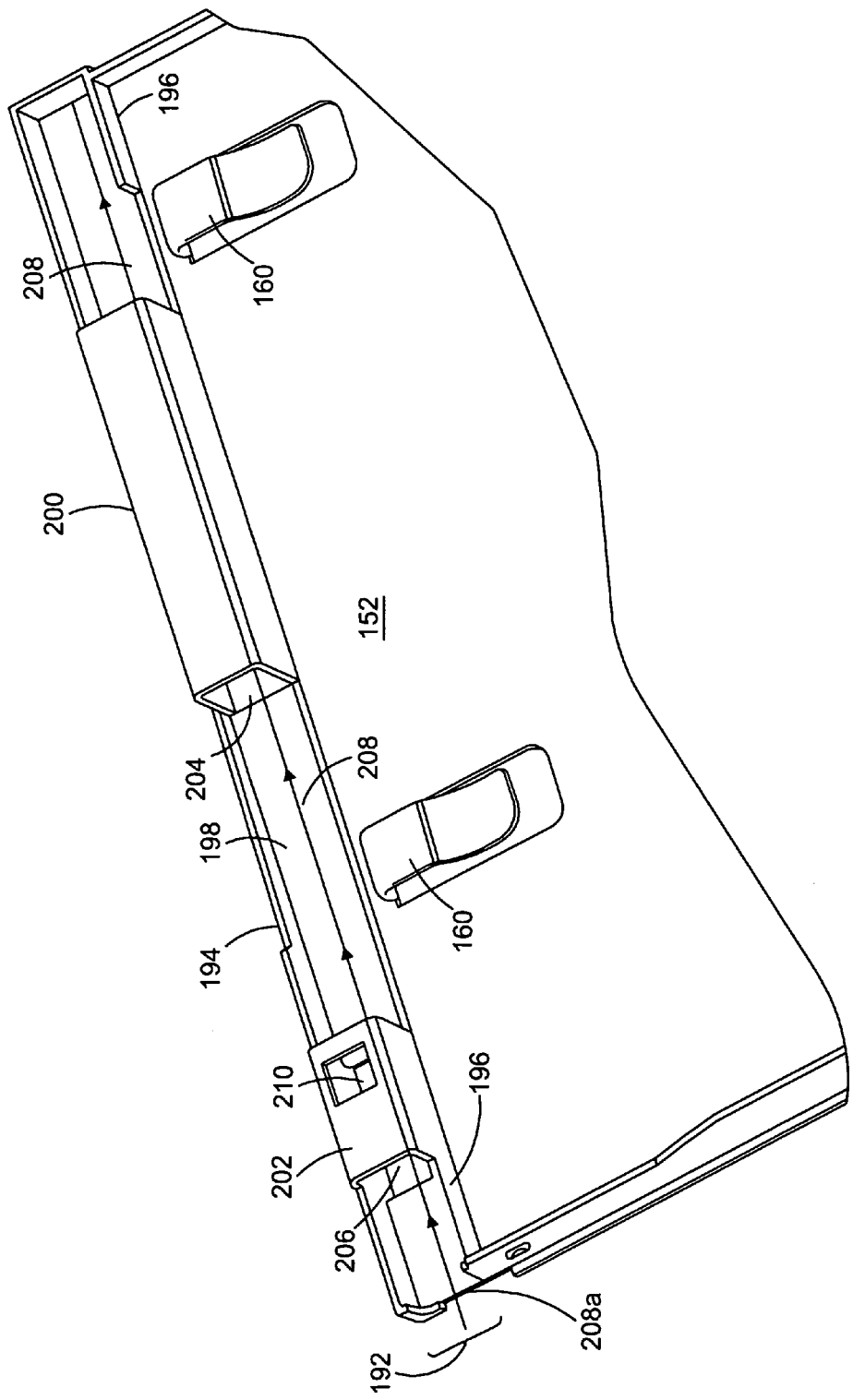
FIG. 28 is a perspective magnified view of a portion of the top cover of the storage case of FIG. 24.
Figure 29:
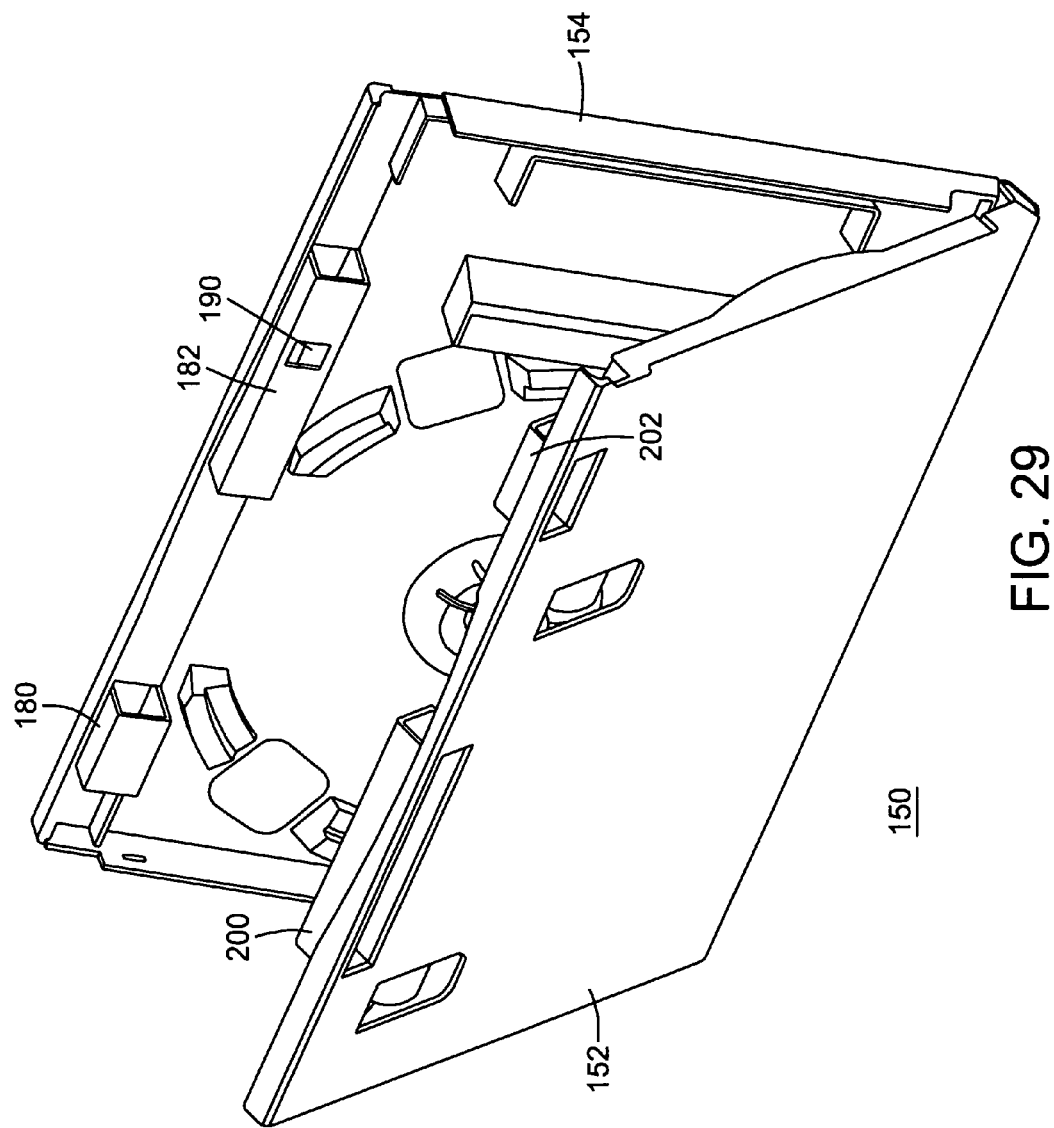
FIG. 29 is a perspective view of the storage case of FIG. 24 partially closed.
Figure 30:
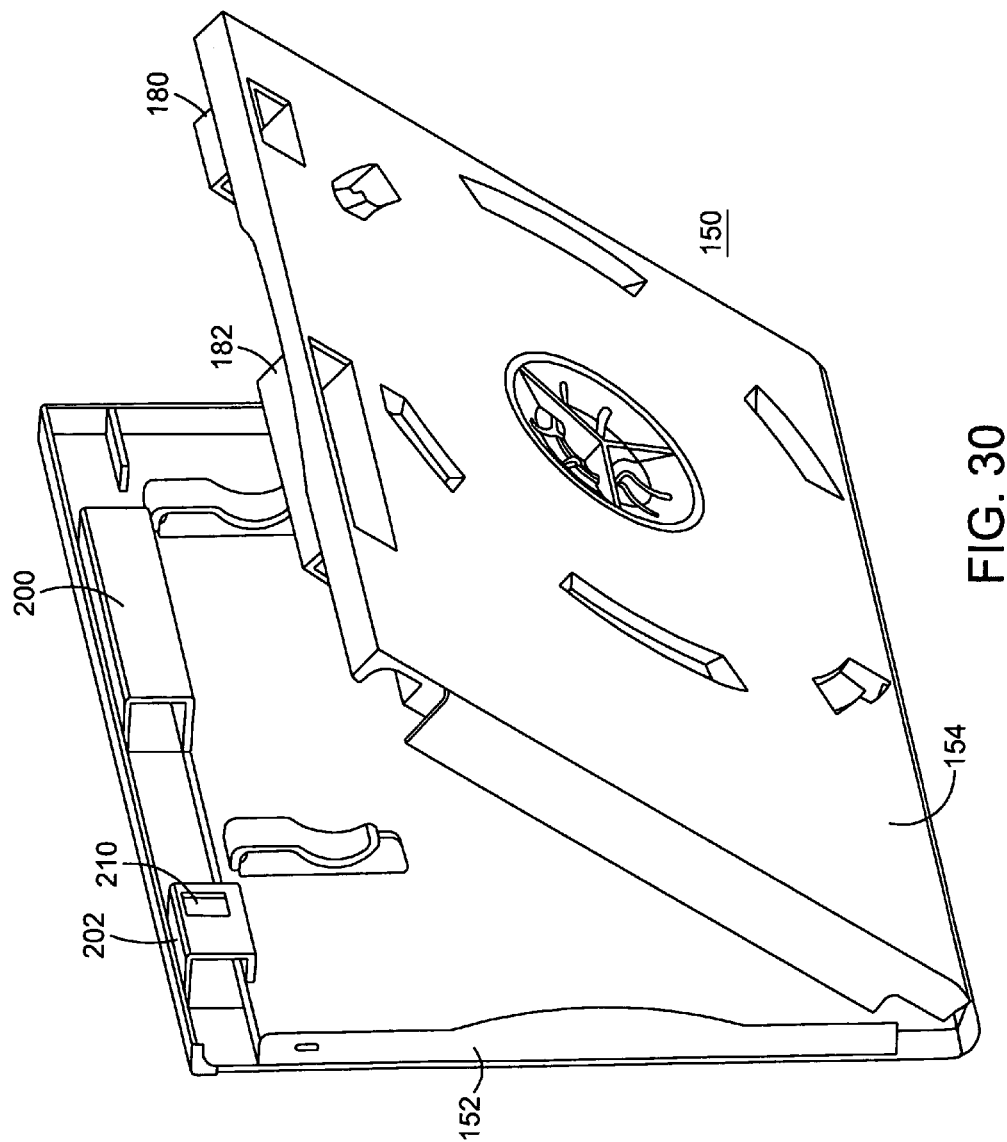
FIG. 30 is a perspective view of the storage case of FIG. 24 partially closed.

Referring now to FIGS. 24 and 28, top cover 152 includes a top lock portion 192 which is similar to bottom lock portion 172. Top lock portion 192 includes an outside wall 194 and inside walls 196 defining a lock receiving recess 198 therein. Top lock portion 192 further includes a hollow upper lock receiving member 200 and a hollow lower lock receiving member 202 extending upwardly from top lock portion 192. Upper lock receiving member 200 is substantially rectangular in cross-section and defines a parallelepiped shaped void 204 therein. Lower lock receiving member 202 is also substantially rectangular in cross-section, though shorter than upper lock receiving member 200, and defines a parallelepiped shaped void 206 therein. Lower lock receiving member 202 further includes hook 210 which receives a latch discussed below. Voids 204 and 206 and lock receiving recess 198 are substantially collinear so that lock receiving recess 198, void 202 and void 204 in combination, define lock insertion path 208 on top cover 152. Lock insertion path 208 begins with an open portion 208a at the bottom of top cover 152 and terminates with a wall portion 208b at the top of top cover 152.

Referring now to FIGS. 27-30 when storage case 150 is to be used to protect storage medium 70, top cover 152 is pivoted about pivot point 55 toward bottom cover 154 and bottom cover 154 is pivoted about pivot point 55 toward top cover 152. Upper lock receiving members 180 and 200 and lower lock receiving members 182 and 202 are disposed on bottom cover 154 and top cover 152, respectively, in an interleaving relationship. In this way, when top cover 152 and bottom cover 154 are closed upon one another, lower lock receiving member 182 fits in between lower lock receiving member 202 and upper lock receiving member 200. Similarly, when top cover 152 and bottom cover 154 are closed upon one another, upper lock receiving member 200 fits between upper lock receiving member 180 and lower lock receiving member 182.

Figure 31:
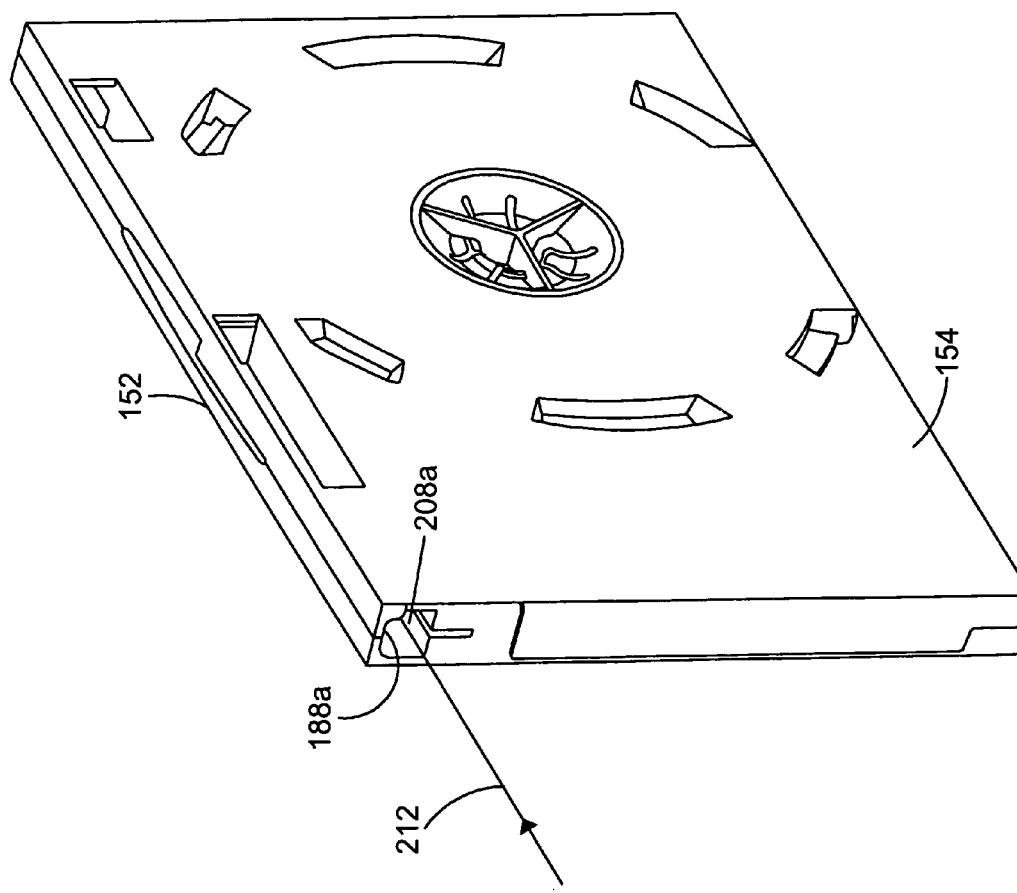
FIG. 31 is a perspective view of the storage case of FIG. 24.
Figure 32:
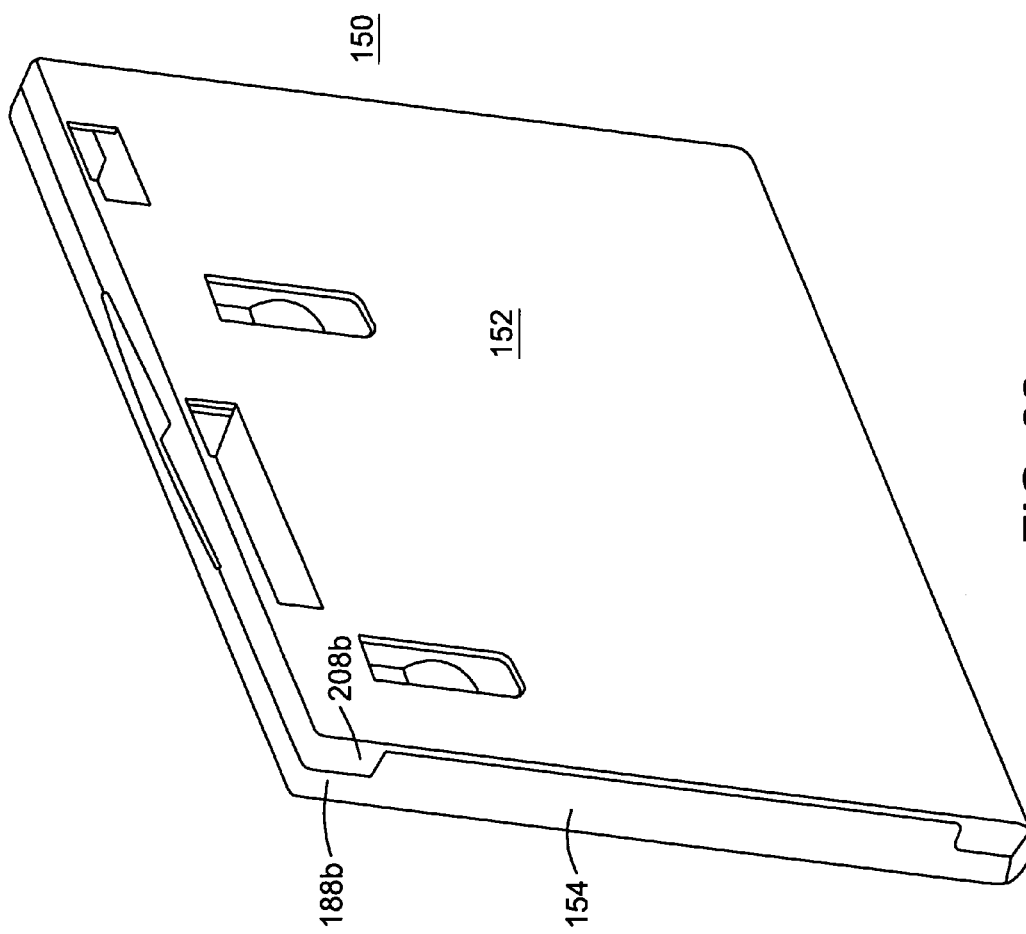
FIG. 32 is a perspective view of the storage case of FIG. 24.

Referring now also to FIGS. 31 and 32 when storage case 150 is closed, lock insertion path 188 and lock insertion path 208 communicate with each other and combine to form a combined lock insertion path 212. Combined lock insertion path 212 begins with the combination of open portions 188a and 208a and terminates with the combination of wall portions 188b and 208b. Storage case 150 is now ready to receive a lock in accordance with certain aspects of the invention. If storage case 150 is being displayed in a sell-through or retail environment, a shrink wrap could now be placed over storage case 150 in preparation of receipt of a lock in accordance with the invention.

Figure 33:
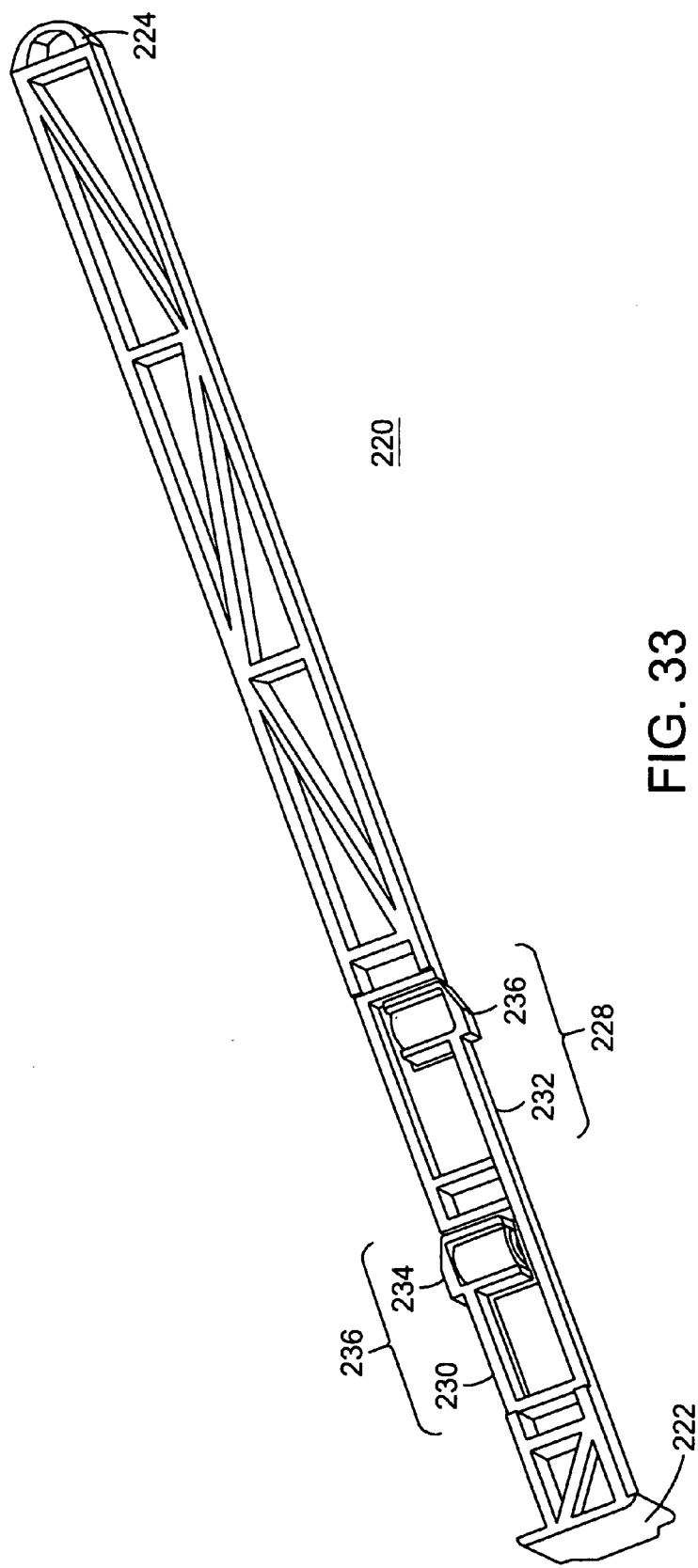
FIG. 33 is a perspective view of a lock to be used with the storage case of FIG. 24 in accordance with the invention.

Referring to FIG. 33, there is shown a lock 220 in accordance with certain aspects of the invention to be received in combined lock insertion path 212. Lock 220 is substantially a parallelepiped and includes a wall portion 222 at one end and a torpedo-shaped nose portion 224 at another end. Torpedo-shaped nose portion 224 facilitates the insertion of lock 220 into combined lock insertion path 212. Torpedo-shaped nose portion 224 can further be used to pierce a shrink wrap disposed around storage case 150.

Lock 220 may be made by any known method of any known material. Preferably, lock 220 is made of an acetyl or acetyl copolymer which has a natural lubricity (i.e. a low coefficient of friction or self-lubricating) and has a high stiffness to weight ratio. This lubricity allows lock 220 to slide more easily into and out of combined lock insertion path 212.

Figure 34:
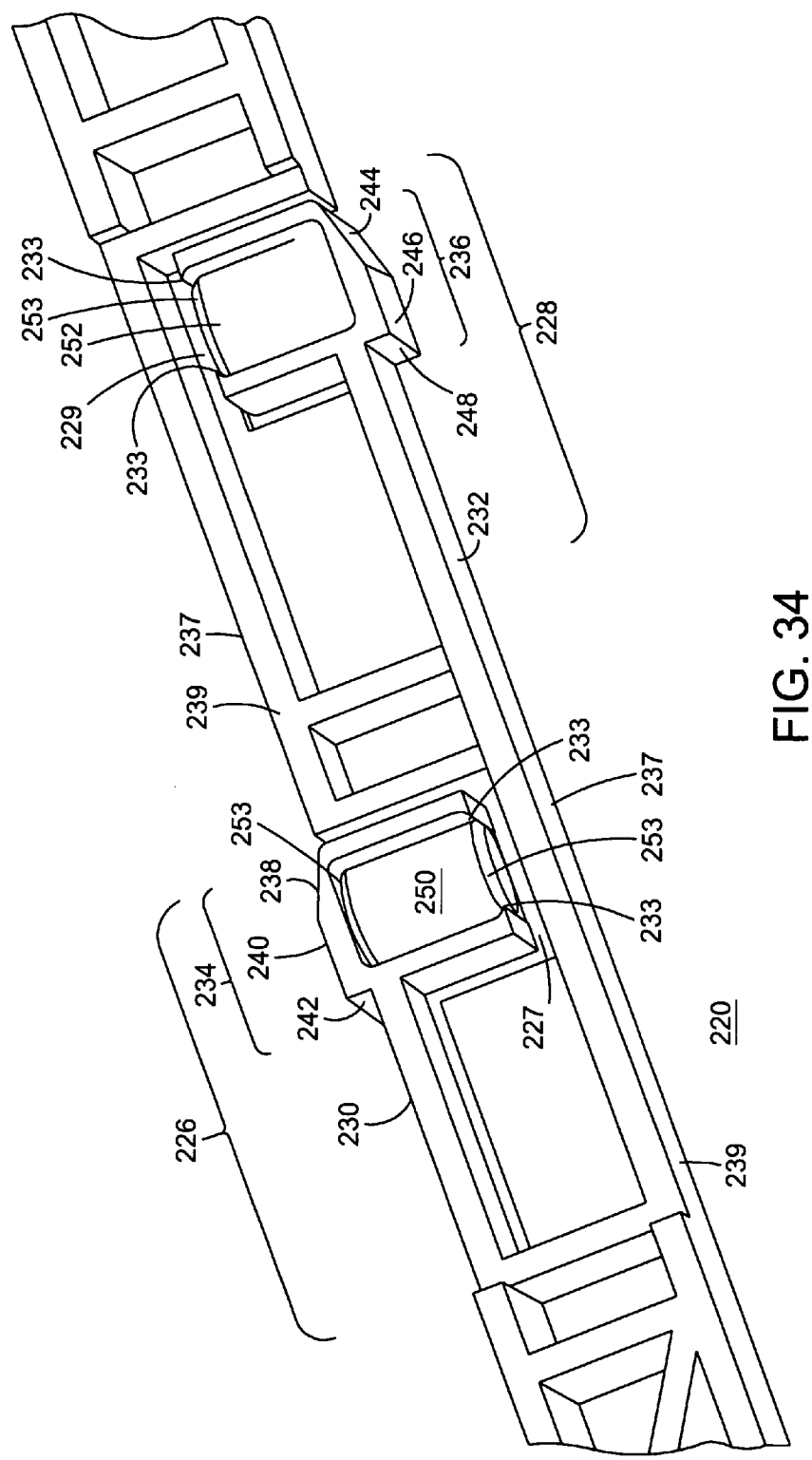
FIG. 34 is a magnified perspective cut-away view of the lock of FIG. 33.

Referring now also to FIG. 34, lock 220 includes a first catch mechanism 226 and a second catch mechanism 228 disposed on opposite sides of lock 220. First and second catch mechanisms 226, 228 are comprised of a leaf spring portion 230, 232 integral with pin holding portions 234, 236. Pin holding portions 234, 236 are designed to be received by hooks 190, 210 (FIG. 24) to secure lock 220 in combined lock insertion path 212 and reliably secure storage case 150 in a closed position.

Leaf spring portions 230, 232 are resilient and biased outwardly so that pin holding portions 234, 236 extend beyond an outer periphery 237 of a base 239 of lock 220. First and second catch mechanisms 226, 228 further include voids 227, 229 which can receive pin holding portions 234, 236 if a force is applied on pin holding portions 234, 236 against the biasing of leaf springs 230, 232.

Pin holding portion 234 includes a chamfered portion 238 disposed toward torpedo-shaped nose 224 and a straight portion 240 terminating in and defining a catch 242. Similarly, pin holding portion 236 includes a chamfered portion 244 disposed toward torpedo-shaped nose 224 and a straight portion 246 terminating in and defining a catch 248. Pin holding portions 234 and 236 are effective to receive and retain metal pins 250 and 252 respectively. Each pin holding portion 234, 236 includes shelf extensions 233 which retain pins 250 and 252 within a respective pin holding portion 234, 236. Each pin 250, 252 further includes chamfered ends 253 which are received and retained by shelf extensions 233 and thereby facilitate insertion and removal of pins 250, 252 within pin holding portions 234, 236.

Figure 35:
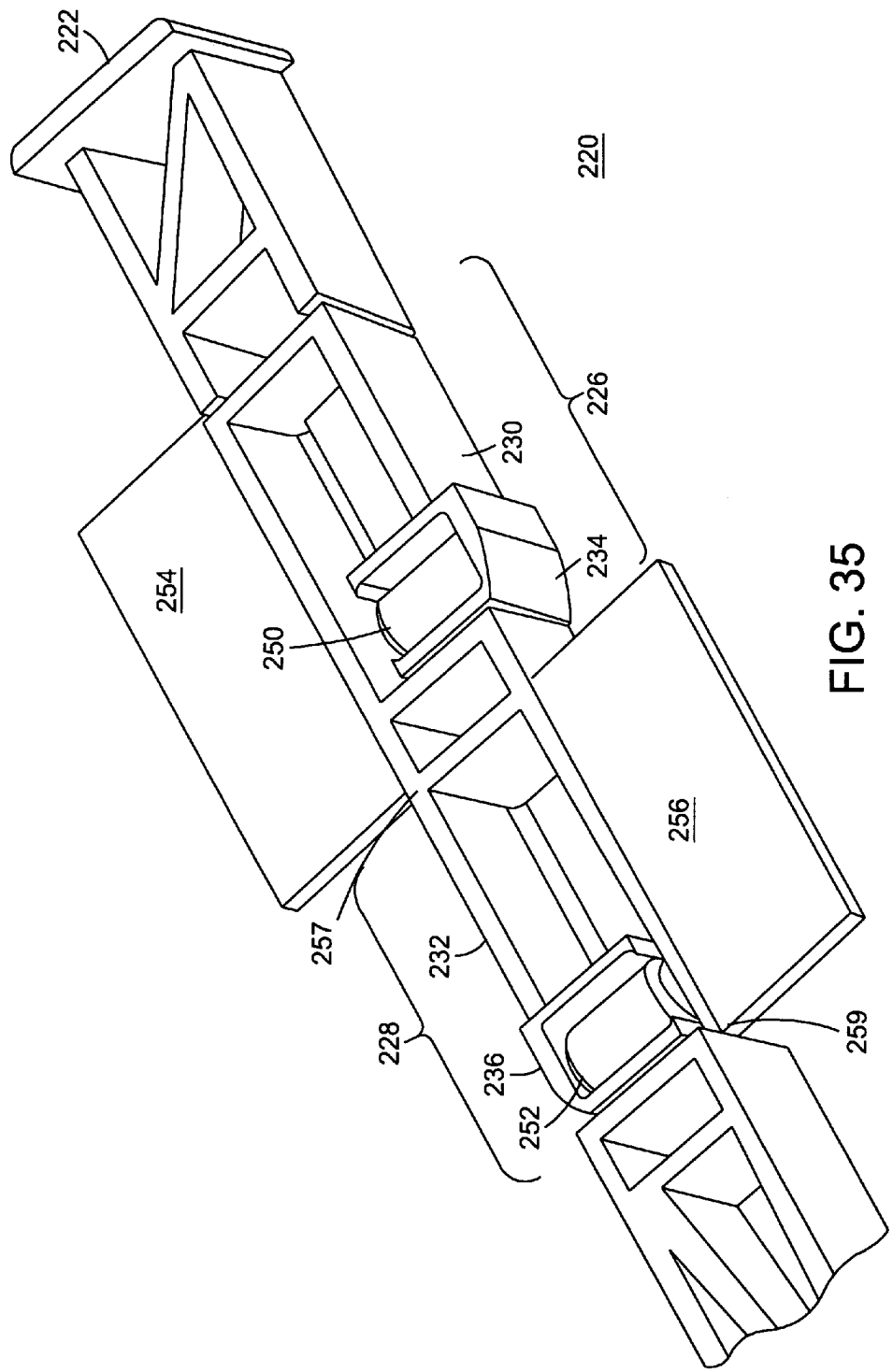
FIG. 35 is a magnified perspective view of the lock of FIG. 33 with corresponding doors.
Figure 36:
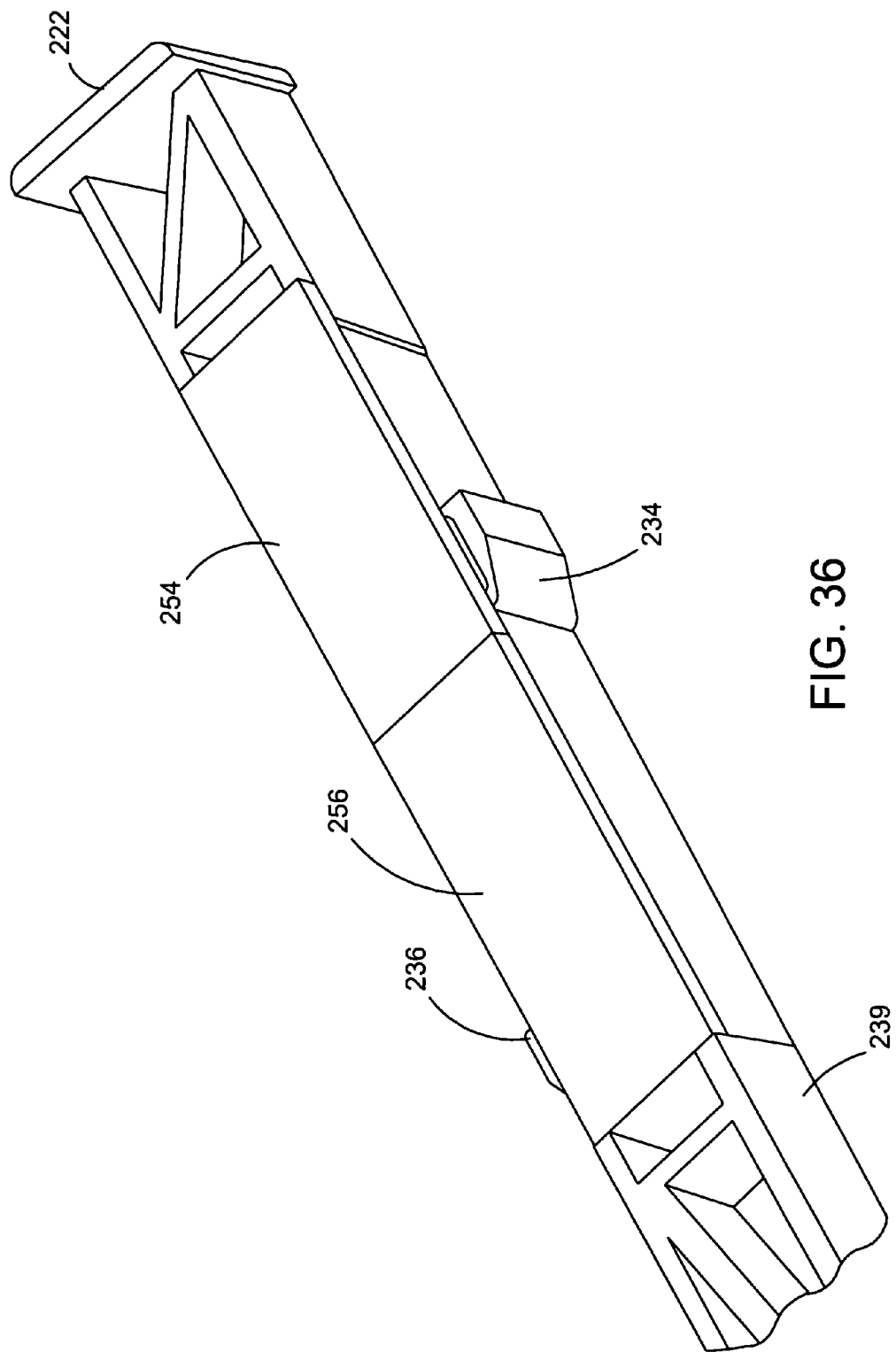
FIG. 36 is a magnified perspective view of the lock of FIG. 33 with corresponding doors.

Referring now to FIG. 35, when lock 220 is manufactured, a first door 254 is pivotably coupled to lock 220 opposite first catch mechanism 226 and a second door 256 is placed pivotably coupled to lock 220 opposite second catch mechanism 228. After pins 250, 252 are placed within pin holding portions 234 and 236 respectively, first door 254 and second door 256 are pivoted about pivot points 257 and 259 respectively and closed upon first catch mechanism 226 and second catch mechanism 228 respectively as is shown in FIG. 36 by any known method. In this way, first and second doors 254, 256 improve the aesthetic appearance of lock 220 and mask the position of pins 250 and 252 within pin holding portions 234 and 236. This masking makes it more difficult for a thief to ascertain the positions of pins 250, 252 and disengage lock 220 from system 150.

Figure 37:
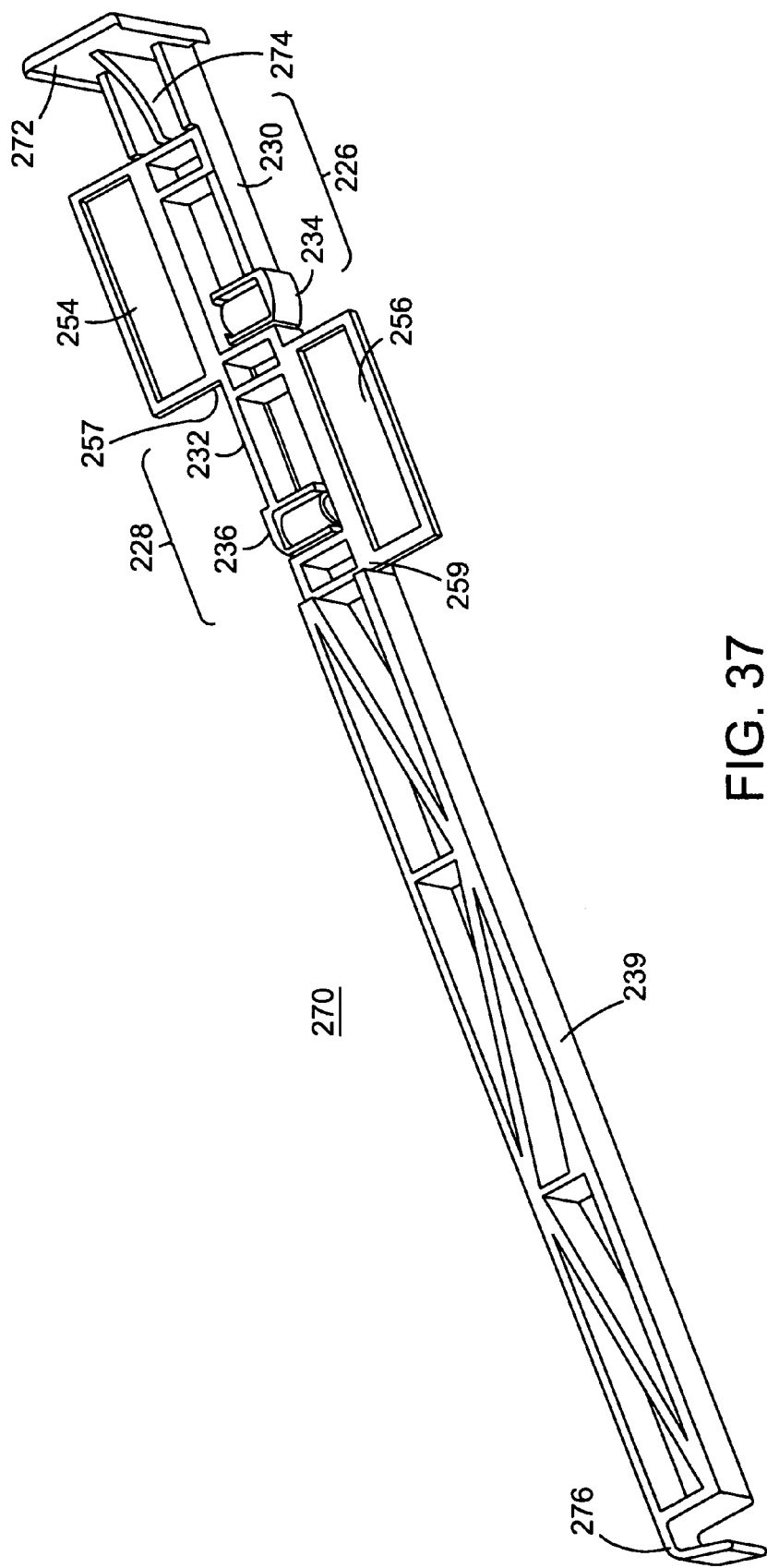
FIG. 37 is a perspective view of another lock in accordance with certain aspects of the invention.
Figure 38:
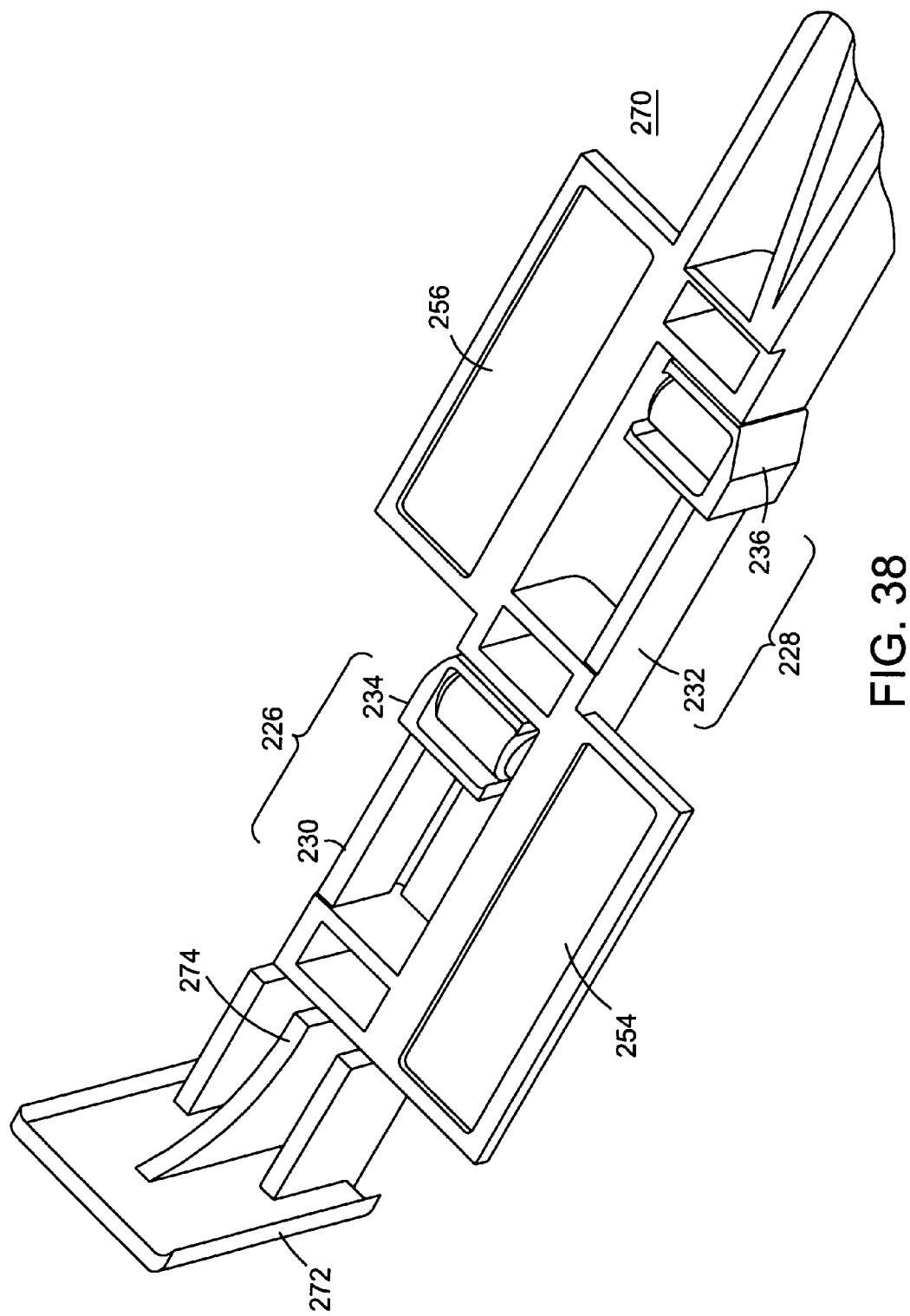
FIG. 38 is a magnified perspective view of the lock in FIG. 37.
Figure 39:
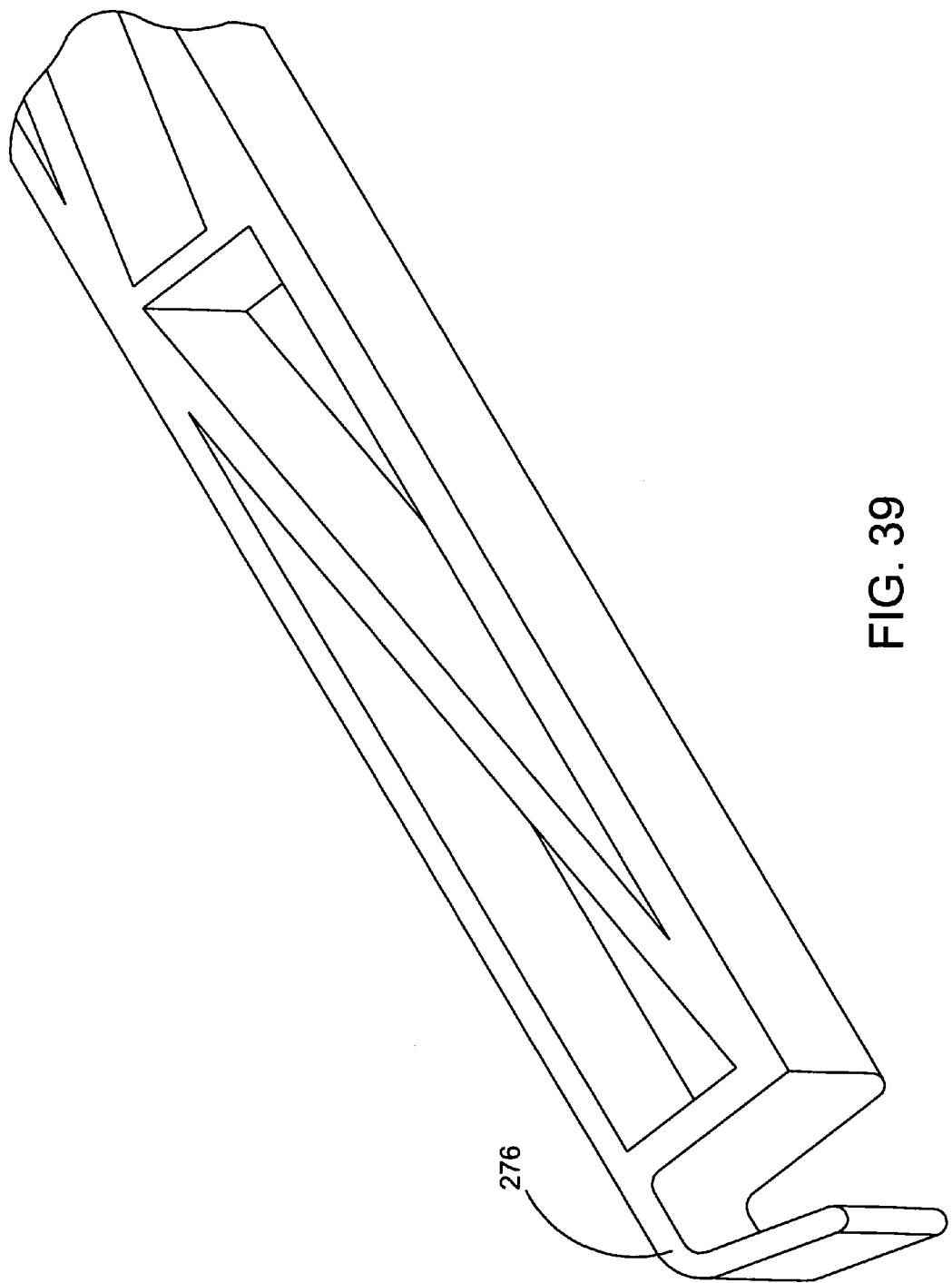
FIG. 39 is a magnified perspective view of the lock in FIG. 37.

An alternative lock 270 is shown in FIGS. 37-39. Lock 270 includes many of the same elements as lock 220 and, therefore, a description of these elements is omitted for the sake of brevity. At one end, lock 270 includes an extended rib 274 supporting a wall 272. A comparison of FIG. 38 with FIG. 35 reveals that wall 272 extends upwardly significantly farther than wall 222. This extra extension of wall 272 allows a user to more easily grasp and remove lock 270 from system 220. At another end, lock 270 terminates in a springed hook portion 276. Springed hook portion 276 facilitates removal of lock 270 by providing a spring force on lock 270 in an outward direction when pin holding portions 226, 228 are disengaged from hooks 190, 210. Springed hook portion 276 is thus effective to auto-eject lock 270 from case 150.

Figure 40:
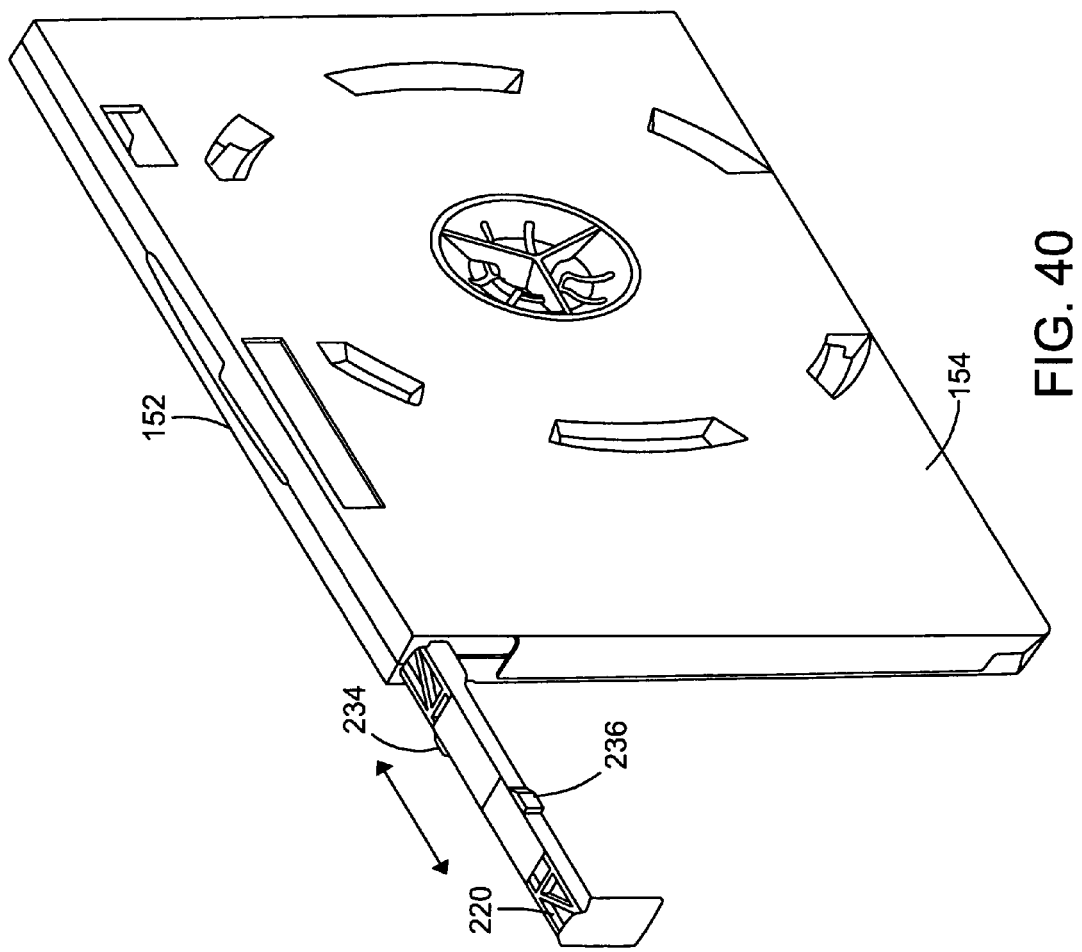
FIG. 40 is a perspective view of the lock of FIG. 33 being inserted into the storage case of FIG. 24.

In use, after storage case 150 is closed, lock 220 is inserted into combined lock insertion path 212 as is shown in FIG. 40. Referring to FIGS. 27, 28, 33, 34 and 40, lock 220 is oriented so that torpedo-shaped nose 224 is inserted into combined lock insertion path 212, first catch mechanism 226 is inserted with pin holding portion 234 facing toward bottom cover 154, and second catch mechanism 228 is inserted with pin holding portion 236 facing top cover 152.

Figure 41:
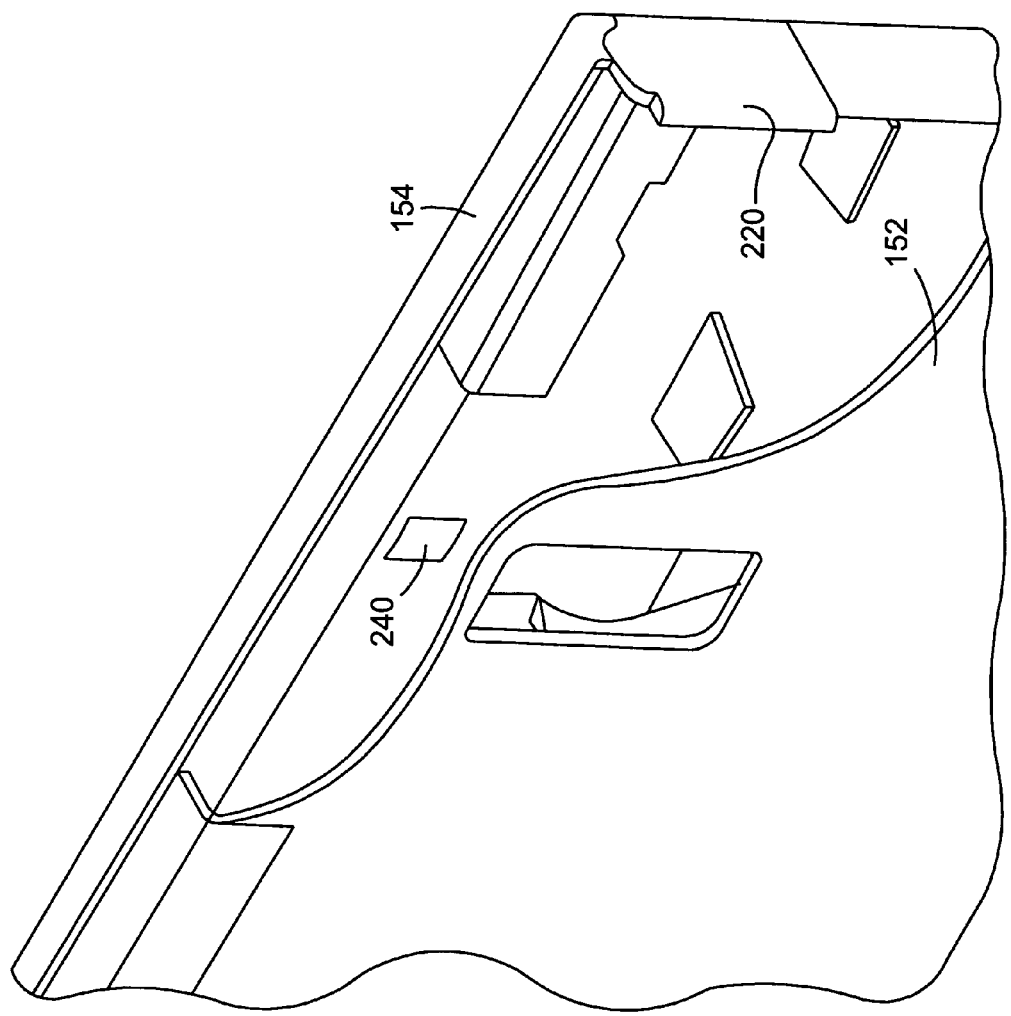
FIG. 41 is a magnified perspective partially cut-away view of the storage case of FIG. 24 combined with the lock of FIG. 33 in accordance with certain aspects of the invention.
Figure 42:
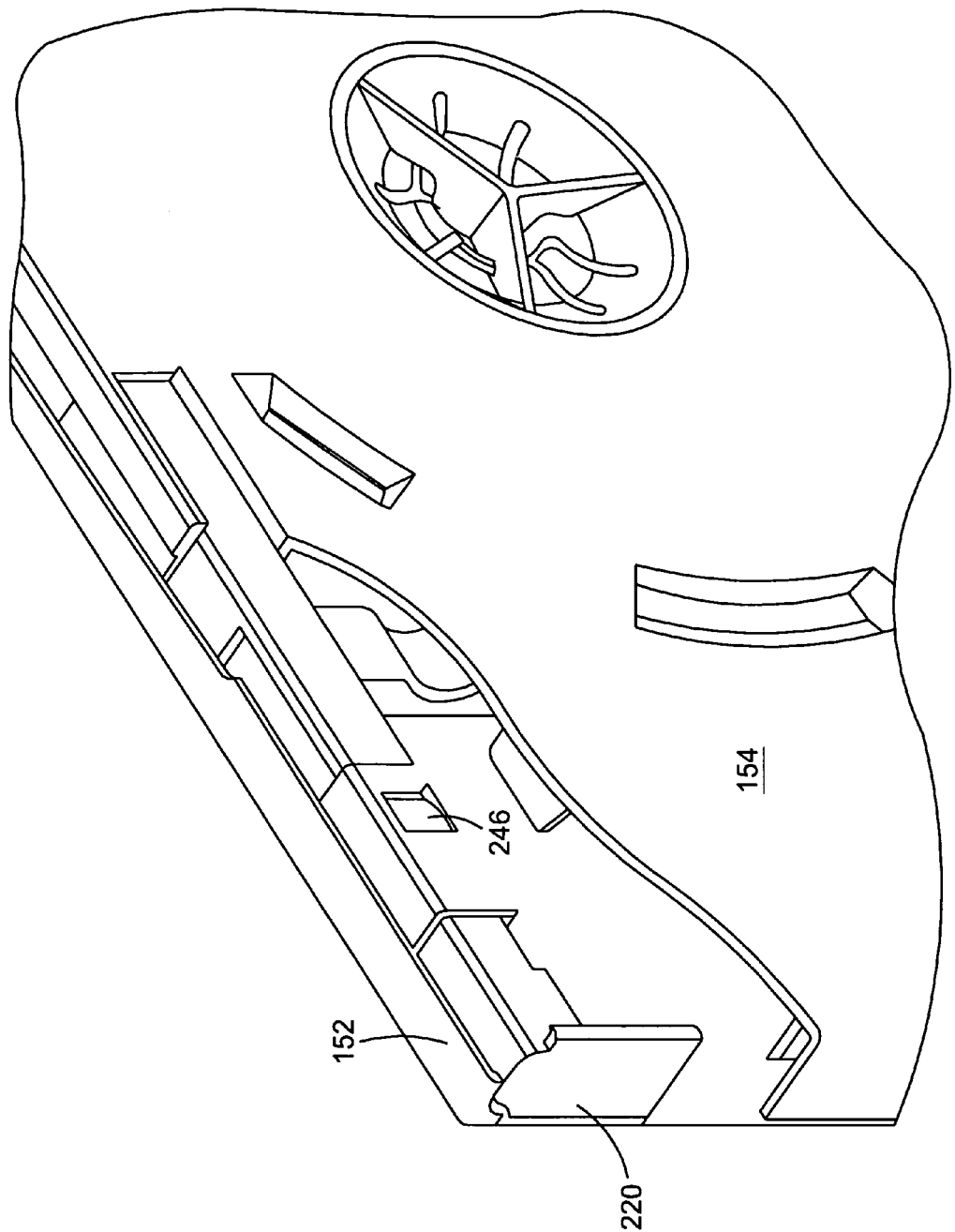
FIG. 42 is a magnified perspective partially cut-away view of the storage case of FIG. 24 combined with the lock of FIG. 33 in accordance with certain aspects of the invention.

Referring also to FIGS. 41 and 42, as lock 220 is inserted into combined lock insertion path 212, the walls of bottom cover 154 and top cover 152 and the walls of lower lock receiving member 182 and lower lock receiving member 202 engage chamfered portions 244 and 238 of pin holding portions 236 and 234. These walls compress leaf springs 232 and 230 and cause pin holding portions 236 and 234 to move into voids 229, 227. When lock 220 is inserted far enough into combined lock insertion path 212, straight portion 240 of pin holding portion 234 mates with hook 210 and straight portion 246 of pin holding portion 236 mates with hook 190. A user may need to apply an additional inserting force upon lock 270 to overcome the resistance produced by walls 188b and 208b (FIGS. 24, 27 and 28) acting upon spring hook 276 when lock 270 is inserted into lock insertion path 212.

At this point, hooks 190 and 210 no longer provide the force on leaf springs 230, 232 that the walls of lower lock receiving member 182 and lower lock receiving member 202 had provided. The natural biasing force of leaf springs 230, 232 now causes pin holding portions 234 and 236 to move outwardly thereby causing latches 242 and 248 to engage with the walls defining hook 210 and hook 190 as is seen most clearly in FIGS. 41 and 42. Lock 220 is now securely held within storage case 150 and top cover 152 is securely held together with bottom cover 154.

Once lock 220 is in place, if a thief were to attempt to remove lock 220 forcefully by pulling lock 220 in a direction opposite to the direction in which it was inserted, latches 242 and 248 would become further entrenched within the walls which define hooks 210 and 190 thereby further preventing removal of the lock 220. Lock 220 thus acts like a deadbolt for storage case 150.

Figure 43:
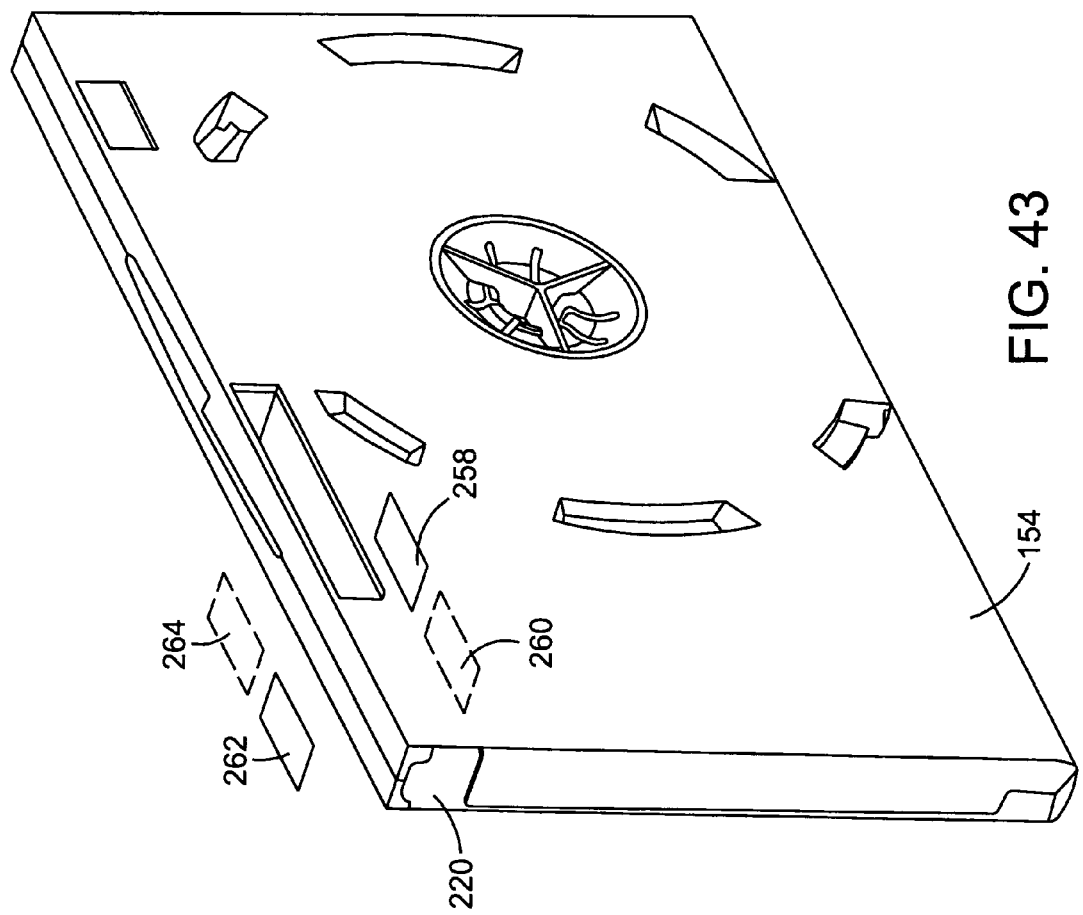
FIG. 43 is a perspective view of the storage case of FIG. 24 locked and illustrating how a lock may be removed from the storage case.

Referring to FIG. 43, as with previously described embodiments, to remove lock 220, a magnet 258 is placed near pin 252 and emits a magnetic field which attracts pin 252 against the biasing force of leaf spring 232 thereby causing latch 248 to recede from hook 190. At the same time, a magnet 262 is placed near pin 250 and emits a magnetic field which attracts pin 250 against the biasing force of leaf spring 230 thereby causing latch 242 to recede from hook 210. Once magnets 258, 262 are so oriented, lock 220 is safely removed from combined lock insertion path 212 by safely sliding lock 220 out of combined lock insertion path 212.

Alternatively, a magnet 264 (shown in phantom) can be placed near pin 252 which emits a magnetic field that repels pin 252 against the biasing force of leaf spring 232 thereby causing latch 248 to recede from hook 190. At the same time, a magnet 260 (also shown in phantom) is placed near pin 250 and emits a magnetic field which repels pin 250 against the biasing force of leaf spring 230 thereby causing latch 242 to recede from hook 210.

Other options for removing lock 220 from storage case 150 include using a combination of magnets 262 and 264 or magnets 258 and 260. Upon application of the magnets, lock 220 is now free to be extricated from storage case 150 and storage case 150 can thereafter be opened. Pins 250, 252 thus provide a mass available to be acted upon by the magnetic field generated by magnets 258-264 thereby facilitating removal of lock 220 through the movement of pin holding portions 234, 236 holding pins 250 and 252. Pins 250, 252 should be sized to provide this additional mass.

Figure 44:
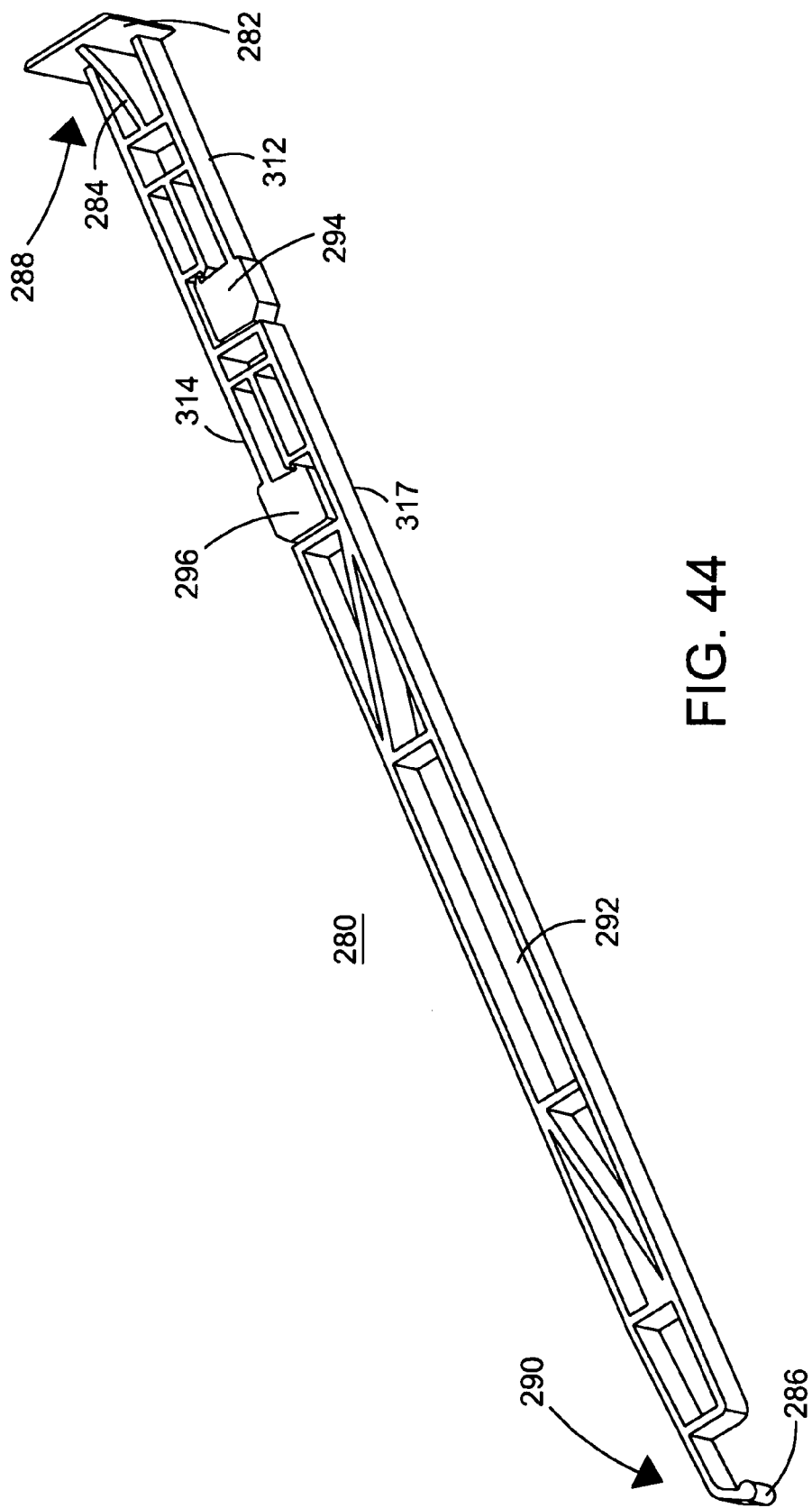
FIG. 44 is a perspective view of yet another lock in accordance with certain aspects of the invention.
Figure 45:
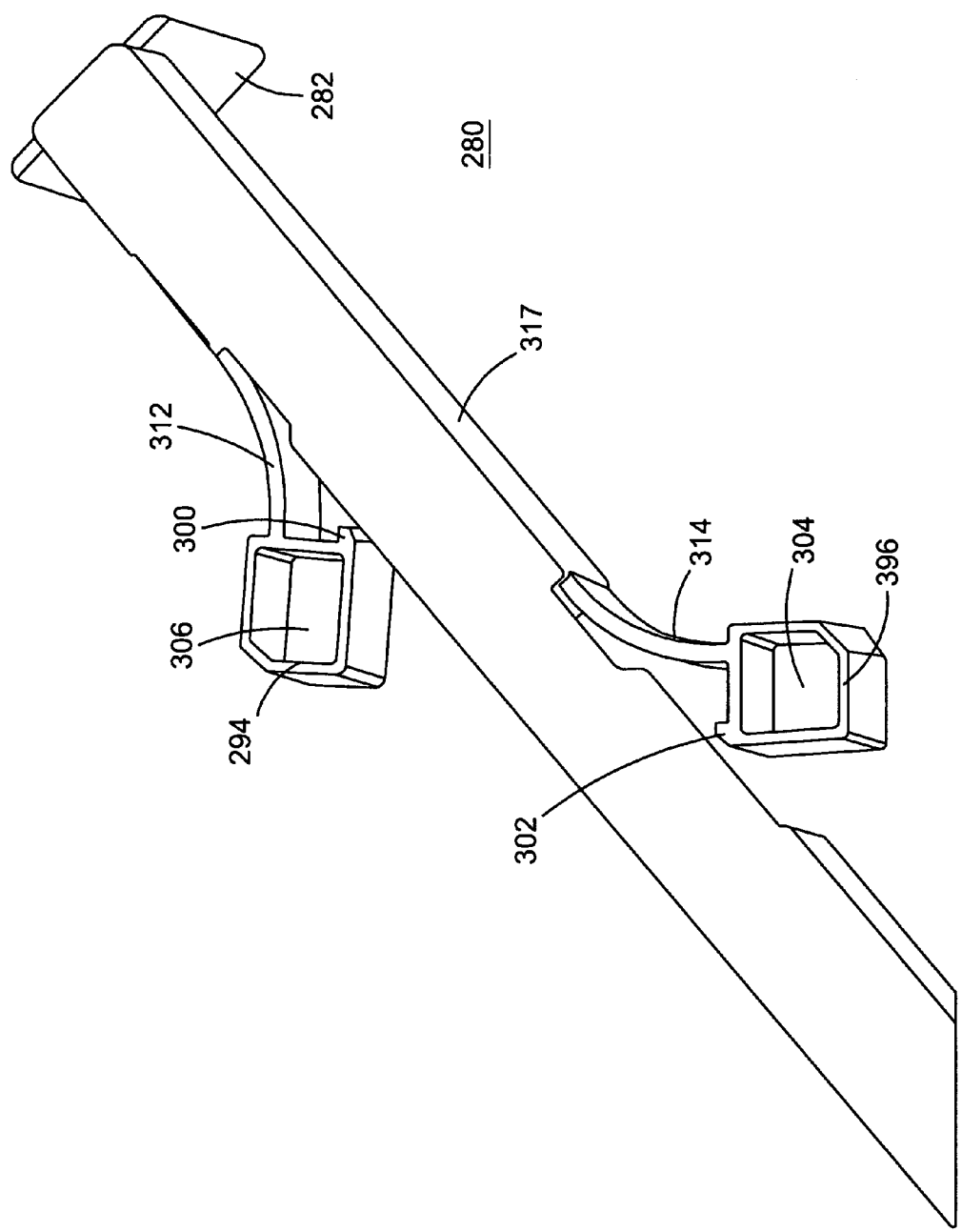
FIG. 45 is a magnified perspective view of the underside of the lock in FIG. 44.
Figure 46:
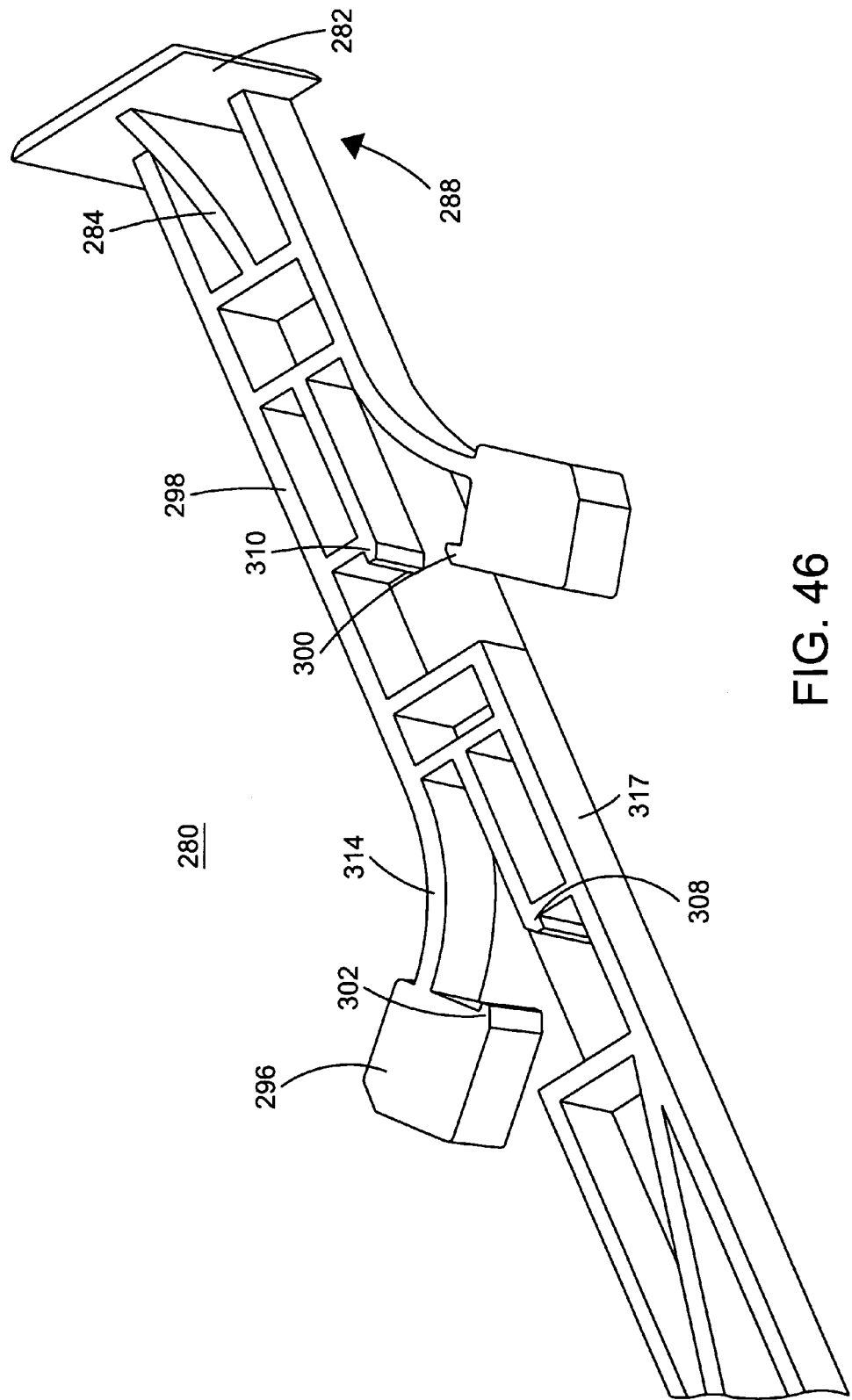
FIG. 46 is a magnified perspective view of the top of the lock in FIG. 44.

Referring to FIG. 44, there is shown yet another lock 280 which could be used in accordance with the invention. Lock 280 comprises a first end 288 and a second end 290 distal from first end 288. As with lock 270, first end 288 includes an extended rib portion 284 extending up to and supporting a wall portion 282. Second end 290 includes a springed hook portion 286 which, like springed hook portion 276, facilitates removal of lock 280 from lock insertion path 212 and case 150. As can be discerned from the figure, the width of lock 280 tapers near second end 290 thereby facilitating insertion of lock 280 into lock insertion path 212 in storage case 150. In between first end 288 and second end 290, lock 280 includes a recess 292 which may be used to receive and retain a source tag or an EAS electronic surveillance tag used to trigger an alarm system (not shown) if a thief attempted to steal storage case 150 including lock 280.

Referring to FIGS. 44-47, lock 280 is molded so that catch mechanisms comprising a first pin holding portion 294 and a second pin holding portion 296 extend outwardly from a base 298 of lock 280 through respective leaf spring portions 312, 314. Leaf spring portions 312, 314 bias pin holding portions 294, 296 outwardly away from base 298. As with pin holding portions 234, 236, first and second pin holding portions 294, 296 include chambers 304, 306 which are effective to receive and retain steel pins (not shown). First and second pin holding portions 294, 296 further include chamfered portions 320, 326, straight portions 322, 328, and latch portions 324, 330 as with pin holding portions 234, 236.

Figure 47:
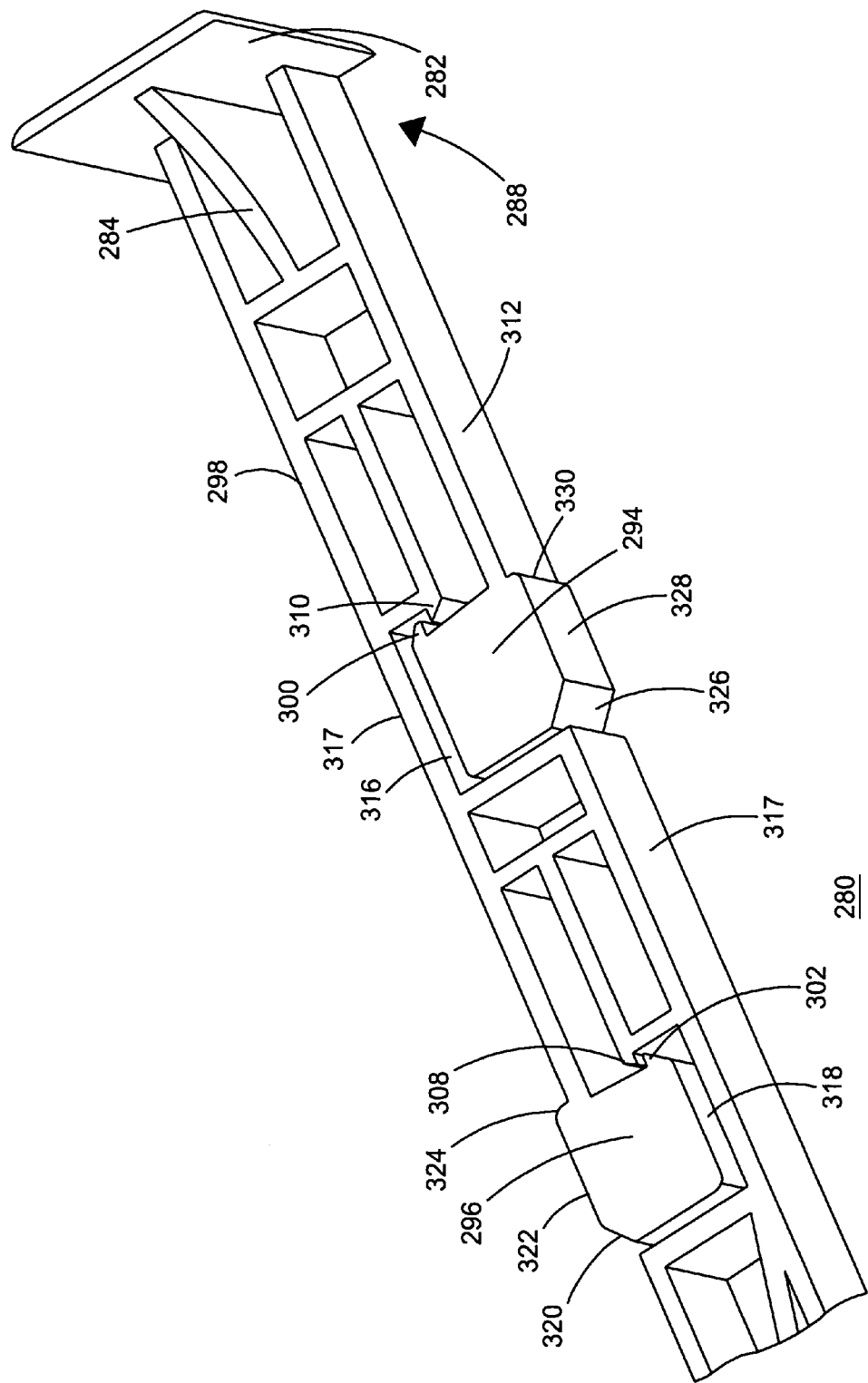
FIG. 47 is a magnified perspective view of the top of the lock in FIG. 44 when pin holding members of the lock are in a closed position.

First and second pin holding portions 294, 296 further include flanges 300, 302 extending therefrom. Referring now also to FIG. 47, after pins (described above) are inserted into chambers 304, 306, first and second holding portions 294, 296 are pivoted through arms 312, 314 and inserted into base 298 of lock 280 so that flanges 300, 302 sit behind corresponding flanges 308, 310 in base 280. In this position, pin holding portions 294, 296 and base 298 define voids 316, 318 which can receive first and second pin holding portions 294, 296 if a force is applied to pin holding portions 294, 296 against the biasing force of leaf springs 312, 314. Additionally, the bias produced by leaf spring portions 312, 314 causes first and second pin holding portions 294, 296 to extend beyond a periphery 317 of base 298. Lock 280 is inserted and removed from case 150 in a similar way as lock 220.

When lock 280 is produced, lock 280 is molded with pin holding portions 294, 296 extending outwardly from base 298. Pins are inserted into pin hold portions 294, 296 and pin holding portions 294, 296 are pivoted against the resiliency of leaf spring portions 312, 314 so that flanges 300, 320 snap behind flanges 308, 310. In this way, lock 280 can be simply and inexpensively manufactured.

Figure 48:
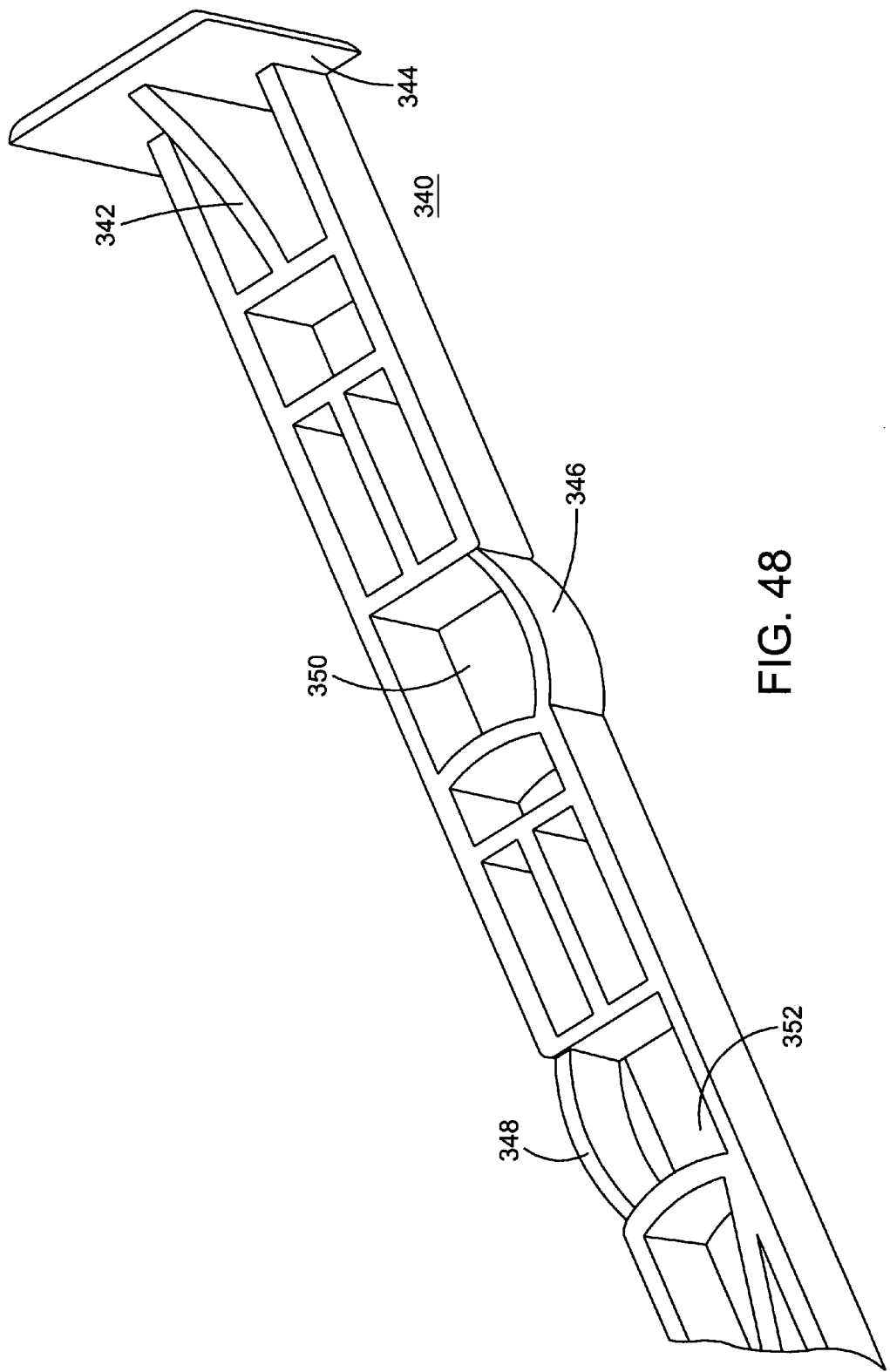
FIG. 48 is a perspective view of a single use lock in accordance with certain aspects of the invention.

Instead of locks 220, 270 and 280, case 150 can be used in connection with a single use lock used to lock case 150 a single time, although it should realized that any of the embodiments disclosed herein can be adapted to be used in connection with such a lock. Lock embodiments 220, 270 and 280 can clearly be used repeatedly as a user can easily remove the locks without damaging either the lock or the case—assuming the user uses magnets 258-264. Referring to FIG. 48, there is shown a single use lock 340 in accordance with the invention. Lock 340 includes an extended rib portion 342 extending up to and supporting a wall portion 344. Instead of the pin holding portions in the previous embodiments, lock 340 includes catch mechanisms in the form of first and second locking members 346, 348. Locking members 346, 348 are substantially arcuate, flexible and biased outwardly as is shown in the figure.

When lock 340 is inserted into case 150, the walls of bottom cover 154 and top cover 152 and the walls of lower lock receiving member 182 and lower lock receiving member 202 engage first and second locking members 346, 348. These locking members 346, 348 are bent inwardly into voids 350, 352 to allow lock 340 to be fully inserted into lock insertion path 212. When lock 340 is inserted far enough into combined lock insertion path 212, the resiliency of locking members 346, 348 causes these members to unbend and mate with hooks 190, 210. However, to remove lock 340, a user would have to grasp wall 344 and pull lock 340 against the force produced by the resiliency of locking members 346, 348 within hooks 190, 210. This is a difficult task as wall 344 will generally be flush against system 150 thereby inhibiting a user from grasping wall 344. Moreover, as there are no pins disposed within locking members 346, 348, a user cannot apply magnets to cause removal of locking members 346, 348 from hooks 190, 210.

Figure 49:
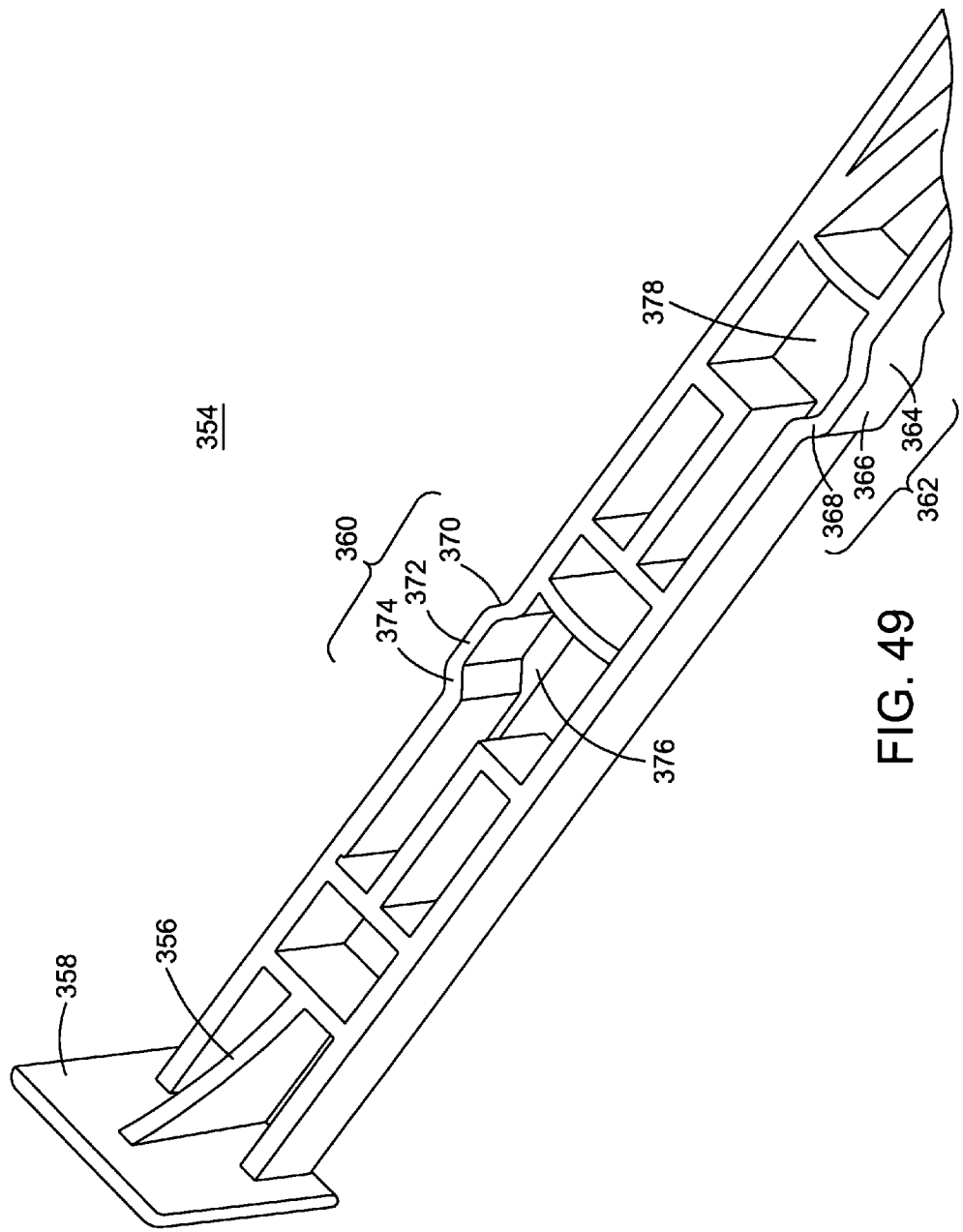
FIG. 49 is a perspective view of another embodiment of a single use lock in accordance with certain aspects of the invention.

An alternative embodiment of a single use lock is shown in FIG. 49. A lock 354 also includes rib 356 and wall 358 as with lock 340. Lock 354 includes catching mechanisms in the form of first and second locking members 360 and 362. Locking members 360, 362 include forward inclined portions 364, 370, flat portions 366, 372 and rearward inclined portions 368, 374. Rearward inclined portions 368, 374 have a slope which is greater than the slope of forward inclined portions 364, 370. Locking members 360, 362 are flexibly mounted with respect to the rest of lock 354 so that locking members 360, 362 may move inwardly into voids 376, 378 upon the application of a sufficient force thereon.

When lock 354 is inserted into case 150, the walls of bottom cover 154 and top cover 152 and the walls of lower lock receiving member 182 and lower lock receiving member 202 engage forward inclined portions 364, 370 of first and second locking members 360, 362. These locking members 360, 362 are bent inwardly into voids 376, 378 to allow lock 354 to be fully inserted into lock insertion path 212. When lock 354 is inserted far enough into combined lock insertion path 212, the resiliency of locking members 360, 362 causes these members to unbend and mate with hooks 190, 210. However, to remove lock 354, a user would have to grasp wall 358 and pull lock 354 against the force produced by rearward inclined portions 368, 374, abutting against hooks 190, 210. As stated above, the slope of rearward inclined portions 368, 374 is greater than the slope of forward inclined portion 364, 370. It is therefore, much easier for a user to insert lock 354 into case 150 than remove lock 354 from case 150. Further, wall 358 will generally be flush against system 150 thereby inhibiting a user from grasping wall 358. Finally, as there are no pins disposed within locking members 360, 362, a user cannot apply magnets to cause removal of locking members 360, 362 from hooks 190, 210.

Figure 50:
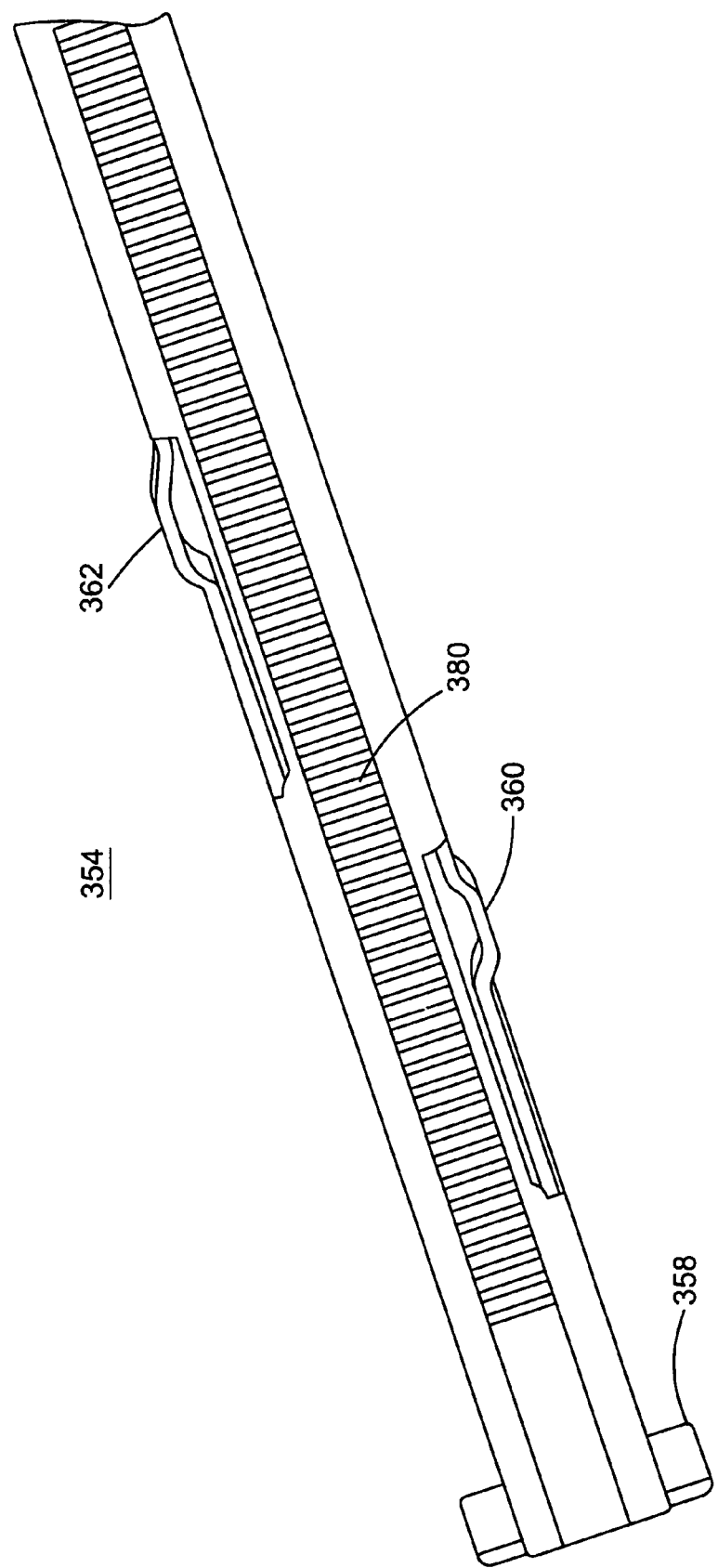
FIG. 50 is a perspective view of the bottom of the lock shown in FIG. 49.
Figure 51:
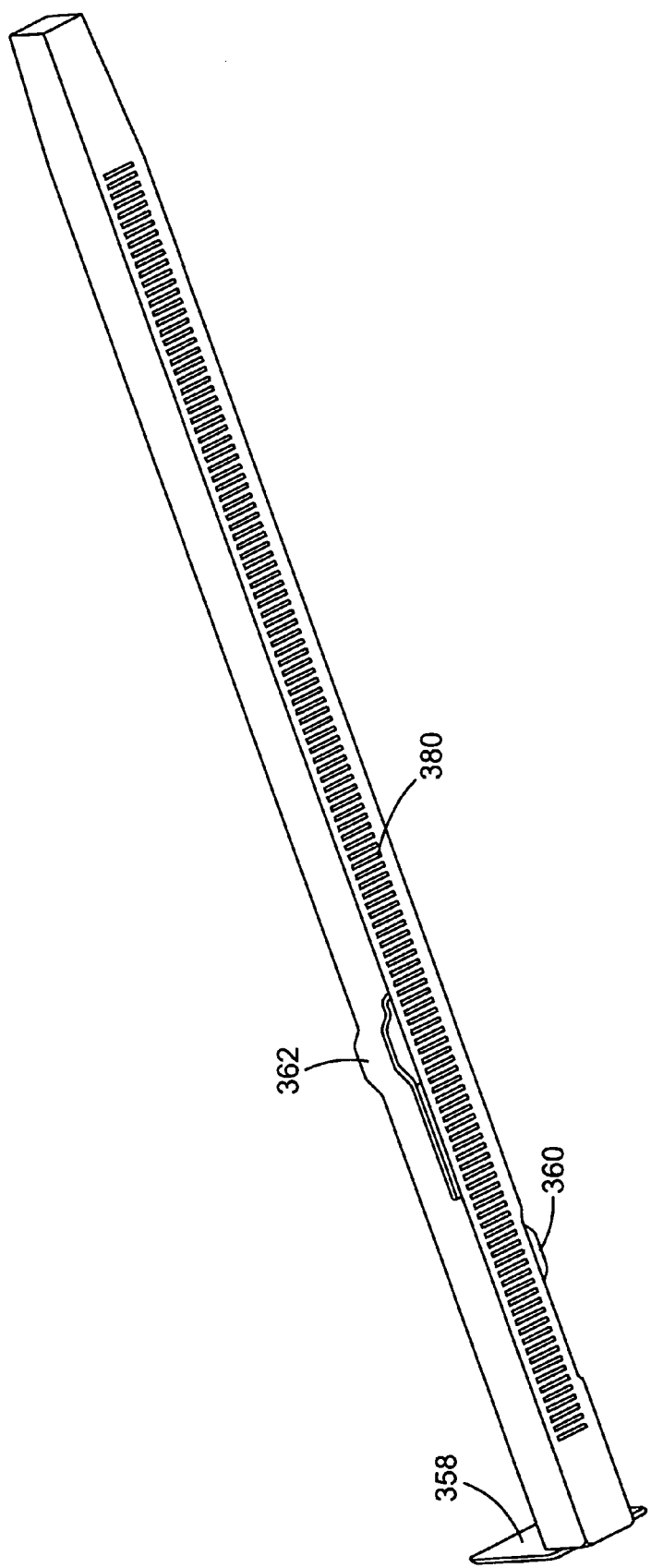
FIG. 51 is a perspective view of the bottom of the lock shown in FIG. 49.

Referring to FIGS. 50 and 51, there is shown a bottom perspective view of lock 354 or lock 340 with an optional added safety feature. As shown, a noise maker 380 is comprised of a plurality of projections which further define a plurality of indentations therebetween. If a thief attempted to remove lock 354 from storage case 150, noise maker 380 would rub against the inside of storage case 150 thereby creating a large noise and alerting security. Although noise maker 380 is shown on lock 354, it should be clear that noise maker 380 could be combined with any of the locks described above.

Referring again to FIG. 24, bottom cover 154 of case 150 includes a hub 156 fixedly mounted thereon and which receives and retains storage medium 70 thereon. Bottom cover 154 further may optionally include a memory recess 158 which can be used to store a memory card or similarly sized device (not shown) related to storage medium 70. Top cover 152 includes two resilient tabs 160 which can be used to retain documents related to storage medium 70.

Figure 25:
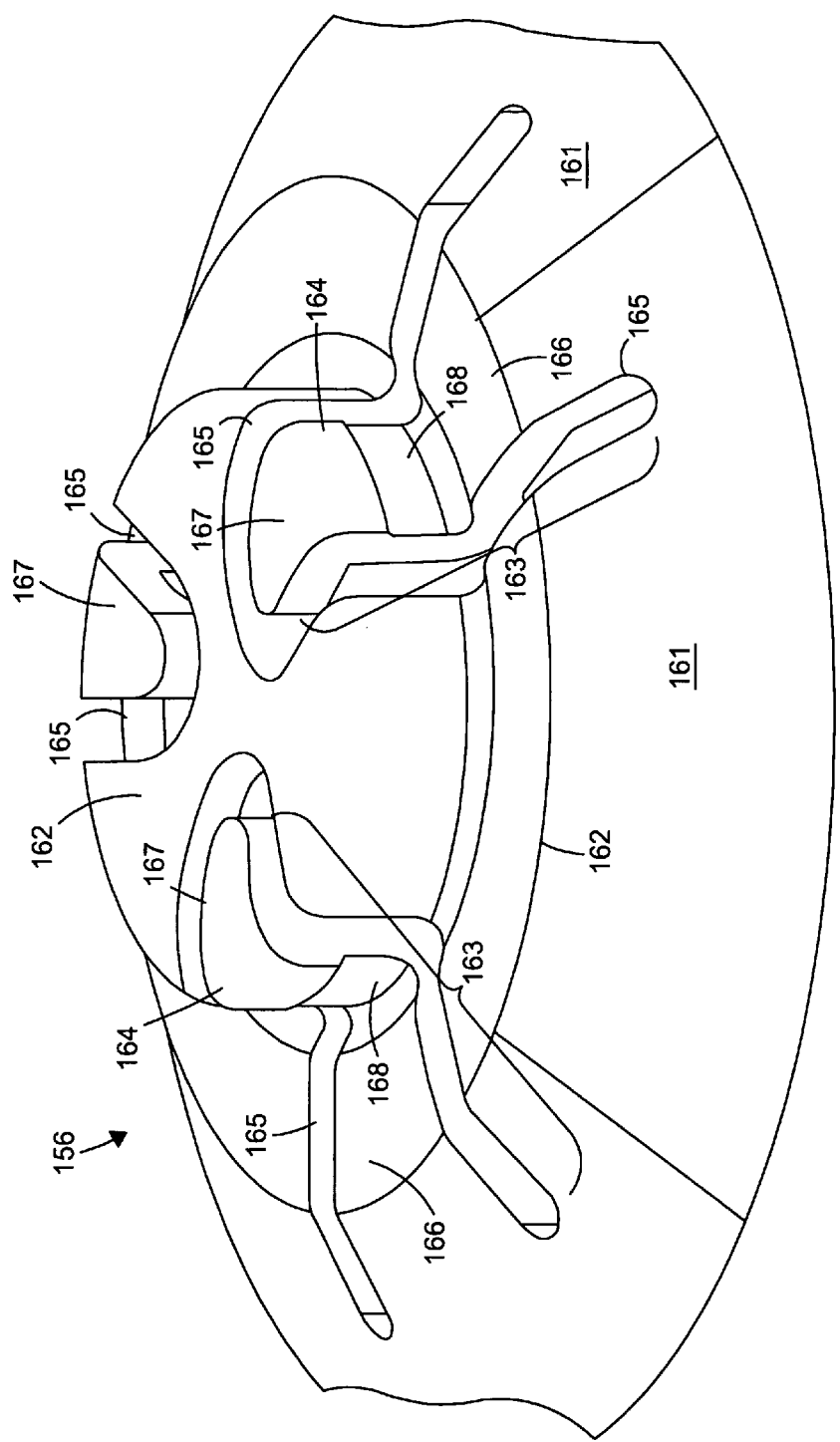
FIG. 25 is a perspective magnified view of a hub used in accordance with certain aspects of the invention.

Referring to FIG. 25, hub 156 is substantially cylindrical in shape and is disposed upon and integral with a frustrum portion 161. Hub 156 is designed so that it puts minimal stress on storage medium 70 when it is stored on hub 156, and when recording medium 70 is lifted or removed therefrom.

Figure 14:
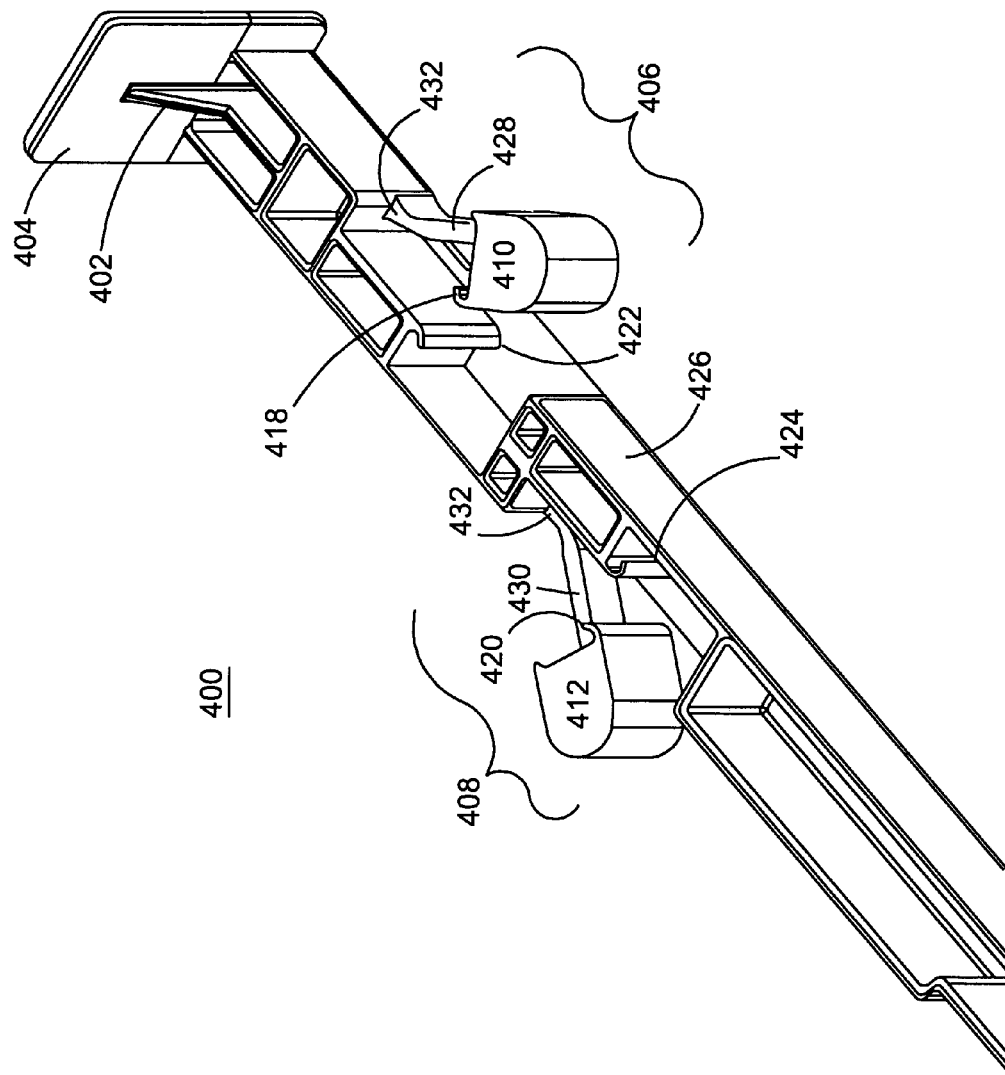
FIG. 14 is a magnified perspective view of the lock of FIG. 12.
Figure 15:
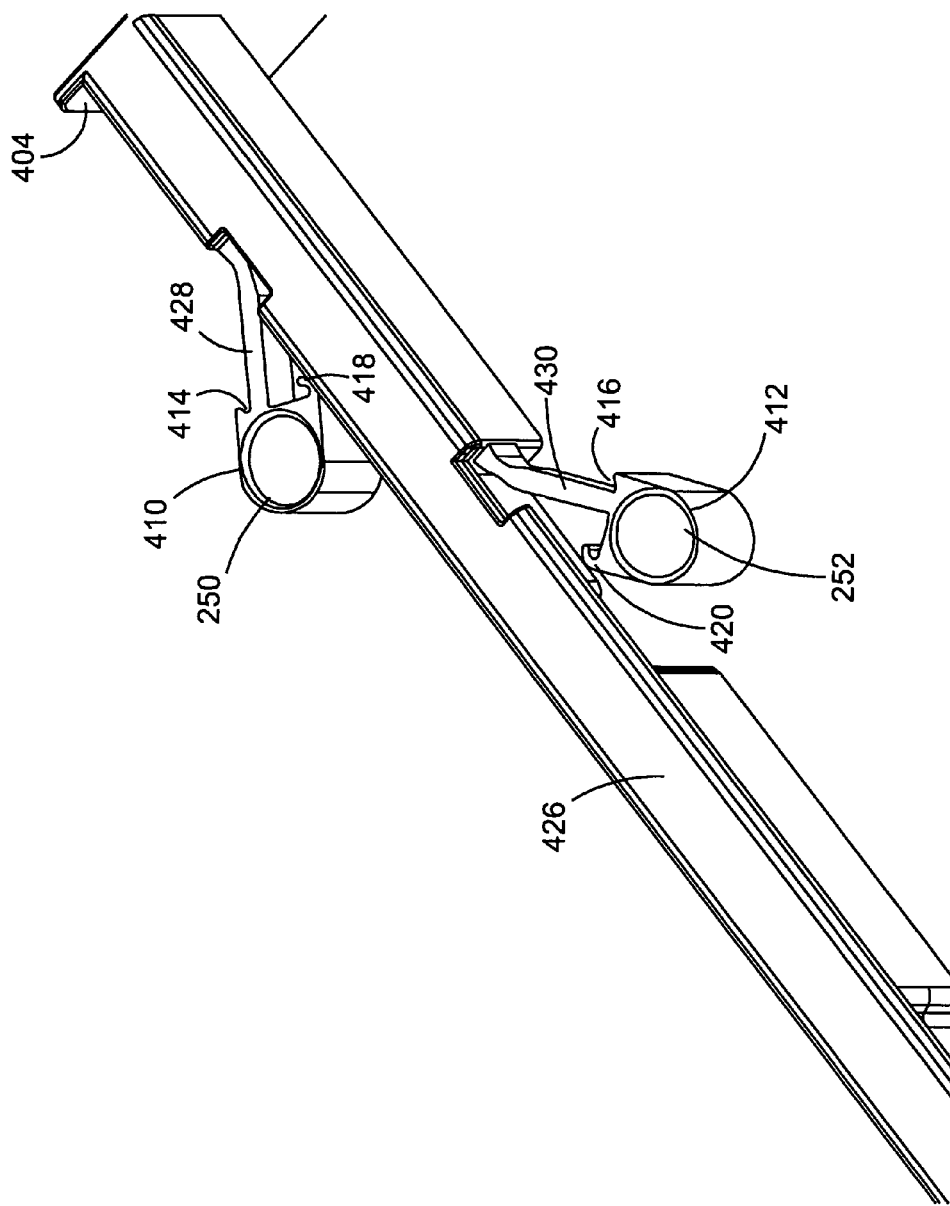
FIG. 15 is a magnified perspective view of the lock of FIG. 12.

Hub 156 and frustrum portion 161 are comprised of a Y-shaped member 162 fixed to bottom cover 154 (not explicitly shown in FIG. 14). Y-shaped member 162 defines three arcuate voids 165. Three resilient members 163 are disposed radially about Y-shaped member 162 within voids 165. Each resilient member 163 includes a base portion 166 that extends substantially perpendicular to a body portion 168. A head portion 167 has a substantially arcuate shape and extends substantially perpendicular to body portion 168 and parallel to base portion 166. Head portion 167 further includes a protrusion 164 extending radially therefrom. Referring also to FIG. 1, resilient members 163 are biased radially outwardly so that the circumference of a circle drawn around protrusions 164 is larger than the circumference of opening 72 of recording medium 70. It should be realized that other hubs could be used in accordance with the features of the invention. For example, the hub disclosed in co-pending application Ser. No. 09/696,614, entitled "A CASE AND LOCK WITH IMPROVED DISC PROTECTION" filed on Oct. 25, 2000, the entire disclosure of which is hereby incorporated by reference, could be used as well.

In use, when recording medium 70 is to be placed upon hub 156, opening 72 is placed around protrusions 164. A downward force is applied upon recording medium 70 and causes head portions 167 of resilient members 163 to bend further inwardly into voids 165 due to the engagement of unused portion 74 with protrusions 164. Upon the application of sufficient downward force upon recording medium 70, resilient members 163 will bend inwardly far enough so that the circumference around protrusions 164 will be less than the circumference of opening 72 thereby allowing recording medium 70 to be placed upon frustrum 161. At this point, unused portion 74 no longer applies a force upon protrusions 164 and resilient members 163 resume their original position due to their natural resiliency. Protrusions 164 now retain recording medium 70 on frustrum 161 and feet 64 with minimal stress on medium 70. In order to remove recording medium 70, a user will place his fingers in recesses 66, apply a force upon hub 156, and lift off recording medium 70 therefrom with minimal effort. In this way, recording medium 70 can be safely placed upon and removed from hub 156 without being damaged. It should be noted that although three resilient members and voids are shown, the invention can still be realized with the use of any number of resilient members and only one resilient member and voids, including only one resilient member and corresponding void.

Figure 52:
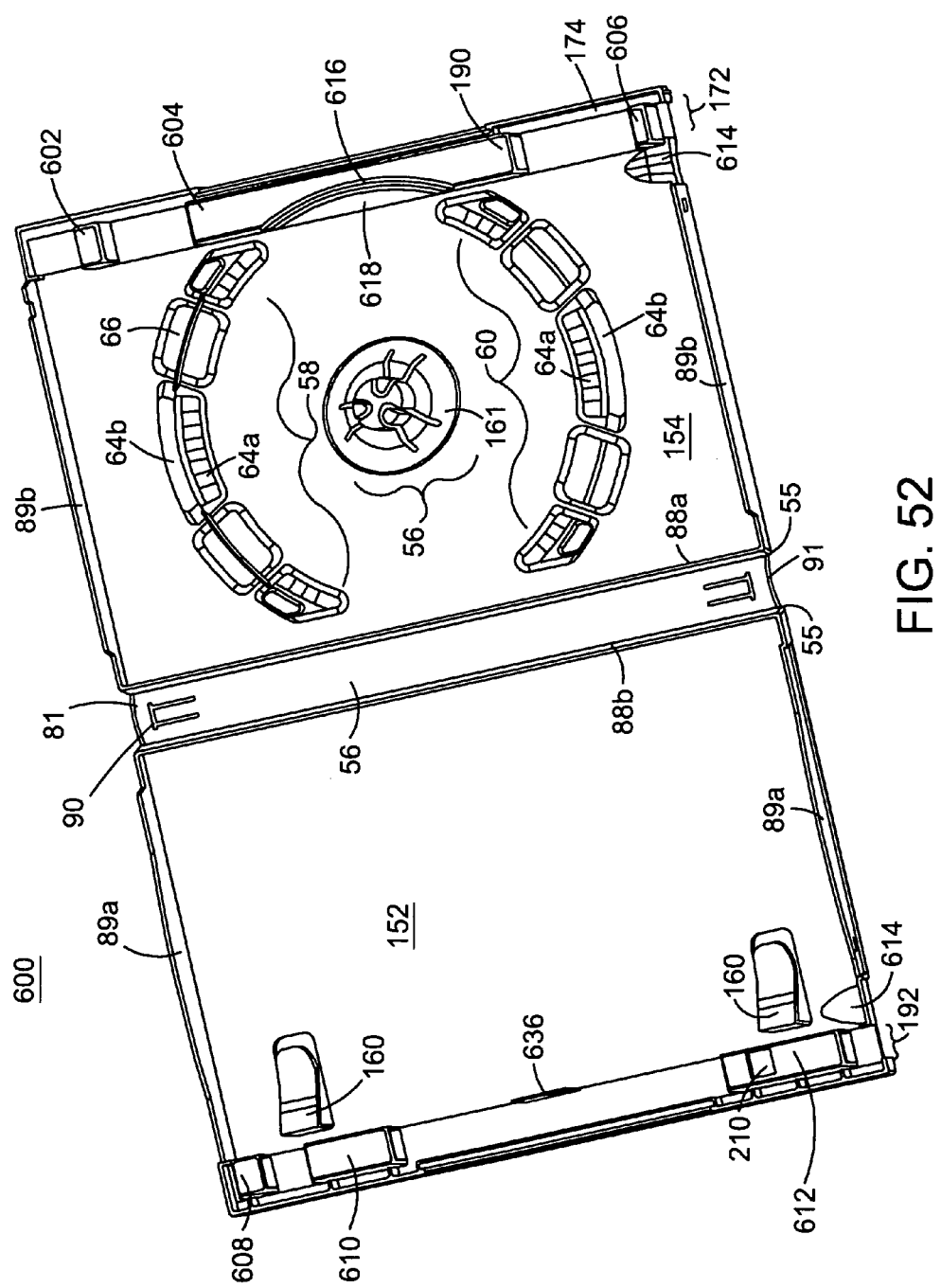
FIG. 52 is a perspective view of yet another storage case in accordance with the invention.

Referring to FIG. 52, there is shown another embodiment of a storage case in accordance with certain aspects of the invention. Storage case 600 includes many of the features of the previous embodiments and so a detailed description of these elements is omitted for the sake of brevity. Bottom lock portion 172 is divided into an upper lock receiving member 602, middle lock receiving member 604, and lower lock receiving member 606 which are used to receive and retain a lock as with storage case 150. Similarly, top lock portion 192 includes an upper lock receiving member 608, a middle lock receiving member 610 and a lower lock receiving member 612. The receiving members 602-612 are designed so that they are interlaced and mesh with one another when top cover 152 is closed upon bottom cover 154.

Resilient tabs 160 are disposed closer to top lock portion 192 and hub 156 is substantially centered both vertically and horizontally on bottom cover 154. These modifications facilitate insertion of the contents of storage case 600 using existing automated high speed packing equipment. To allow for this different position of hub 156 while still ensuring that storage case 600 conforms to standard dimensions for DVD cases, middle lock receiving member 604 includes a cut away portion 616 so that recording medium 70 may be placed directly on hub 156 through middle lock receiving member 604. Bottom cover 154 further includes shelf 618 disposed beneath cut-away 616. In this way, when storage medium 70 sits on frustrum support 161 of hub 156, storage medium 70 is supported by feet 64 and shelf 618. A hold-down rib 636 sits on recording medium 70 when recording medium 70 is placed on hub 156 and top cover 152 is closed upon bottom cover 154. Hold-down rib 636 thereby assists in maintaining recording medium 70 on hub 156.

Figure 53:
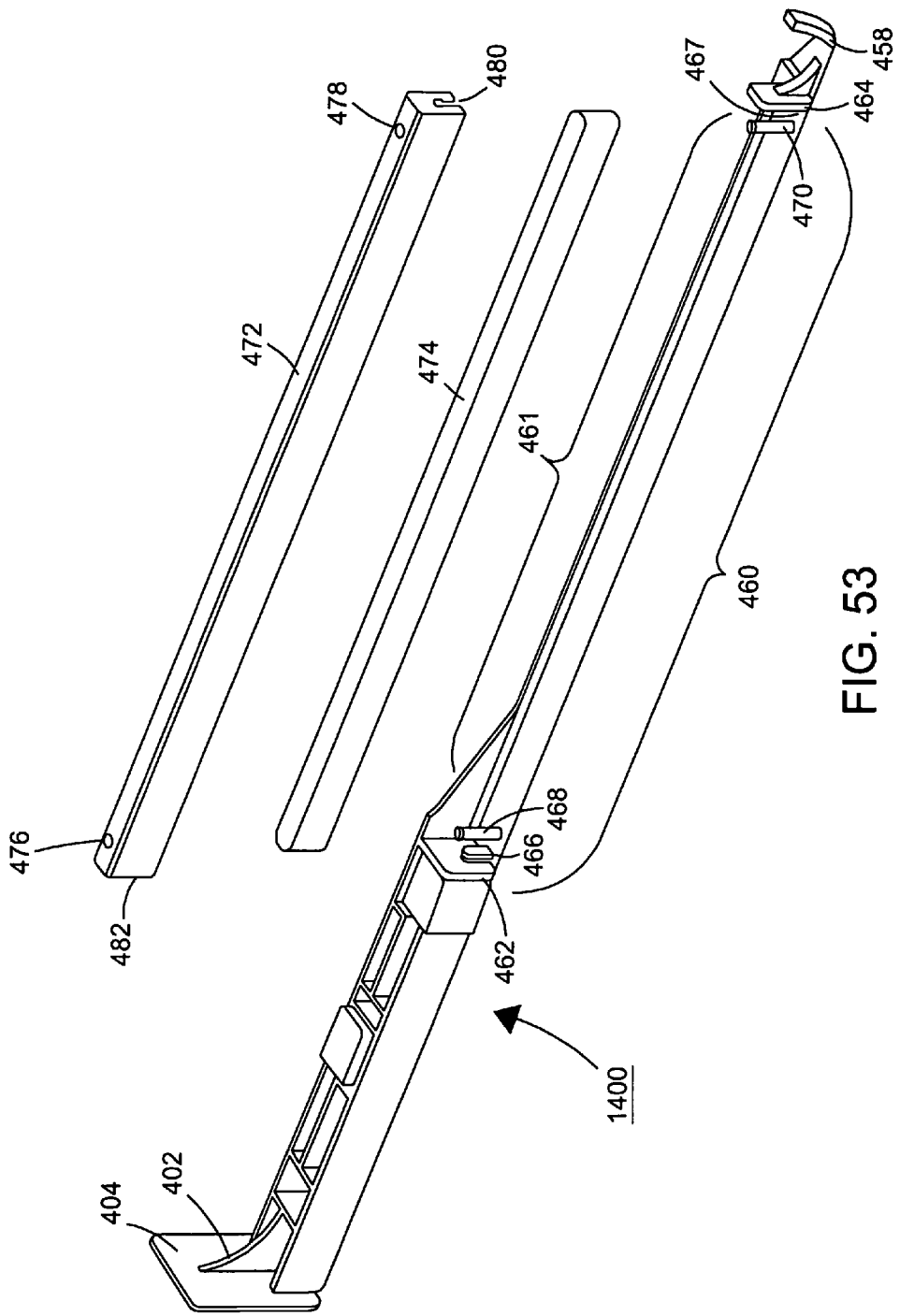
FIG. 53 is a partially exploded perspective view of yet another lock in accordance with the invention.

Referring to FIG. 53, there is shown another embodiment of lock 400, referred to herein as lock 1400, which can be used with system 600 or any of the other storage cases disclosed herein. As shown in the figure, lock 1400 may optionally include a security tag receiving portion 460. Security tag receiving portion 460 is defined by walls 462, 464 having key portions 466 (only the key portion for wall 462 is shown in the figure) extending inwardly. Posts 468, 470 are disposed at distal ends of security tag receiving portion 460 and are effective to receive and maintain openings 476, 478 of a bobbin 472. Bobbin 472 further includes keyholes 480, 482 (only one is shown in the figure) disposed on distal ends of bobbin 472 which mate with key portions 467, 466 respectively. Bobbin 472 may be used to hold a coil 474 which actuates an alarm if lock 1400 is moved beyond the security check point (not shown). Lock 1400 may also include a cut-away portion 461 disposed on one side of lock 1400 between first and second catch mechanisms 406, 408 (see FIGS. 12 and 13) and a hook portion 458. cut-away portion 461 permits lock 1400 to be used with system embodiments which employ the feature of shelf 618.

Figure 54:
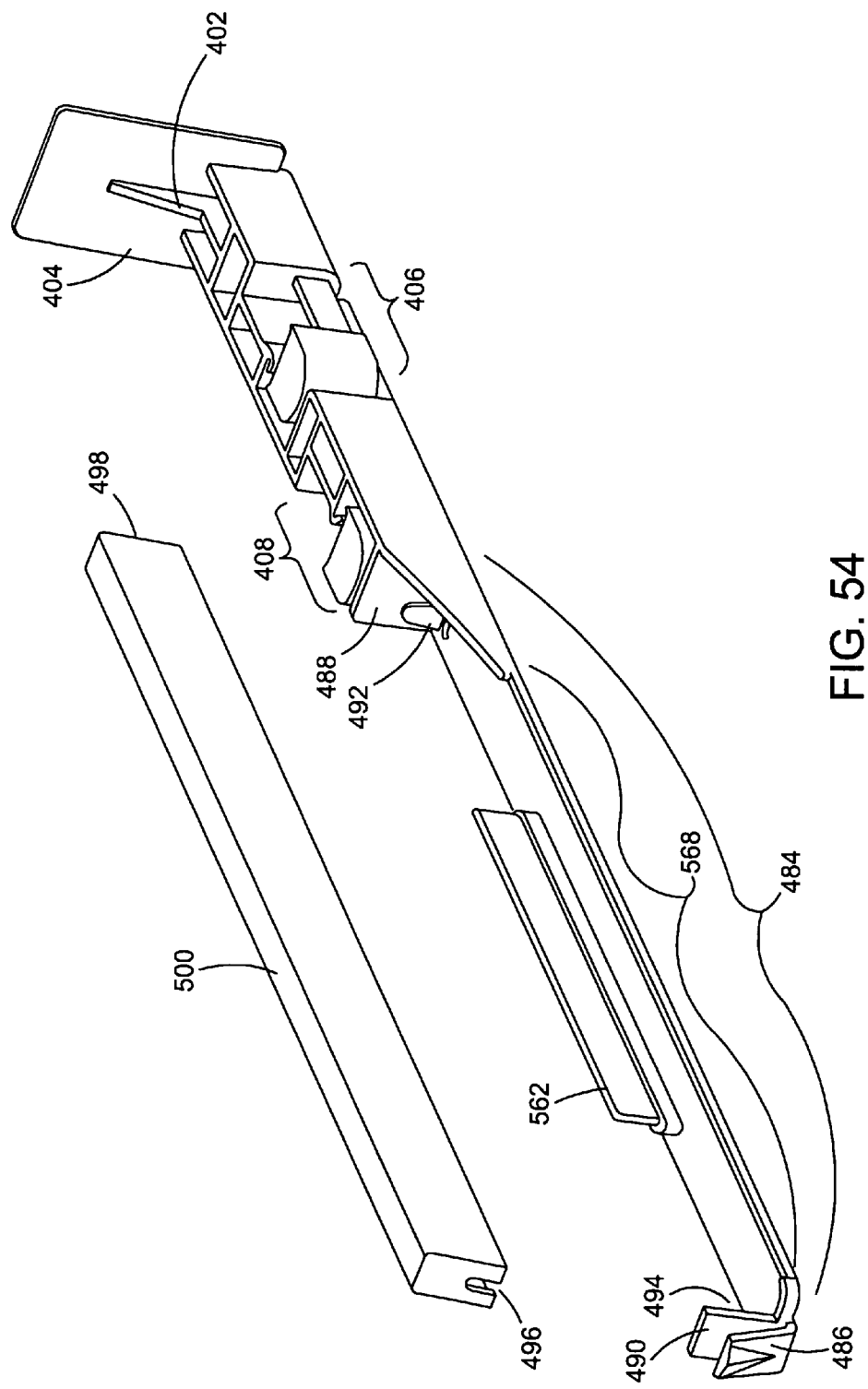
FIG. 54 is a partially exploded view of the lock of FIG. 53 with an alternative security tag receiving portion.
Figure 55:
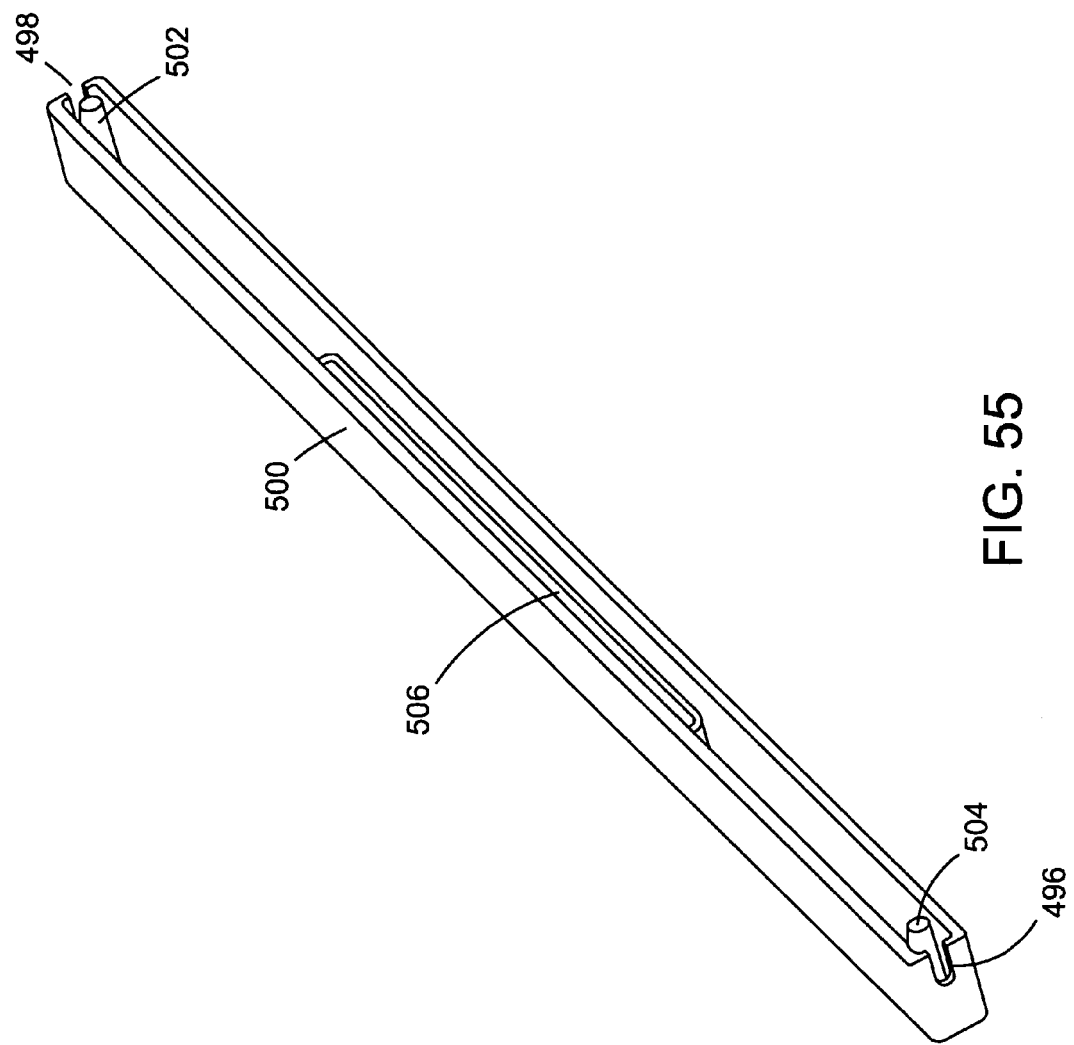
FIG. 55 is a perspective view of a bobbin used with the lock of FIG. 54.

Referring to FIG. 54, a lock 2400 with an alternative security tag receiving portion 484 is shown. Lock 2400 can be used with storage case 600 or any of the other storage cases disclosed herein. With alternative security tag receiving portion 484, a modified springed hook portion 486 may be used at an end of lock 2400. As with security tag receiving portion 460, alternative security tag receiving portion 484 is defined by walls 488, 490 and includes key portions 492, 494 (only key portion 492 is shown) which receive and mate with key holes 496, 498 (only key hole 496 is shown) of bobbin 500. Referring to FIG. 55, bobbin 500 includes posts 502, 504 which strengthen the attachment between key portions 492, 494 and key holes 496, 498 when bobbin 500 is coupled to alternative security tag receiving portion 484. Bobbin 500 further includes a recess 506 with a substantially elliptical cross-section. Recess 506 mates with a support protrusion 562 when bobbin 500 is combined with alternative security tag receiving portion 484. Lock 2400 also includes a cut-away portion 568 disposed on one side of lock 2400 between first and second catch mechanisms 406, 408 and hook portion 486. Cut-away portion 461 permits lock 2400 to be used with storage case embodiments utilizing the feature of shelf 618.

Figure 56:
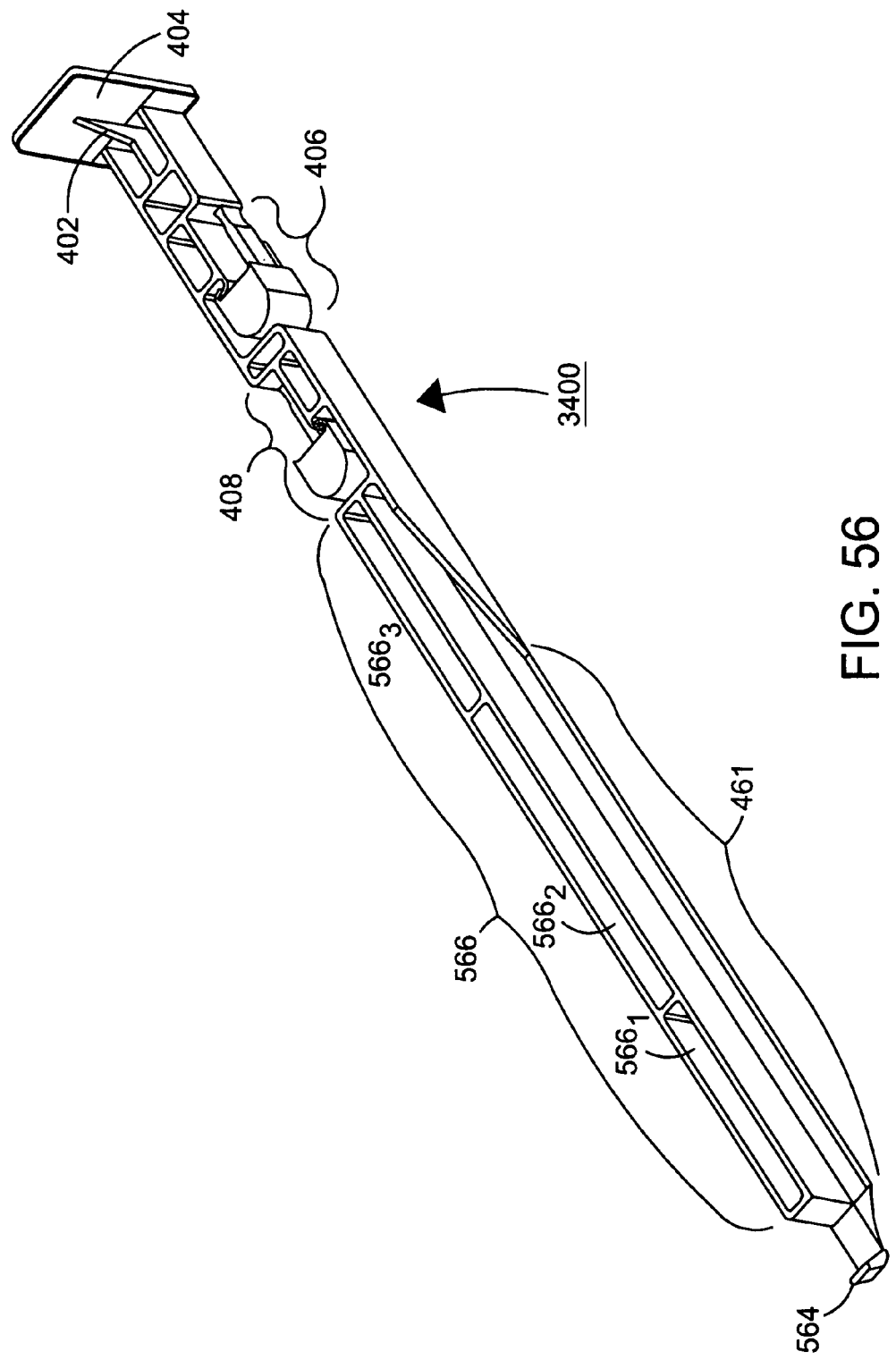
FIG. 56 is a perspective view of the lock of FIG. 53 without a security tag receiving portion.

Referring to FIG. 56, there is shown yet another embodiment of a lock in accordance with certain aspects of the invention. Lock 3400 can be used with system 600 or any of the other storage cases disclosed herein. Lock 3400 includes spring hook portion 564. Unlike locks 1400 and 2400, lock 3400 does not include a security tag receiving portion but merely a structural support portion 566 that does not include a bobbin or coil. Structural support portion 566 includes three voids 5661, 5662, 5663. These three voids may be combined to form a single large void which can then be used to receive and retain a bobbin and coil as with the previous embodiments. Lock 3400 also includes a cut-away portion 461 disposed on one side of lock 3400 between first and second catch mechanisms 406, 408 and hook portion 564. Cut-away portion 461 permits lock 3400 to be used with case utilizing shelf 618.

Figure 57:
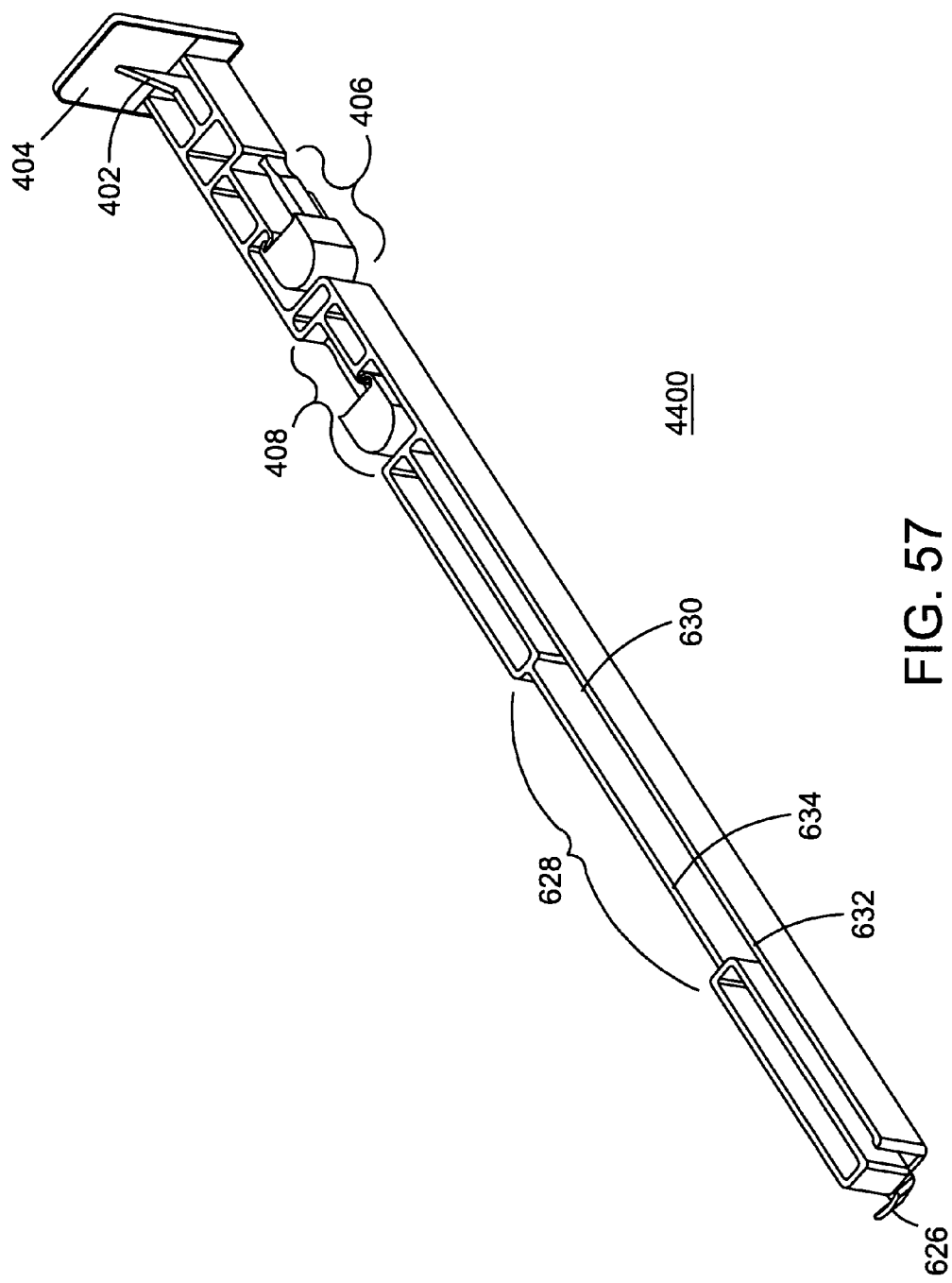
FIG. 57 is a perspective view of an alternative lock in accordance with certain aspects of the invention.

Alternatively, referring to FIG. 57, there is shown another lock which could be used with system 600, or with any of the other storage cases disclosed herein. Lock 4400 includes many of the features of the previous locks and a detailed description of these features is omitted for the sake of brevity. In fact, lock 4400 is virtually identical to lock 400 except the lock 4400 includes springed hook portion 626 at a distal end thereof. A security tag recess 628 is disposed between second catch mechanism 408 and springed hook portion 626. security tag recess 628 may optionally receive and retain a security tag (not shown). A disc and shelf receiving recess 630, defined by walls 632, 634 extends from a portion of lock 4400 proximate to springed hook portion 626 to a position proximate to second catch mechanism 408. Disc and shelf receiving recess 630 is used to receive and retain storage medium 70 in combination with shelf 618. In use, when lock 4400 is inserted into system 600, walls 632, 634 slide around recording medium 70 and shelf 618, support recording medium 70 on shelf 618, and inhibit access to recording medium 70.

Although storage cases 700, 780, 150 and 600 are shown with open portions 188a and 208a, it should be clear that these openings could be closed off by walls thereby blocking lock insertion paths 188 and 208. Further, if desired, portions of loops 716, 718, 720, 722, 726, 728, 730, and 732 and lock receiving members 180, 182, 200, 202, 602, 604, 606, 608, 610, and 612 could also be blocked off with walls so as to inhibit insertion of any lock.

Figure 58:
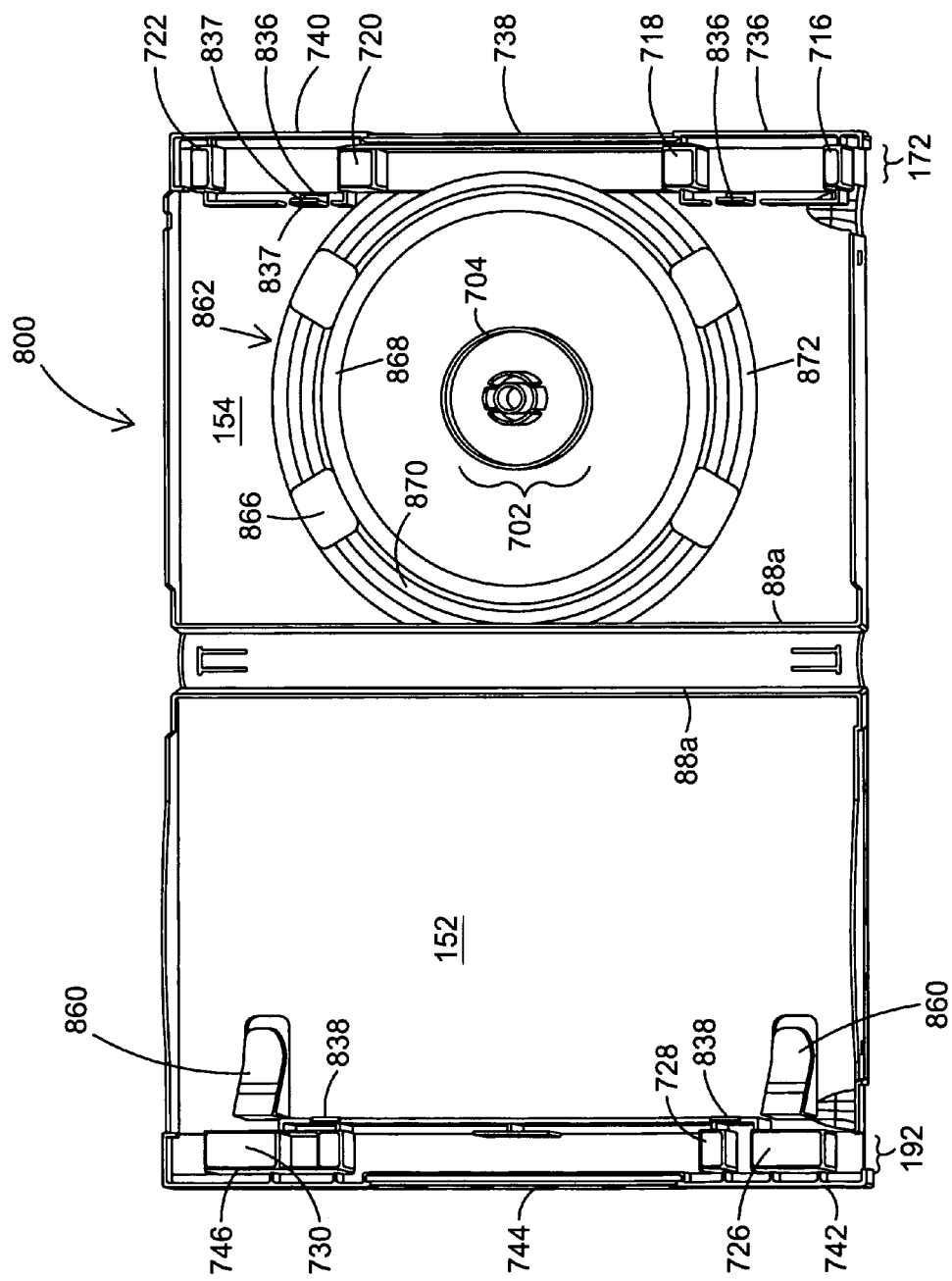
FIG. 58 is a top perspective view of yet another storage case in accordance with the invention.
Figure 59:
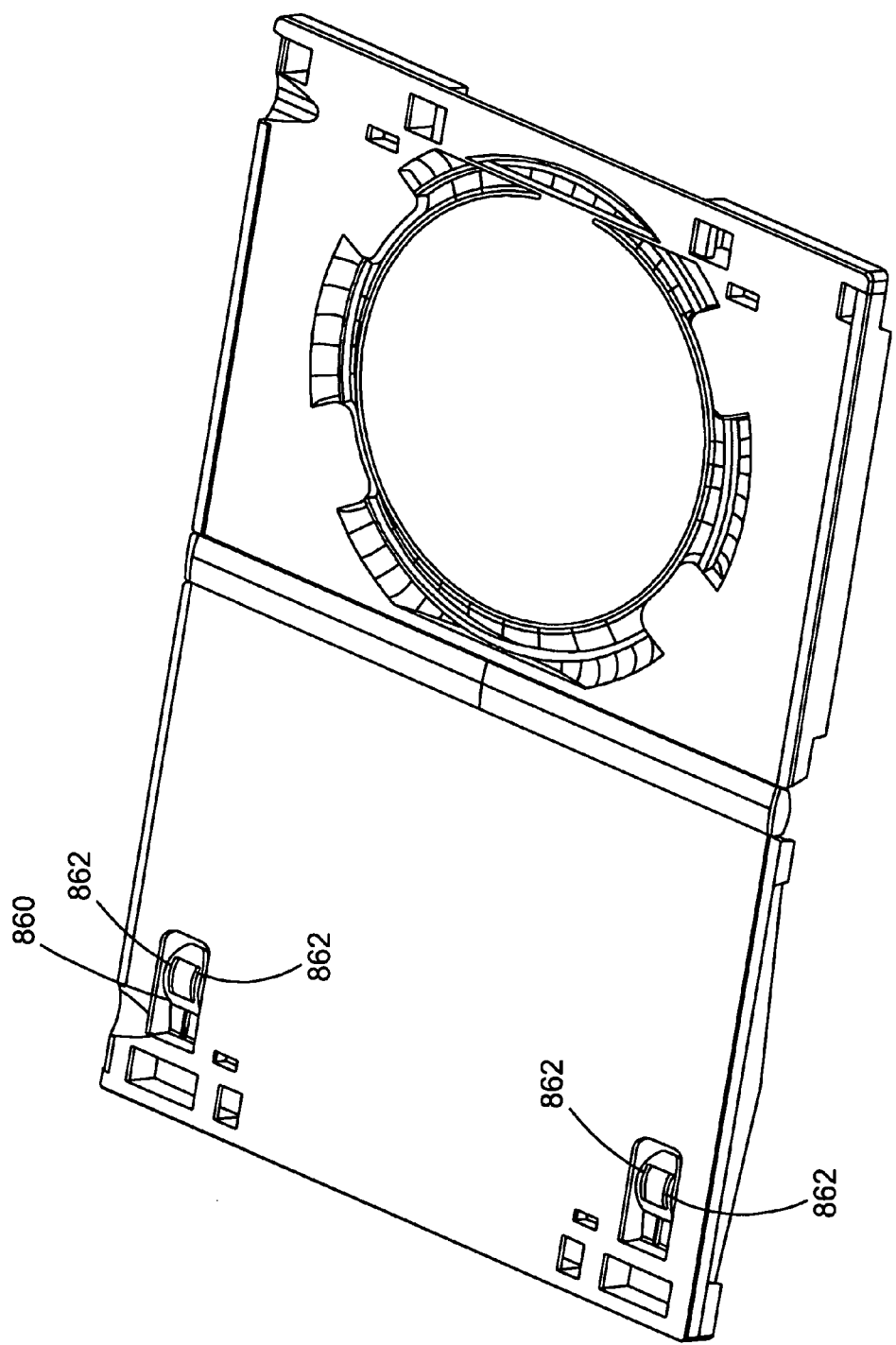
FIG. 59 is a bottom perspective view of the storage case of FIG. 58.
Figure 60:
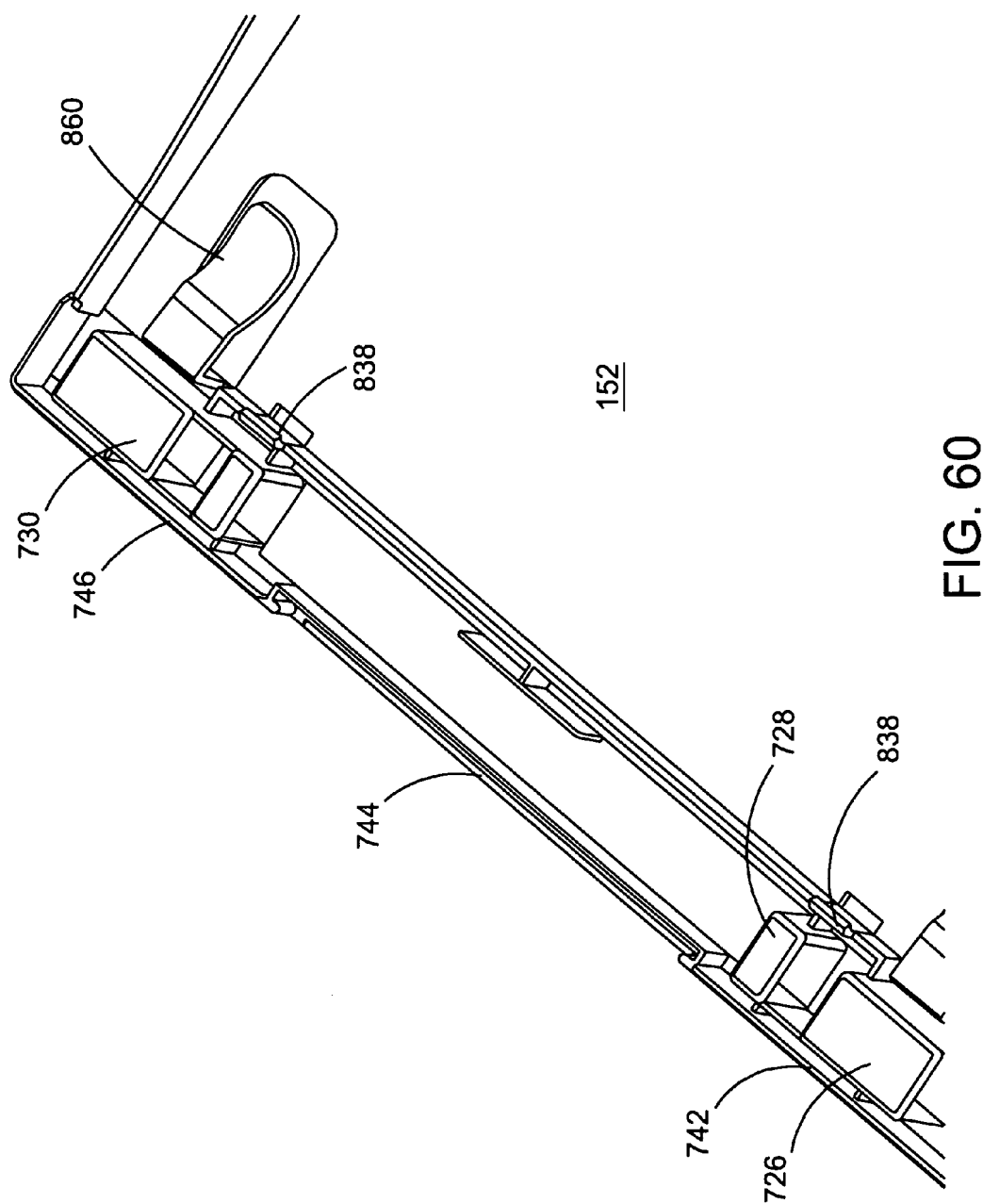
FIG. 60 is a blown-up cutaway view of a portion of the case of FIG. 58.

Referring to FIGS. 58-60, there is shown another storage case 800 which could be used in accordance with the invention. Storage case 800 is very similar to, and includes many of the same elements, as storage case 700. A detailed discussion of these elements is omitted for the sake of brevity. The differences lie in document tabs 860, a holding portion 862 and locking tab portions 836, 838. Otherwise, cases 800, 700 are basically the same and are used in basically the same way.

Document tabs 860 include ribs 862 disposed on the underside of tabs 860, FIG. 59, to more securely retain a booklet or other documents in case 800. Ribs 862 function to more securely grip a booklet or other documents relating to recording medium 70 when a portion of such documents is inserted under tabs 860, between the tabs and top cover 152. Ribs 862 can be formed in any other shape or configuration, e.g., dots, just so long as the ribs more securely grip the booklet or other documents.

Holding portion 862 differs from upper and lower portions 58, 60 in that holding portion 862 does not consist of a plurality of arcuate shaped feet 64. Instead, holding portion 862 consists of an lower shelf 868 to support the outer edges of recording medium 70, and a somewhat annular upper shelf 870 interrupted by bottom lock portion 172 and side wall 88a. Upper shelf 870 is also interrupted by a plurality of finger access holes or recesses 866 to allow a user to places his or her fingers under recording medium 70 so it can be lifted off hub 702 and lower shelf 868. Preferably, upper shelf 870 has a hollow rounded upper portion 872 that extends up from bottom cover 154, FIG. 59.

Locking tab portions 836, 838 are formed in bottom cover 154 and top cover 152, respectively, to maintain case 800 in the closed position. Locking tab portions 836, 838 are constructed in accordance with any of the known methods. Preferably, each tab portion 836 is formed of a pair of wall members 837 that define a space therebetween to receive a tab portion 838 in a snap-fit relationship. Thus, tab portion 838 snap-fits with wall members 837 when case 800 is closed. The snap-fit between tab portion 836 and wall members 837 keeps case 800 in the closed position until a user lifts top cover 152 away from bottom cover 154 with a modest amount of force. This causes locking tab portions 836, 838 to disengage.

Thus, by providing a combined lock insertion path that is produced by the combination of an insertion path in a top cover and an insertion path in a bottom cover of a storage case, and inserting a lock within that insertion path, a stronger, more secure storage case is available than storage cases of the prior art. The lock in combination with the storage case provides a very stiff and strong structure in comparison with prior art storage cases. The combination is slimmer than prior art lock and storage case combinations thereby conserving the shelf space necessary for the case and lock. The lock itself provides structural integrity to the entire storage case combination. The lock-case combination produces an internal locking mechanism which still satisfies VSDA sizing parameters.

Although the present invention has been described in relation to particular embodiments thereof, many other variations and modifications and other uses will become apparent to those skilled in the art.

What is claimed is:

1. A system for locking an item, said system comprising:
   a containing element including first and second enclosure members, said containing element configured to enclose said item; and
   a lock comprising:
   a base having a portion configured to move inside said containing element when said containing element is closed; and
   a catch mechanism attached to said portion and configured to be moved relative to said portion by a magnetic field, said catch mechanism comprising a metal component that is, in the presence of said magnetic field, subject to a magnetic force and is configured to be located inside said containing element when said containing element is closed; wherein:
said first enclosure member comprises a first loop and said second enclosure member comprises a second loop; and,
when said containing element is locked, said lock is present in said first loop and in said second loop.

2. The system of claim 1 wherein said catch mechanism is further configured to engage said containing element to lock said containing element in a closed configuration.

3. The system of claim 1 wherein said containing element encloses said item when said first enclosure member is moved to a position adjacent said second enclosure member.

4. The system of claim 3 wherein said first enclosure member is hinged to said second enclosure member.

5. The system of claim 1 wherein said catch mechanism is further configured to automatically engage said containing element when said portion is disposed inside said containing element and is urged toward the outside of said containing element.

6. The system of claim 1 wherein said component is a first component and said catch mechanism further comprises at least one second component consisting of only material that is not magnetically reactive.

7. The system of claim 6 wherein said second component is configured to be moved by said first component.

8. The system of claim 7 wherein, of said first and second components, only said second component is configured to engage said containing element.

9. The system of claim 1 wherein said catch mechanism is configured to be displaced by said magnetic field, when said containing element is closed, from a first position inside said containing element to a second position inside said containing element.

10. The system of claim 1 wherein said item is a storage medium.

11. The system of claim 1 wherein said item is a recording medium.

12. The system of claim 1 wherein said catch mechanism is moveable to a position in which said catch mechanism does not extend beyond a periphery of said base.

13. The system of claim 12 wherein said catch mechanism comprises at least one component subject to a magnetic force in the presence of a magnetic field.

14. The system of claim 12 wherein application of said magnetic field is effective to move said catch mechanism to said position.

15. The system of claim 14 wherein said catch mechanism is further moveable to a position in which a portion of said catch mechanism extends beyond said periphery.

16. The system of claim 1 wherein said containing element comprises an indent adapted to receive a finger of a user.

17. The system of claim 1 wherein said containing element is further configured to receive a memory card.

18. The system of claim 1 wherein said containing element comprises a document retaining member.

19. The system of claim 18 wherein said document retaining member includes a gripping element.

20. The system of claim 19 wherein said gripping element comprises a rib.

21. The system of claim 1 wherein said containing element comprises a hub configured to retain said item.

22. The system of claim 1 wherein said portion is configured to support a security tag.

23. The system of claim 3 wherein at least one of said first and second loops is configured to receive said portion.

24. The system of claim 1 wherein:
said lock further comprises a handle portion; and,
when said containing element is locked, said handle portion is not enclosed in said containing element.

25. The system of claim 1 wherein said magnetic field is emitted by a magnetic decoupler.

26. The system of claim 25 wherein said magnetic field is configured to disengage said catch mechanism from said containing element.

27. The system of claim 1 wherein said lock further comprises a second catch mechanism attached to said portion and configured to be moved relative to said portion by a magnetic field.

28. The system of claim 1 wherein:
said catch mechanism is elongated and has a first end and a second end;
said first end is fixed to said portion at a position on said portion, said catch mechanism extending away from said position; and
said second end is movable with respect to said position.

29. The system of claim 28 wherein said second end is configured to move in a direction that is substantially circumferential to said position.

30. The system of claim 28 wherein:
said containing element has walls that define an enclosure only when said second containing element is closed;
said enclosure is configured to enclose said item; and,
when said containing member is locked, said position is inside said enclosure.

31. The system of claim 30 wherein said enclosure:
comprises a top wall, a bottom wall, and four side walls;
defines at least one opening configured to be occupied by said lock; and,
exclusive of said opening, is configured to completely enclose said item.

32. The system of claim 30 wherein at least part of the catch mechanism is configured to pass through one of said loops when said portion is passed through the same one of said loops.

33. The system of claim 32 wherein said enclosure:
has a top wall, a bottom wall, and four side walls;
defines an opening configured to be occupied by said lock; and,
exclusive of said opening, is configured to completely enclose said item.

34. The system of claim 30 wherein one of said enclosure members is configured to interfere with said second end when, in the absence of said magnetic field, said portion is urged out of from said containing element.

35. The system of claim 34 wherein one of said loops is configured to interfere with said second end.

36. The system of claim 30 wherein said catch mechanism is configured to be removed entirely from said containing element when said containing element is closed.

37. The system of claim 1 wherein said catch mechanism is:
mechanically biased to engage one of said loops to prevent withdrawal of said lock from said containing element; and
configured to be magnetically moved away from the same one of said loops to configure said lock for removal from said containing element.

38. The system of claim 37 wherein said catch mechanism is configured to be removed entirely from said containing element when said containing element is closed.

39. The system of claim 1 wherein said catch mechanism is configured to be removed entirely from said containing element when said containing element is closed.

40. The system of claim 1 wherein:

said catch mechanism is elongated and has a first end and a second end;

said first end is fixed to said portion at a position on said portion, said catch mechanism extending away from said position; and said second end is movable with respect to said position; wherein:

said second end is configured to move in a direction that is substantially circumferential to said position;

said containing element has walls that define an enclosure only when said second containing element is closed;

said enclosure is configured to enclose said item; and, when said containing member is locked, said position is inside said enclosure.

41. The system of claim 40 wherein said enclosure:

comprises a top wall, a bottom wall, and four side walls;

defines at least one opening configured to be occupied by said lock; and, exclusive of said opening, is configured to completely enclose said item.

42. The system of claim 41 wherein at least part of the catch mechanism is configured to pass through one of said loops when said portion is passed through the same one of said loops.

43. The system of claim 42 wherein one of said loops is configured to interfere with said second end.

44. The system of claim 43 wherein said catch mechanism is configured to be removed entirely from said containing element when said containing element is closed.

45. The system of claim 44 wherein said catch mechanism is:

mechanically biased to engage one of said loops to prevent withdrawal of said lock from said containing element; and configured to be magnetically moved away from the same one of said loops to configure said lock for removal from said containing element.

46. The system of claim 45 wherein at least one of said loops is at least partially defined by a portion of a structure having a C-shaped cross-section.

47. The system of claim 45 wherein at least one of said loops is at least partially defined by a portion of a structure having a U-shaped cross-section.

48. The system of claim 45 wherein at least one of said loops is at least partially defined by a structure having a cross-section that is open on one side.

49. The system of claim 1 wherein said catch mechanism is configured to be removed entirely from said containing element when said containing element is closed.

50. The system of claim 49 wherein at least one of said loops is at least partially defined by a portion of a structure having a C-shaped cross-section.

51. The system of claim 49 wherein at least one of said loops is at least partially defined by a portion of a structure having a U-shaped cross-section.

52. The system of claim 49 wherein at least one of said loops is at least partially defined by a structure having a cross-section that is open on one side.

\* \* \* \* \*

UNITED STATES PATENT AND TRADEMARK OFFICE
CERTIFICATE OF CORRECTION

PATENT NO. : 7,260,962 B2 Page 1 of 1
APPLICATION NO. : 10/796332
DATED : August 28, 2007
INVENTOR(S) : Michael Lax et al.

It is certified that error appears in the above-identified patent and that said Letters Patent is hereby corrected as shown below:

In section 56, U.S. Patent Documents:
    In 3,095,723 "McKinght" should be changed to --McKnight--
    In 4,191,292 "Scnweizer" should be changed to --Schweizer--

In section Specifications:
    Column 1, line 2, insert --BACKGROUND OF THE INVENTION-- centered, all caps.
    Column 1, line 11, delete --BACKGROUND OF THE INVENTION--
    Column 1, line 13, delete "1" and center "Field of the invention" making it all caps
    Column 1, line 19, delete "2" and center "Description of the Related Art" making it all caps
    Column 1, line 58, change "receding" to --recording--

In section Specifications, Detailed Description of the Preferred Embodiment(s):
    Column 9, line 15, after "to" insert --be--
    Column 18, line 60, change "cut-away" to --Cut-away--
    Column 19, line 44, change "security" to --Security--

Signed and Sealed this

First Day of April, 2008

JON W. DUDAS
*Director of the United States Patent and Trademark Office*